United States Patent
Na et al.

(10) Patent No.: US 11,057,616 B2
(45) Date of Patent: Jul. 6, 2021

(54) VIDEO ENCODING METHOD AND APPARATUS THEREFOR, AND VIDEO DECODING METHOD AND APPARATUS THEREFOR

(71) Applicants: SAMSUNG ELECTRONICS CO., LTD., Suwon-si (KR); SEOUL NATIONAL UNIVERSITY R&DB FOUNDATION, Seoul (KR)

(72) Inventors: Sang-kwon Na, Seoul (KR); Soo-ik Chae, Seoul (KR); Ki-won Yoo, Seoul (KR); Jae-moon Kim, Uiwang-si (KR); Woo-seok Jeong, Seoul (KR)

(73) Assignees: SAMSUNG ELECTRONICS CO., LTD., Suwon-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 441 days.

(21) Appl. No.: 15/735,042

(22) PCT Filed: Jun. 8, 2016

(86) PCT No.: PCT/KR2016/006025
§ 371 (c)(1),
(2) Date: Dec. 8, 2017

(87) PCT Pub. No.: WO2016/200124
PCT Pub. Date: Dec. 15, 2016

(65) Prior Publication Data
US 2020/0036966 A1    Jan. 30, 2020

(30) Foreign Application Priority Data
Jun. 9, 2015 (KR) .................. 10-2015-0081530

(51) Int. Cl.
*H04N 11/02* (2006.01)
*H04N 19/103* (2014.01)
(Continued)

(52) U.S. Cl.
CPC ......... *H04N 19/103* (2014.11); *H04N 19/176* (2014.11); *H04N 19/59* (2014.11)

(58) Field of Classification Search
CPC ..... H04N 19/103; H04N 19/176; H04N 19/59
(Continued)

(56) References Cited

U.S. PATENT DOCUMENTS 5,262,854 A    11/1993   Ng
8,111,914 B2   7/2012    Lee et al.
(Continued)

FOREIGN PATENT DOCUMENTS

CN    103609112 A    2/2014
CN    103765893 A    4/2014
(Continued)

OTHER PUBLICATIONS

Communication dated Aug. 26, 2019, from the State Intellectual Property Office of People's Republic of China in counterpart Application No. 201680033861.7.
(Continued)

*Primary Examiner* — Jayanti K Patel
*Assistant Examiner* — Richard B Carter
(74) *Attorney, Agent, or Firm* — Sughrue Mion, PLLC

(57) ABSTRACT

Provided is a video decoding method including obtaining a residue of a first bit-depth with respect to a current block by decoding a bitstream; when intra predicting the current block, generating a prediction block of the current block by using a block that is previously decoded at the first bit-depth and then stored in a buffer; and generating a reconstruction block of the first bit-depth by using the prediction block and
(Continued)

the residue of the first bit-depth. When the current block is inter predicted, the video decoding method may further include generating a prediction block of a second bit-depth by using an image previously decoded at the second bit-depth, and generating the prediction block of the current block by changing the generated prediction block of the second bit-depth to the first bit-depth. The first bit-depth is higher than the second bit-depth.

7 Claims, 34 Drawing Sheets

(51) Int. Cl.
*H04N 19/176* (2014.01)
*H04N 19/59* (2014.01)

(58) Field of Classification Search
USPC ............. 375/240.02, 240.13, 240.14, 240.25
See application file for complete search history.

(56) References Cited

U.S. PATENT DOCUMENTS

| | | | |
|---|---|---|---|
| 8,553,767 | B2 | 10/2013 | Koto et al. |
| 9,510,016 | B2 | 11/2016 | Gomila et al. |
| 9,521,434 | B2 | 12/2016 | Chen et al. |
| 9,888,242 | B2 | 2/2018 | Alshina et al. |
| 2008/0170615 | A1* | 7/2008 | Sekiguchi .............. H04N 19/70 375/240.14 |
| 2011/0243232 | A1 | 10/2011 | Alshina et al. |
| 2011/0255608 | A1* | 10/2011 | Kim ..................... H04N 19/186 375/240.25 |
| 2015/0124865 | A1* | 5/2015 | Kim ..................... H04N 19/103 375/240.02 |
| 2016/0198175 | A1 | 7/2016 | Shima et al. |
| 2016/0261884 | A1* | 9/2016 | Li ........................ H04N 19/176 |
| 2016/0261885 | A1* | 9/2016 | Li ........................ H04N 19/587 |

FOREIGN PATENT DOCUMENTS

| | | |
|---|---|---|
| CN | 107690806 A | 2/2018 |
| JP | 2012-129650 A | 7/2012 |
| JP | 2012-134878 A | 7/2012 |
| JP | 2014-131172 A | 7/2014 |
| JP | 2015-95833 A | 5/2015 |
| KR | 10-2007-0097309 A | 10/2007 |
| KR | 10-2011-0028351 A | 3/2011 |
| KR | 10-2014-0019474 A | 2/2014 |
| KR | 10-1362757 B1 | 2/2014 |
| KR | 10-2016-0144845 A | 12/2016 |
| WO | 2016200124 A1 | 12/2016 |

OTHER PUBLICATIONS

International Search Report and Written Opinion dated Sep. 1, 2016, issued by the International Searching Authority in counterpart International Application No. PCT/KR2016/006025 (PCT/ISA/210 & PCT/ISA/237).

Communication dated Jun. 23, 2017, issued by the Korean Intellectual Property Office in counterpart Korean Application No. 10-2015-0081530.

Communication dated Sep. 30, 2016, issued by the Korean Intellectual Property Office in counterpart Korean Application No. 10-2015-0081530.

* cited by examiner

PARTITION TYPE (800)

PREDICTION MODE (810)

SIZE OF TRANSFORMATION UNIT (820)

CODING UNIT (1010)

VIDEO ENCODING METHOD AND APPARATUS THEREFOR, AND VIDEO DECODING METHOD AND APPARATUS THEREFOR

TECHNICAL FIELD

The present disclosure relates to a video encoding method and apparatus therefor, and a video decoding method and apparatus therefor, in which a bit-depth and a sampling rate are considered.

BACKGROUND ART

As hardware for reproducing and storing high resolution or high quality video content is being developed and supplied, a need for a video codec for effectively encoding or decoding the high resolution or high quality video content is increasing. According to a conventional video codec, a video is coded according to a limited coding method based on a coding unit having a predetermined size.

Image data of a spatial region is transformed into coefficients of a frequency region via frequency transformation According to a video codec, an image is split into blocks having a predetermined size, discrete cosine transformation (DCT) is performed on each block, and frequency coefficients are encoded in block units, for rapid calculation of frequency transformation. Compared with image data of a spatial region, coefficients of a frequency region are easily compressed. In particular, since an image pixel value of a spatial region is expressed according to a prediction error via inter prediction or intra prediction of a video codec, when frequency transformation is performed on the prediction error, a large amount of data may be transformed to 0. According to a video codec, an amount of data may be reduced by replacing data that is consecutively and repeatedly generated with small-sized data.

In particular, when a video decoding apparatus receives and decodes a bitstream including a residue of a bit-depth or a sampling rate which is higher than a bit-depth or a sampling rate which can be processed based on a processing capability of the video decoding apparatus, an image quality significantly deteriorates compared to a case in which the bitstream is decoded by a video decoding apparatus capable of performing a process at the bit-depth or the sampling rate of the residue included in the bitstream.

DETAILED DESCRIPTION OF THE INVENTION

Technical Solution

According to an aspect of the present disclosure, there is provided a video decoding method including obtaining a residue of a first bit-depth regarding a current block by decoding a bitstream; when the current block is intra predicted, generating a prediction block of the current block by using a block that is previously decoded at the first bit-depth and then is stored in a buffer; and generating a reconstruction block of the first bit-depth by using the prediction block and the residue of the first bit-depth.

According to another aspect of the present disclosure, there is provided a video decoding method including obtaining a residue of a first sampling rate with regarding a current block by decoding a bitstream; when the current block is intra predicted, generating a prediction block of the current block by using a block that is previously decoded at the first sampling rate and then is stored in a buffer; and generating a reconstruction block of the first sampling rate by using the prediction block and the residue of the first sampling rate.

Advantageous Effects of the Invention

Deterioration in an image quality can be minimized by encoding and decoding a video in consideration of a bit-depth and a sampling rate.

BEST MODE

Figure 1A:
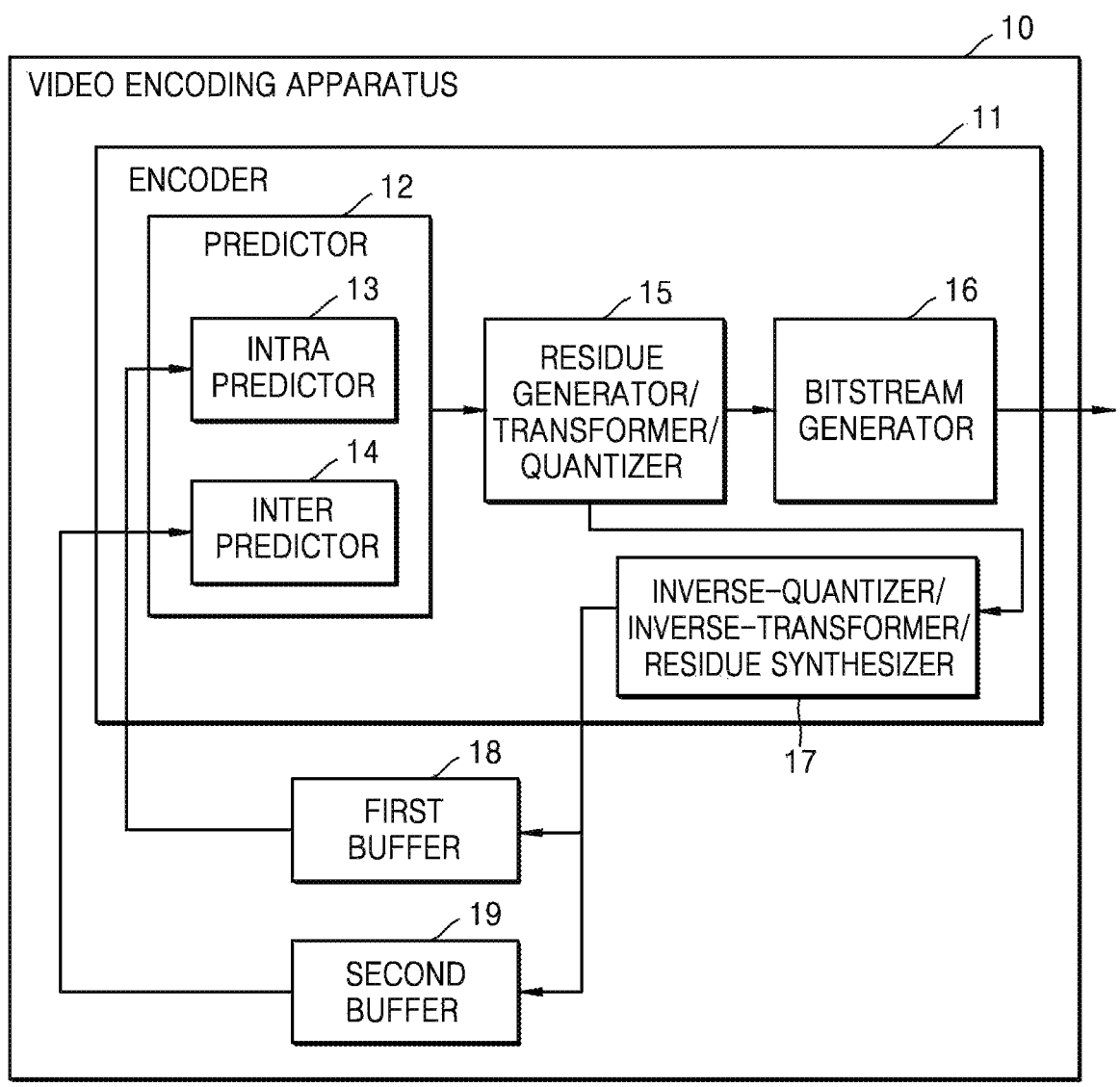
FIG. 1A is a block diagram of a video encoding apparatus, according to an embodiment.

According to an aspect of the present disclosure, there is provided a video decoding method including obtaining a residue of a first bit-depth regarding a current block by decoding a bitstream; when the current block is intra predicted, generating a prediction block of the current block by using a block that is previously decoded at the first bit-depth and then is stored in a buffer; and generating a reconstruction block of the first bit-depth by using the prediction block and the residue of the first bit-depth.

When the current block is inter predicted, a prediction block of a second bit-depth may be generated by using an image previously decoded at the second bit-depth, the prediction block of the current block may be generated by changing the generated prediction block of the second bit-depth to the first bit-depth, and the first bit-depth may be higher than the second bit-depth.

The video decoding method may further include storing the reconstruction block of the first bit-depth in the buffer.

When a block, to be decoded after the current block, is intra predicted, the video decoding method may further include generating a prediction block of the block to be decoded after the current block by using the reconstruction block of the first bit-depth.

The first bit-depth may indicate 10 bits, and the second bit-depth may indicate 8 bits.

The obtaining of the residue of the first bit-depth with respect to the current block by decoding the bitstream may include generating a transform coefficient of the first bit-depth by inverse-quantizing the bitstream; and obtaining the residue of the first bit-depth by inverse-transforming the generated transform coefficient of the first bit-depth.

The reconstruction block may be clipped in a clipping range corresponding to a range of values that can be expressed with respect to the first bit-depth.

According to another aspect of the present disclosure, there is provided a video decoding method including obtaining a residue of a first sampling rate regarding a current block by decoding a bitstream; when the current block is intra predicted, generating a prediction block of the current block by using a block that is previously decoded at the first sampling rate and then stored in a buffer; and generating a reconstruction block of the first sampling rate by using the prediction block and the residue of the first sampling rate.

When the current block is inter predicted, a prediction block of a second sampling rate may be generated by using an image previously decoded at the second sampling rate, the prediction block of the current block may be generated by changing the generated prediction block of the second sampling rate to the first sampling rate, and the first sampling rate may be higher than the second sampling rate.

The video decoding method may further include storing the reconstruction block of the first sampling rate in the buffer.

When a block to be decoded after the current block is intra predicted, the video decoding method may further include generating a prediction block of the block to be decoded after the current block by using the reconstruction block of the first sampling rate.

In the generating, when the current block is intra predicted, of the prediction block of the current block by using the block that is previously decoded at the first sampling rate and then is stored in the buffer, a reference pixel, which is from among pixels included in the current block and is to be used in intra predicting a block to be decoded after the current block, may be predicted by using the block that is previously decoded at the first sampling rate and then is stored in the buffer, other pixels excluding the reference pixel which are included in the current block may be predicted by using a block of the second sampling rate which is previously decoded and then is stored in the buffer, and the block of the second sampling rate may be generated by changing the block that is previously decoded at the first sampling rate to the second sampling rate.

According to another aspect of the present disclosure, there is provided a video decoding apparatus including a buffer configured to store a block to be used in intra prediction; and a decoder configured to obtain a residue of a first bit-depth regarding a current block by decoding a bitstream, when the current block is intra predicted, to generate a prediction block of the current block by using the block that is previously decoded at the first bit-depth and then is stored in the buffer, and to generate a reconstruction block of the first bit-depth by using the prediction block and the residue of the first bit-depth.

When the current block is inter predicted, a prediction block of a second bit-depth may be generated by using an image previously decoded at the second bit-depth, the prediction block of the current block may be generated by changing the generated prediction block of the second bit-depth to the first bit-depth, and the first bit-depth may be higher than the second bit-depth.

According to another aspect of the present disclosure, there is provided a video decoding apparatus including a buffer configured to store a block to be used in intra prediction; and a decoder configured to obtain a residue of a first sampling rate regarding a current block by decoding a bitstream, when the current block is intra predicted, to generate a prediction block of the current block by using the block that is previously decoded at the first sampling rate and then is stored in the buffer, to generate a reconstruction block of the first sampling rate by using the prediction block and the residue of the first sampling rate.

When the current block is inter predicted, a prediction block of a second sampling rate may be generated by using an image previously decoded at the second sampling rate, the prediction block of the current block is generated by changing the generated prediction block of the second sampling rate to the first sampling rate, and the first sampling rate may be higher than the second sampling rate.

According to another aspect of the present disclosure, there is provided a video encoding method including, when a current block is intra predicted, generating a prediction block of the current block by using a block that is previously decoded at a first bit-depth and then is stored in a buffer; and determining a residue of the first bit-depth by using the generated prediction block, and generating a bitstream including the determined residue of the first bit-depth.

When the current block is inter predicted, a prediction block of a second bit-depth may be generated by using an image previously decoded at the second bit-depth, the prediction block of the current block may be generated by changing the generated prediction block of the second bit-depth to the first bit-depth, the first bit-depth may be higher than the second bit-depth.

According to another aspect of the present disclosure, there is provided a video encoding method including, when a current block is intra predicted, generating a prediction block of the current block by using a block that is previously decoded at a first sampling rate and then is stored in a buffer; and determining a residue of the first sampling rate by using the generated prediction block, and generating a bitstream including the determined residue of the first sampling rate.

When the current block is inter predicted, a prediction block of a second sampling rate may be generated by using an image previously decoded at the second sampling rate, the prediction block of the current block may be generated by changing the generated prediction block of the second sampling rate to the first sampling rate, and the first sampling rate may be higher than the second sampling rate.

According to another aspect of the present disclosure, there is provided a video encoding apparatus including a buffer configured to store a block to be used in intra prediction; and an encoder configured to, when intra predicting a current block, generate a prediction block of the current block by using the block that is previously decoded at a first bit-depth and then is stored in the buffer, to determine a residue of the first bit-depth by using the prediction block, to determine the residue of the first bit-depth, and to generate a bitstream including the determined residue of the first bit-depth.

When the current block is inter predicted, a prediction block of a second bit-depth may be generated by using an image previously decoded at the second bit-depth, the prediction block of the current block may be generated by changing the generated prediction block of the second bit-depth to the first bit-depth, and the first bit-depth may be higher than the second bit-depth.

According to another aspect of the present disclosure, there is provided a video encoding apparatus including a buffer configured to store a block to be used in intra prediction; and an encoder configured to, when intra predicting a current block, generate a prediction block of the current block by using the block that is previously decoded at a first sampling rate and then is stored in the buffer, to determine a residue of the first sampling rate by using the prediction block, and to generate a bitstream including the determined residue of the first sampling rate.

When the current block is inter predicted, a prediction block of a second sampling rate may be generated by using an image previously decoded at the second sampling rate, the prediction block of the current block may be generated by changing the generated prediction block of the second sampling rate to the first sampling rate, and the first sampling rate may be higher than the second sampling rate.

According to another aspect of the present disclosure, there is provided a computer-readable recording medium having recorded thereon a program for executing the video encoding and decoding methods.

MODE OF THE INVENTION

Terms such as " . . . unit", " . . . module", or the like described in the present specification indicate a unit for processing at least one function or operation, wherein the unit and the module may be embodied as hardware or software or embodied by combining hardware and software.

In the present specification, "an embodiment" or "embodiment" means unique characteristic, structure, feature, and the like which are described with an embodiment included in one or more embodiments. Thus, the expression "in an embodiment" or "in embodiment" which is included in throughout the present specification does not necessarily indicate the same embodiment.

With reference to FIGS. 1 through 6E, a video encoding method and a video decoding method performed in consideration of a bit-depth or a sampling rate according to various embodiments will now be described.

Furthermore, with reference to FIGS. 7 through 26, a video encoding method and a video decoding method based on coding units of a tree structure according to various embodiments will be provided. Hereinafter, an 'image' may indicate a still image of a video or a moving picture, i.e., the video itself.

First, with reference to FIGS. 1 through 6E, a video encoding method and a video decoding method performed in consideration of a bit-depth or a sampling rate will now be provided.

When a video decoding apparatus decodes a residue of a bit-depth (hereinafter, referred to as a high bit-depth) or a sampling rate (hereinafter, referred to as a high sampling rate), wherein the bit-depth is higher than a processable bit-depth and the sampling rate is higher than a processable sampling rate based on a processing capability of the video decoding apparatus, the video decoding apparatus performs a process of changing the residue of the high bit-depth or the high sampling rate to a residue of a bit-depth or a sampling rate which is processible based on the processing capability of the video decoding apparatus, and then performs a process of reconstructing an image by using the residue of the bit-depth or the sampling rate which is processible based on the processing capability of the video decoding apparatus. However, when the video decoding apparatus changes the residue of the high bit-depth or the high sampling rate to the residue of the bit-depth or the sampling rate which is processible based on the processing capability of the video decoding apparatus, a loss of information occurs, and due to the loss of information, a quality of a reconstructed image deteriorates.

Video encoding apparatuses 10 and 30 and video decoding apparatuses 20 and 40 according to various embodiments changelessly use a residue of a high bit-depth or a high sampling rate without changing the residue of the high bit-depth or the high sampling rate in some of encoding and decoding processes, thereby minimizing image-quality deterioration that occurs in reconstruction of an image of a bit-depth or a sampling rate which exceeds processing capabilities of video encoding and decoding apparatuses.

In more detail, the video encoding apparatuses 10 and 30 and the video decoding apparatuses 20 and 40 changelessly use a residue of a high bit-depth or a high sampling rate in a process of performing intra prediction, thereby minimizing image-quality deterioration that occurs in reconstruction of an image of a bit-depth or a sampling rate which exceeds processing capabilities of video encoding and decoding apparatuses. The video encoding apparatuses 10 and 30 and the video decoding apparatuses 20 and 40 may have buffers to store the residue of the high bit-depth or the high sampling rate, and when the video encoding apparatuses 10 and 30 and the video decoding apparatuses 20 and 40 perform the intra prediction, the video encoding apparatuses 10 and 30 and the video decoding apparatuses 20 and 40 may changelessly use the residue of the high bit-depth or the high sampling rate stored in the buffers, thereby minimizing an image-quality deterioration phenomenon that occurs in reconstruction of the image of the bit-depth or the sampling rate which exceeds processing capabilities of video encoding and decoding apparatuses.

Hereinafter, with reference to FIGS. 1A and 1B, and 2A and 2B, operations of the video encoding apparatuses 10 and 30 according to various embodiments will now be described in detail, and with reference to FIGS. 1C and 1D, and 2C and 2D, operations of the video decoding apparatuses 20 and 40 according to various embodiments will now be described in detail.

FIG. 1A is a block diagram of a video encoding apparatus, according to an embodiment.

Referring to FIG. 1A, a video encoding apparatus 10 according to an embodiment includes an encoder 11, a first buffer 18, and a second buffer 19.

The video encoding apparatus 10 according to an embodiment receives an input of images such as slices of a video, partitions each of the images into blocks, and encodes each of the blocks. A type of a block may be a square or a rectangle, or may be an arbitrary geometrical shape. The block is not limited to a data unit having a uniform size. The block according to an embodiment may be a largest coding unit (LCU), a coding unit (CU), a prediction unit, a transform unit, or the like from among coding units of a tree structure. Video encoding and decoding methods based on the coding units of the tree structure will be described below with reference to FIGS. 7 through 26. The encoder 11 may include a predictor 12, a residue generator/transformer/quantizer 15, a bitstream generator 16, and an inverse-quantizer/inverse-transformer/residue synthesizer 17.

The predictor 12 may generate a prediction block of a current block by using an image that is decoded before a current image. In addition, the predictor 12 may generate may generate the prediction block of the current block by using a block that is included in the current image and is from among blocks decoded before the current block.

In order to minimize an amount of data to be encoded, the predictor 12 may perform prediction on the current block by using by using a reconstruction block that is spatially adjacent to the current block or a reconstruction image that is temporally adjacent thereto.

The predictor 12 may include an intra predictor 13 and an inter predictor 14.

The intra predictor 13 may generate a prediction block of a current block by using neighboring blocks that are located adjacent to the current block and are from among previously-decoded blocks.

For example, the intra predictor 13 may determine at least one reference pixel to be referenced from among pixels adjacent to the left of the current block and pixels adjacent to the top of the current block, and may generate the prediction block of the current block by using the determined reference pixel.

In more detail, the intra predictor 13 may determine a reference pixel from among neighboring pixels according to reference directions. That is, the intra predictor 13 may determine, from among various reference directions, an optimal reference direction in which a correlation with respect to the current block is high in consideration of a Rate-Distortion Cost (RD cost), and may accordingly determine the reference pixel from among the neighboring pixels.

When the intra predictor 13 intra predicts the current block, the intra predictor 13 may generate a prediction block of the current block by using a block that is previously decoded at a first bit-depth and then is stored in the first buffer 18. In this regard, a bit-depth means a number of bits used in expressing a sample value of one pixel. Also, the first bit-depth may mean a bit-depth of a residue included in a bitstream.

For example, the intra predictor 13 may generate the prediction block of the current block by using a block that is previously decoded at a bit-depth of 10 and then is stored in the first buffer 18. In this regard, a bit-depth of the generated prediction block may be the first bit-depth equal to the bit-depth of the block that is previously decoded and stored in the first buffer 18.

The inter predictor 14 may generate a prediction block of the current block by using an image that is decoded before a current image. For example, the inter predictor 14 may determine a reference image from among images decoded before the current image, and may determine a reference block of the reference image, the reference block having a high correlation with the current block.

The inter predictor 14 determines the reference block having a high correlation with the current block, thereby determining motion information such as a motion vector, a reference picture index, picture list information, or the like.

In this regard, the picture list information means information indicating a picture list including an image to be used in a reference from among one or more picture lists. The inter predictor 14 may determine the picture list information indicating at least one picture list that is to be used in prediction and is from among a L0 list and a L1 list.

The reference picture index means information indicating a picture that is to be used in a reference and is from among a plurality of pictures in a predetermined picture list. The inter predictor 14 may determine the reference picture index indicating the picture that is to be used in a reference and is from among the plurality of pictures in the predetermined picture list.

The motion vector means a vector indicating displacement between the current block and a block having a high correlation with the current block. The inter predictor 14 may determine the motion vector indicating the reference block that is to be used in inter prediction and is from among blocks included in the reference picture.

The inter predictor 14 may generate the prediction block of the current block by using the reference block included in a previously-decoded image.

In order to reduce a size of the motion information to be transmitted, the inter predictor 14 may use a correlation of motion information with respect to the current block and a neighboring block of the current block.

For example, the inter predictor 14 may compose a list including neighboring blocks for deriving motion information of the current block, and may transmit only information indicating a predetermined neighboring block in the list, thereby reducing the size of the motion information.

When the current block is inter predicted, the inter predictor 14 may generate a prediction block of a second bit-depth by using an image that is previously decoded at the second bit-depth. In this regard, the second bit-depth indicates a bit-depth different from the first bit-depth that is a bit-depth of a residue to be encoded. The second bit-depth may be the bit-depth lower than the first bit-depth.

The inter predictor 14 may generate the prediction block of the first bit-depth by changing the prediction block of the second bit-depth to the first bit-depth. For example, the inter predictor 14 performs a left shift operation on the prediction block of the second bit-depth. That is, the inter predictor 14 shifts bits to the left by a predetermined bit, the bits expressing a sample value of a pixel included in the prediction block of the second bit-depth, and allocates 0 to an empty space created due to the shift operation. Thus, the inter predictor 14 may change the prediction block of the second bit-depth to the first bit-depth that is higher than the second bit-depth. For example, when the current block is inter predicted, the inter predictor 14 may generate a prediction block of bit-depth of 8 by using an image that is previously decoded at a bit-depth of 8. Afterward, the inter predictor 14 may change the prediction block of the bit-depth of 8 to a prediction block of a bit-depth of 10.

The residue generator/transformer/quantizer 15 determines a residue indicating a difference between an original image and the prediction block of the current block which is generated by the predictor 12.

The residue generator/transformer/quantizer 15 determines the residue indicating the difference between the original image and the prediction block of the first bit-depth which is generated by the predictor 12. The determined residue may be a residue of the first bit-depth.

The residue generator/transformer/quantizer 15 transforms the residue of the first bit-depth from a spatial domain to a transform domain such as a Hamadard domain. The residue generator/transformer/quantizer 15 quantizes the transformed residue by using a predetermined quantization parameter.

The bitstream generator 16 generates a bitstream including the residue quantized by the residue generator/transformer/quantizer 15. For example, the bitstream generator 16 may generate the bitstream including the quantized residue of the first bit-depth.

The bitstream generator 16 may generate the bitstream including the residue along with an encoding parameter and the motion information determined in an image encoding process.

The inverse-quantizer/inverse-transformer/residue synthesizer 17 may inverse-quantize the residue quantized by the residue generator/transformer/quantizer 15. The inverse-quantizer/inverse-transformer/residue synthesizer 17 may transform the inverse-quantized residue from the transform domain to the spatial domain. The inverse-quantizer/inverse-transformer/residue synthesizer 17 may generate a reconstruction block of the current block by using the transformed residue of the first bit-depth and the prediction block generated by the predictor 12.

The inverse-quantizer/inverse-transformer/residue synthesizer 17 may generate the reconstruction block of the current block of the first bit-depth by using the prediction block of the first bit-depth and the inverse-transformed residue of the first bit-depth.

For example, the inverse-quantizer/inverse-transformer/residue synthesizer 17 may generate a reconstruction block of a bit-depth of 10 by using a prediction block of a bit-depth of 10 and an inverse-transformed residue of a bit-depth of 10.

Also, the inverse-quantizer/inverse-transformer/residue synthesizer 17 may generate a reconstruction image including reconstruction blocks. For example, the inverse-quantizer/inverse-transformer/residue synthesizer 17 may change the reconstruction block of the first bit-depth to a reconstruction block of a second bit-depth, and may generate a reconstruction image including the changed reconstruction block of the second bit-depth.

The first buffer 18 may store the reconstruction block of the first bit-depth which is to be used in intra prediction. For example, the first buffer 18 may store neighboring pixels that are adjacent to the current block and are from among pixels reconstructed before the current block.

The second buffer 19 may store the reconstruction image of the second bit-depth which is to be used in inter prediction.

The reconstruction block stored in the first buffer 18 may be used in intra predicting a block to be encoded after the current block. The reconstruction image stored in the second buffer 19 may be used in inter predicting an image to be encoded after the current image. For example, the intra predictor 13 may generate a prediction block of a block to be encoded after the current block, by using the reconstruction block of the first bit-depth stored in the first buffer 18.

The inter predictor 14 may generate a prediction block of an image to be encoded after the current image by using the reconstruction image of the second bit-depth stored in the second buffer 19. The video encoding apparatus 10 according to an embodiment may include a central processor (not shown) to generally control the predictor 12, the residue generator/transformer/quantizer 15, the bitstream generator 16, the inverse-quantizer/inverse-transformer/residue synthesizer 17, the first buffer 18, and the second buffer 19. Alternatively, the predictor 12, the residue generator/transformer/quantizer 15, the bitstream generator 16, the inverse-quantizer/inverse-transformer/residue synthesizer 17, the first buffer 18, and the second buffer 19 operate due to respective dedicated-processors (not shown), and the processors (not shown) systemically operate with each other so that the entire video encoding apparatus 10 may operate. Alternatively, the predictor 12, the residue generator/transformer/quantizer 15, the bitstream generator 16, the inverse-quantizer/inverse-transformer/residue synthesizer 17, the first buffer 18, and the second buffer 19 may be controlled by the control of an external processor (not shown) of the video encoding apparatus 10 according to an embodiment.

The video encoding apparatus 10 according to an embodiment may include one or more data storages (not shown) in which input and output data of the predictor 12, the residue generator/transformer/quantizer 15, the bitstream generator 16, the inverse-quantizer/inverse-transformer/residue synthesizer 17, the first buffer 18, and the second buffer 19 are stored. The video encoding apparatus 10 may include a memory controller (not shown) to manage data input and output of the data storages (not shown).

In order to output a video encoding result, the video encoding apparatus 10 according to an embodiment may operate in cooperation with an internal video encoding processor installed therein or an external video encoding processor so as to perform video encoding operations including transformation.

The internal video encoding processor of the video encoding apparatus 10 according to an embodiment may perform, as a separate processor, the video encoding operation. Also, basic video encoding operations may be realized as the video encoding apparatus 10, a central processing apparatus, or a graphic processing apparatus includes a video encoding processing module.

Figure 1B:
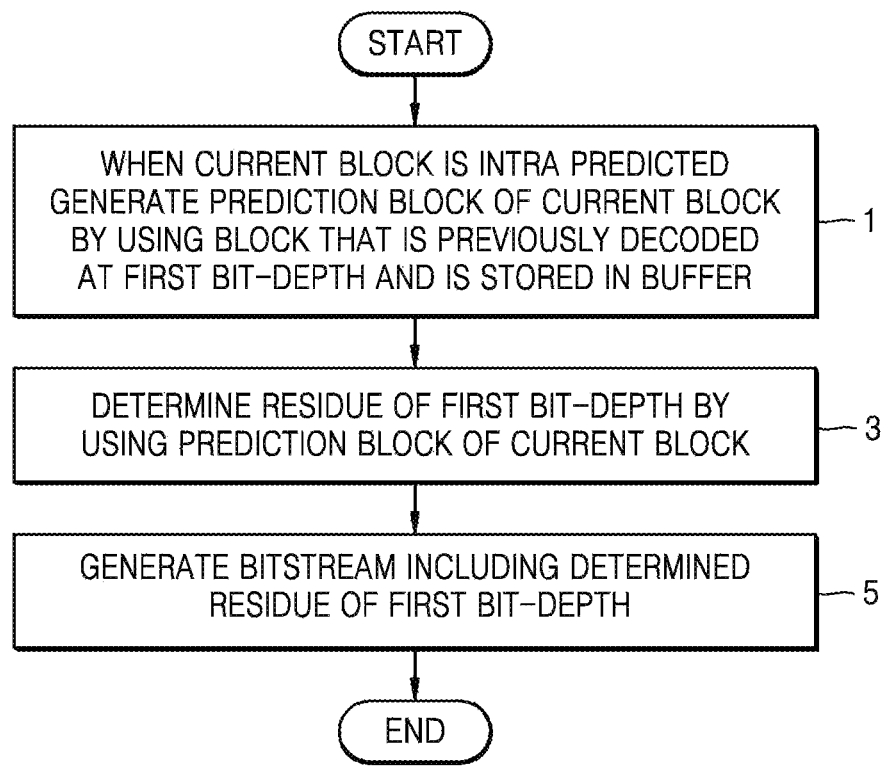
FIG. 1B is a flowchart of a video encoding method, according to an embodiment.

FIG. 1B is a flowchart of a video encoding method, according to an embodiment.

In operation 1, when the video encoding apparatus 10 intra predicts a current block, the video encoding apparatus 10 may generate a prediction block of a current block by using a block that is previously decoded at a first bit-depth and is stored in a buffer. In this regard, a bit-depth of the prediction block may be the first bit-depth.

In operation 3, the video encoding apparatus 10 may determine a residue of the first bit-depth by using the prediction block of the current block. The video encoding apparatus 10 may determine the residue of the first bit-depth which indicates a difference between the prediction block of the first bit-depth and an original image.

In operation 5, the video encoding apparatus 10 may generate a bitstream including the residue of the first bit-depth. When the video encoding apparatus 10 inter predicts the current block, the video encoding apparatus 10 may generate the prediction block of the current block by using an image that is previously decoded at a second bit-depth. In this regard, the second bit-depth indicates a bit-depth different from the first bit-depth. For example, the first bit-depth may be higher than the second bit-depth.

After the video encoding apparatus 10 generates the prediction block of the current block of which bit depth is the second bit-depth by using the image that is previously decoded at the second bit-depth, the video encoding apparatus 10 may generate a prediction block of which bit-depth is the first bit-depth by using the prediction block of the second bit-depth. That is, the video encoding apparatus 10 may change the prediction block of the second bit-depth to the first bit-depth, thereby generating the prediction block of the first bit-depth.

Figure 1C:
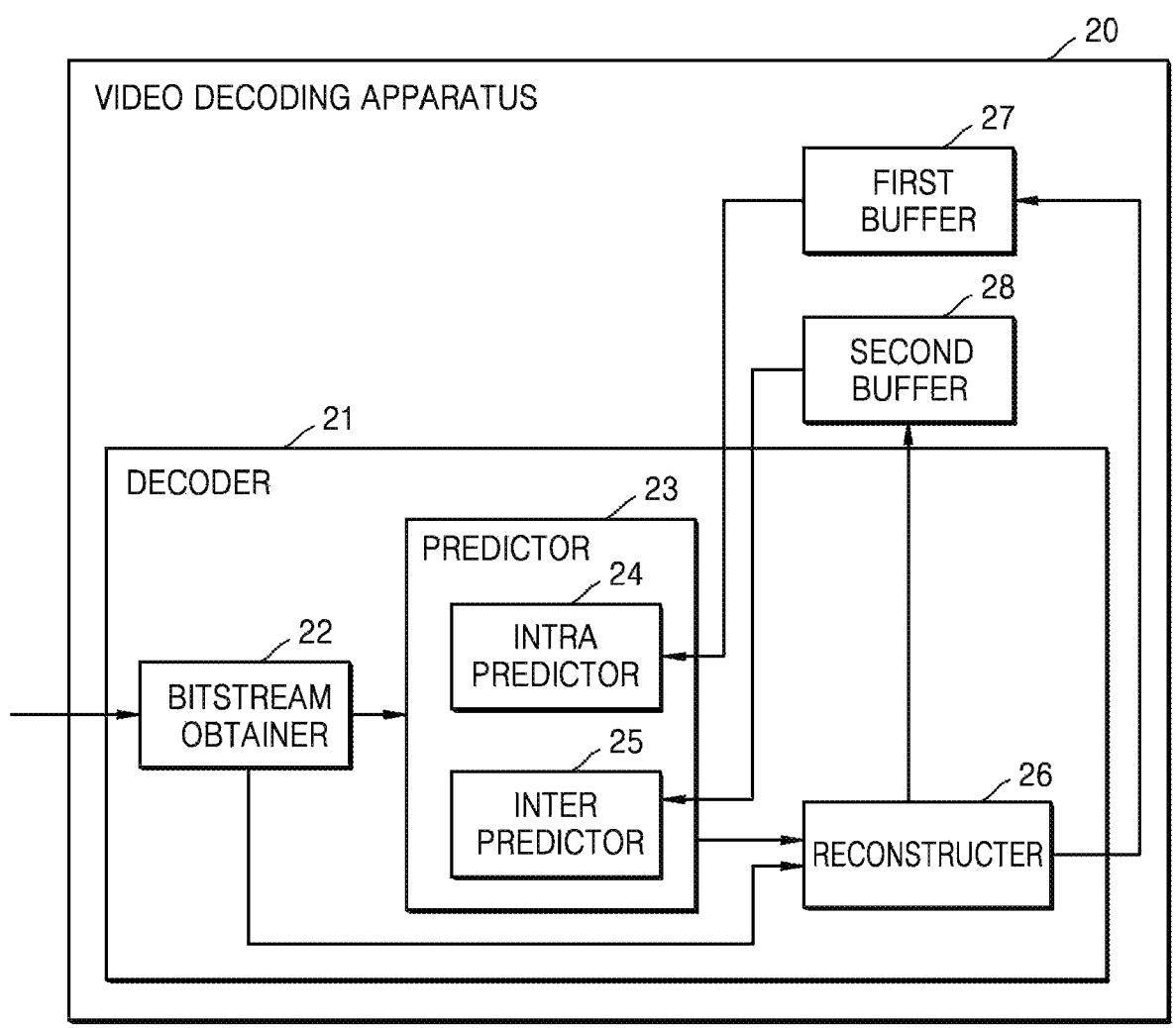
FIG. 1C is a block diagram of a video decoding apparatus, according to an embodiment.

FIG. 1C is a block diagram of a video decoding apparatus, according to an embodiment.

Referring to FIG. 1C, a video decoding apparatus 20 according to an embodiment includes a decoder 21, a first buffer 27, and a second buffer 28. The decoder 21 may include a bitstream obtainer 22, a predictor 23, and a reconstructor 26.

The bitstream obtainer 22 obtains a bitstream including a residue, an encoding parameter, and motion information.

The predictor 23 may generate a prediction block of a current block by using an image that is decoded before a current image. Alternatively, the predictor 23 may generate the prediction block of the current block by using a block that is from among blocks decoded before the current block and is included in the current image.

The predictor 23 may include an intra predictor 24 and an inter predictor 25.

The intra predictor 24 may generate the prediction block of the current block by using neighboring blocks that are located adjacent to the current block and are from among the blocks decoded before the current block. For example, the intra predictor 24 may determine at least one reference pixel to be referenced from among pixels adjacent to the left of the current block and pixels adjacent to the top of the current block, and may generate the prediction block of the current block by using the determined reference pixel. For example, the intra predictor 24 may obtain a reference direction from the bitstream. Afterward, the intra predictor 24 may determine the reference pixel from among the neighboring blocks by using the obtained reference direction, and may generate the prediction block of the current block by using the determined reference pixel.

When the intra predictor 24 intra predicts the current block, the intra predictor 24 may generate a prediction block of the current block by using a block that is previously decoded at a first bit-depth and then is stored in the first buffer 27. For example, the intra predictor 24 may generate the prediction block of the current block by using a block that is previously decoded at a bit-depth of 10 and then is stored in the first buffer 27. In this regard, a bit-depth of the generated prediction block may be the first bit-depth equal to the bit-depth of the block that is previously decoded and stored in the first buffer 27.

The inter predictor 25 may generate a prediction block of a current block by using an image that is decoded before the current image and then is stored in the second buffer 28. For example, the inter predictor 25 may obtain motion information including a motion vector, a reference picture index, and picture list information from the bitstream. The inter predictor 25 may determine, by using the motion information, a picture list from among picture lists including images decoded before the current image, may determine a reference image from among images included in the determined picture list, and may determine a reference block of the reference image which is to be used in predicting the current block. The inter predictor 25 may determine the prediction block of the current block by using the reference block.

The inter predictor 25 determines a list including neighboring blocks for deriving the motion information, and obtains, from the bitstream, information indicating a neighboring block from among the neighboring blocks included in the list.

The inter predictor 25 may determine the neighboring block by using the information indicating the neighboring block from among the neighboring blocks included in the list, and may determine motion the information of the current block by using motion information of the determined neighboring block. That is, the inter predictor 25 may determine the motion vector, the reference picture index, and the picture list information of the current block.

When the inter predictor 25 inter predicts the current block, the inter predictor 25 may generate a prediction block of a second bit-depth by using the image that is previously decoded at the second bit-depth and then is stored in the second buffer 28. In this regard, the second bit-depth indicates a bit-depth different from the first bit-depth. For example, the first bit-depth may be higher than the second bit-depth.

The inter predictor 25 may generate the prediction block of the first bit-depth by changing the prediction block of the second bit-depth to the first bit-depth. When the inter predictor 25 changes the prediction block of the second bit-depth to the first bit-depth, the inter predictor 25 performs a left shift operation on the prediction block of the second bit-depth. That is, the inter predictor 25 shifts bits to the left by a predetermined bit, the bits expressing a sample value of a pixel included in the prediction block of the second bit-depth, and allocates 0 to an empty space at the right which is created due to the shift operation, thereby changing the prediction block of the second bit-depth to the first bit-depth that is higher than the second bit-depth.

For example, when the inter predictor 25 inter predicts the current block, the inter predictor 25 may generate a prediction block of a bit-depth of 8 by using an image that is previously decoded at the bit-depth of 8.

The inter predictor 25 may change the prediction block of the bit-depth of 8 to a prediction block of a bit-depth of 10.

The reconstructor 26 may inverse-quantize the residue of the first bit-depth which is obtained from the bitstream obtainer 22. The reconstructor 26 may inverse-transform the inverse-quantized residue from a transform domain to a spatial domain, thereby obtaining the residue of the first bit-depth.

The reconstructor 26 may generate a reconstruction block of the current block by using the prediction block of the current block which is generated by the predictor 23 and the residue of the first bit-depth. In this regard, a bit-depth of the prediction block may be the first bit-depth. In addition, a bit-depth of the reconstruction block may be the first bit-depth.

The reconstructor 26 may generate a reconstruction image including reconstruction blocks. When the reconstructor 26 generates the reconstruction image, the reconstructor 26 may change the reconstruction blocks of the first bit-depth to the second bit-depth, and may generate a reconstruction image of the second bit-depth, the reconstruction image including the reconstruction blocks of the changed second bit-depth.

The first buffer 27 may store the reconstruction block generated by the reconstructor 26. For example, the first buffer 27 may store the reconstruction block of the first bit-depth.

The second buffer 28 may store the reconstruction image including the reconstruction blocks of the second bit-depth.

The reconstruction block stored in the first buffer 27 may be used in intra predicting a block to be encoded after the current block.

The reconstruction image stored in the second buffer 28 may be used in inter predicting a block included in an image to be encoded after the current image.

For example, the intra predictor 24 may generate a prediction block of a block to be encoded after the current block, by using the reconstruction block of the first bit-depth stored in the first buffer 27. The inter predictor 25 may generate a prediction block of an image to be encoded after the current block, by using the reconstruction image of the second bit-depth stored in the second buffer 28.

The video decoding apparatus 20 according to an embodiment may include a central processor (not shown) to generally control the bitstream obtainer 22, the predictor 23, the reconstructor 26, the first buffer 27, and the second buffer 28. Alternatively, the bitstream obtainer 22, the predictor 23, the reconstructor 26, the first buffer 27, and the second buffer 28 operate due to respective dedicated-processors (not shown), and the processors (not shown) systemically operate with each other so that the entire video decoding apparatus 20 may operate. Alternatively, the bitstream obtainer 22, the predictor 23, the reconstructor 26, the first buffer 27, and the second buffer 28 may be controlled by the control of an external processor (not shown) of the video decoding apparatus 20 according to an embodiment.

The video decoding apparatus 20 according to an embodiment may include one or more data storages (not shown) in which input and output data of the bitstream obtainer 22, the predictor 23, the reconstructor 26, the first buffer 27, and the second buffer 28 are stored. The video decoding apparatus 20 may include a memory controller (not shown) to manage data input and output of the data storages (not shown).

In order to reconstruct a video through video decoding, the video decoding apparatus 20 according to an embodiment may operate in cooperation with an internal video decoding processor installed therein or an external video decoding processor so as to perform video decoding operations. The internal video decoding processor of the video decoding apparatus 20 according to an embodiment may perform, as a separate processor, basic video decoding operations. Also, the basic video encoding operations may be realized as the video decoding apparatus 20, a central processing apparatus, or a graphic processing apparatus includes a video decoding processing module.

Figure 1D:
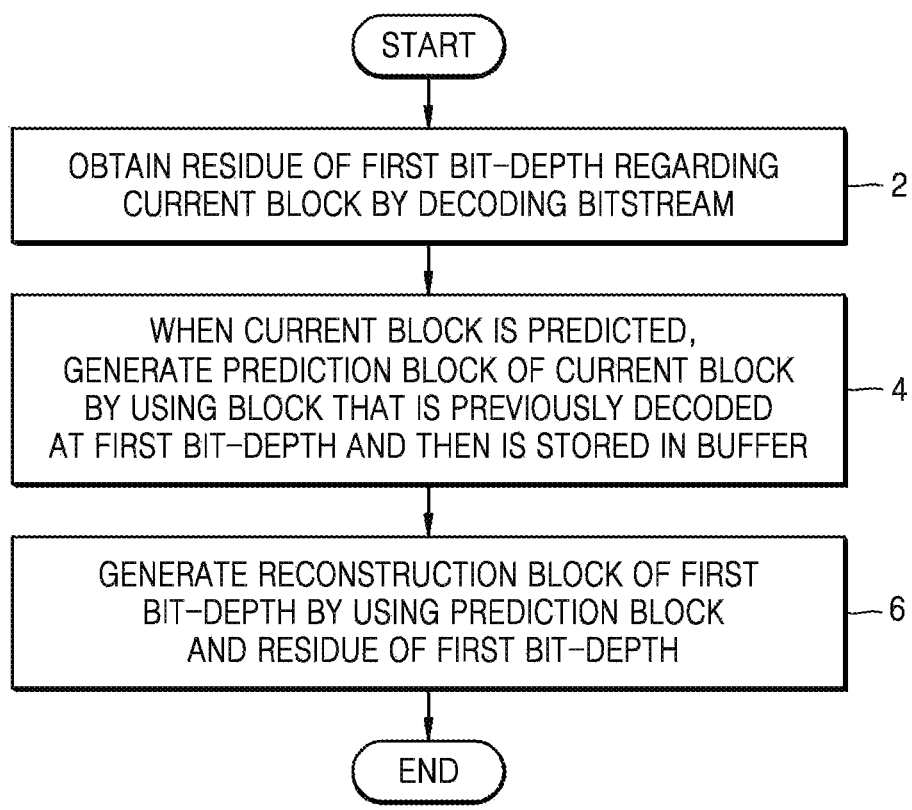
FIG. 1D is a flowchart of a video decoding method, according to an embodiment.

FIG. 1D is a flowchart of a video decoding method, according to an embodiment.

In operation 2, the video decoding apparatus 20 obtains a residue of a first bit-depth regarding a current block by decoding a bitstream. The bitstream includes the residue of the first bit-depth.

In operation 4, when the video decoding apparatus 20 predicts the current block, the video decoding apparatus 20 generates a prediction block of the current block by using a block that is previously decoded at the first bit-depth and then is stored in a buffer. In this regard, the prediction block may be a prediction block of the first bit-depth.

In operation 6, the video decoding apparatus 20 may generate a reconstruction block of the first bit-depth by using the prediction block and the residue of the first bit-depth.

When the video decoding apparatus 20 inter predicts the current block, the video decoding apparatus 20 may generate the prediction block of the current block by using a block that is previously decoded at a second bit-depth. In this regard, the second bit-depth indicates a bit-depth different from the first bit-depth. For example, the first bit-depth may be higher than the second bit-depth.

In more detail, after the video decoding apparatus 20 generates the prediction block of the current block of which bit depth is the second bit-depth by using an image that is previously decoded at the second bit-depth, the video decoding apparatus 20 may generate a prediction block of which bit-depth is the first bit-depth by using the prediction block of the second bit-depth. That is, the video decoding apparatus 20 may change the prediction block of the second bit-depth to the first bit-depth, thereby generating the prediction block of the first bit-depth.

When the video decoding apparatus 20 according to an embodiment intra predicts the current block, the video decoding apparatus 20 generates the prediction block of the first bit-depth by using a block that is previously decoded at the first bit-depth higher than the second bit-depth that is processible based on a processing capability of the video decoding apparatus 20. Thus, the video decoding apparatus 20 obtains the bitstream including the residue of the first bit-depth higher than the second bit-depth that is processible based on the processing capability of the video decoding apparatus 20, so that an image-quality deterioration phenomenon that may occur in reconstruction of an image may be minimized.

A bit-depth that is supported in inter prediction is proportional to power consumption of the video decoding apparatus. When the video decoding apparatus 20 performs inter prediction, the video decoding apparatus 20 generates the prediction block of the second bit-depth by using an image that is previously decoded at the second bit-depth. Because the video decoding apparatus 20 uses the second bit-depth that is lower than the first bit-depth, when the video decoding apparatus 20 performs inter prediction, power consumption may be sharply reduced compared to a case of using the first bit-depth.

Figure 2A:
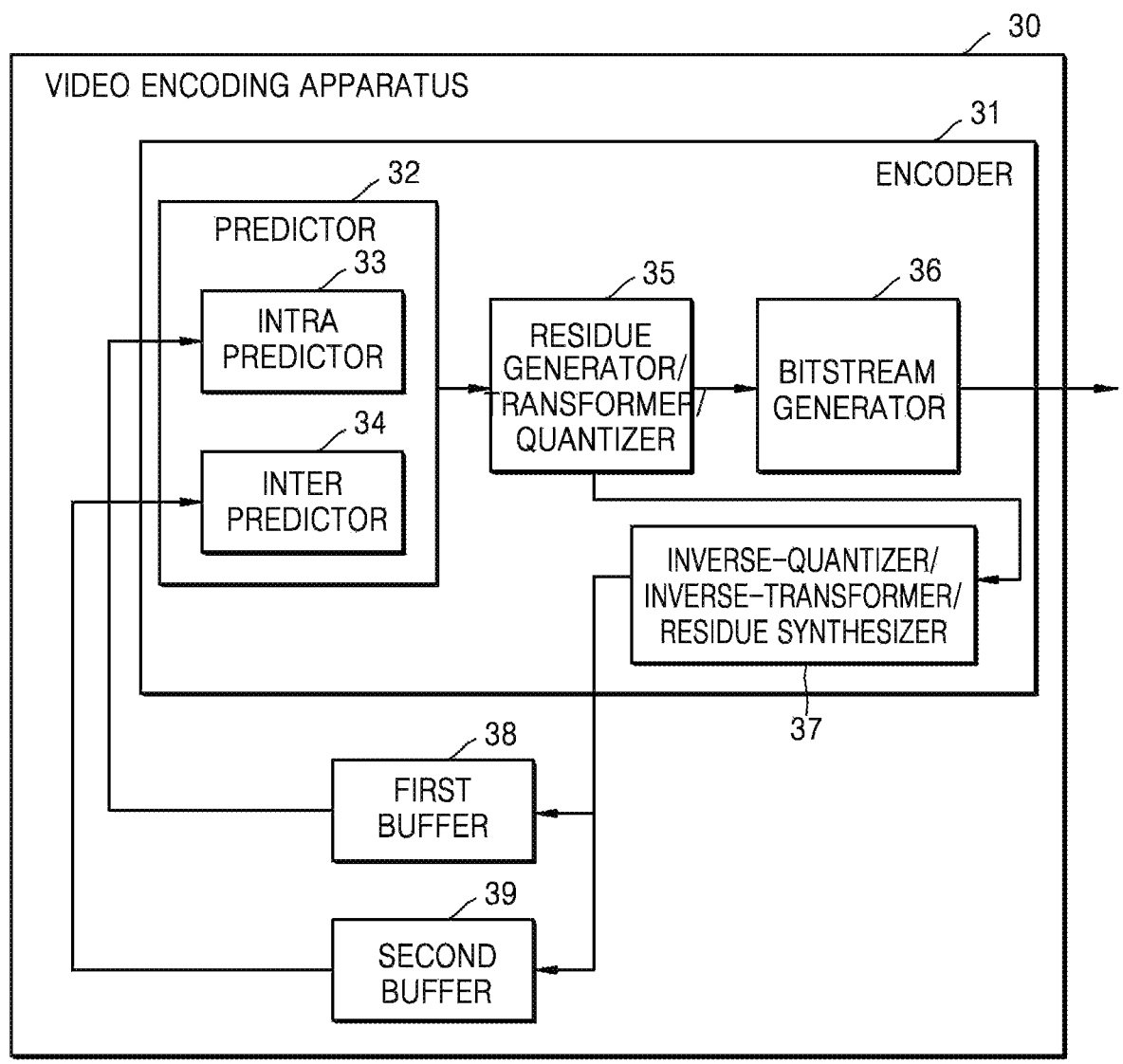
FIG. 2A is a block diagram of a video encoding apparatus, according to another embodiment.

FIG. 2A is a block diagram of a video encoding apparatus, according to another embodiment.

Referring to FIG. 2A, a video encoding apparatus 30 according to an embodiment includes an encoder 31, a first buffer 38, and a second buffer 39.

The encoder 31 may include a predictor 32, a residue generator/transformer/quantizer 35, a bitstream generator 36, an inverse-quantizer/inverse-transformer/residue synthesizer 37, the first buffer 38, and the second buffer 39. The predictor 32 may generate a prediction block of a current block by using an image that is decoded before a current image. Alternatively, the predictor 32 may generate a prediction block of the current image by using a block that is included in the current image and is from among blocks decoded before the current block.

In order to minimize an amount of data to be encoded, the predictor 32 may perform prediction on the current block by using a reconstruction block that is spatially adjacent to the current block or using a reconstruction image that is temporally adjacent to the current block.

The predictor 32 may include an intra predictor 33 and an inter predictor 34.

The intra predictor 33 may generate the prediction block of the current block by using neighboring blocks that are located adjacent to the current block and are from among previously-decoded blocks. For example, the intra predictor 33 may determine a reference pixel to be referenced from among pixels adjacent to the left of the current block and pixels adjacent to the top of the current block.

For example, the intra predictor 33 may determine the reference pixel from among the neighboring pixels according to reference directions. That is, the intra predictor 33 may determine, from among various reference directions, an optimal reference direction in which a correlation with respect to the current block is high in consideration of a Rate-Distortion Cost (RD cost), and may accordingly determine the reference pixel from among the neighboring pixels.

When the intra predictor 33 intra predicts the current block, the intra predictor 33 may generate the prediction block of the current block by using a block that is previously decoded at a first sampling rate and then is stored in the first buffer 38. For example, the intra predictor 33 may generate the prediction block of the current block by using the block that is previously decoded at a luma-chroma sampling ratio of 4:2:2 and then is stored in the first buffer 38. In this regard, a sampling rate of the generated prediction block may be the same sampling rate as the sampling rate of the block that is previously decoded and then is stored in the first buffer 38.

In order to reduce chroma sample information compared to luma sample information, a chroma component may be sampled at a sampling rate lower than a luma component. A scheme of sampling the chroma component at the sampling rate lower than the luma component so as to reduce the chroma sample information compared to the luma sample information is called chroma sub-sampling. When the chroma sub-sampling is performed, the chroma sub-sampling may be performed based on a luma-chroma sampling ratio.

The luma-chroma sampling ratio indicates a ratio of a sampling rate of the luma component to a sampling rate of the chroma component.

Examples of the luma-chroma sampling ratio are 4:2:2, 4:2:0, and 4:4:4. In this regard, 4:4:4 means that the luma component is sampled at the same sampling rate as the chroma component, and 4:2:2 means that the chroma component is sampled at a half of a sampling rate of the luma component. In this regard, a sampling rate of horizontal chroma is halved. 4:2:0 means that the chroma component is sampled at a quarter of the sampling rate of the luma component. In this regard, each of horizontal chroma sampling rate and vertical chroma sampling rate is halved.

The inter predictor 34 may generate the prediction block of the current block by using the image that is decoded before the current image. For example, the inter predictor 34 may determine a reference image from among images decoded before the current image, and may determine a reference block of the reference image, the reference block having a high correlation with the current block.

The inter predictor 34 determines the reference block having a high correlation with the current block, thereby determining motion information such as a motion vector, a reference picture index, picture list information, or the like.

In order to reduce a size of the motion information to be transmitted, the inter predictor 34 may use a correlation of motion information with respect to the current block and a neighboring block of the current block.

For example, the inter predictor 34 may compose a list including neighboring blocks for deriving motion information of the current block, and may transmit only information indicating a predetermined neighboring block in the list, thereby reducing the size of the motion information used in the current block.

When the inter predictor 34 inter predicts the current block, the inter predictor 34 may generate a prediction block of a second sampling rate by using an image that is previously decoded at the second sampling rate. In this regard, the second sampling rate indicates a sampling rate different from the first sampling rate. The first sampling rate may be higher than the second sampling rate.

The inter predictor 34 may generate the prediction block of the first sampling rate by changing the prediction block of the second sampling rate to the first sampling rate.

For example when the inter predictor 34 inter predicts the current block, the inter predictor 34 may generate a prediction block of a luma-chroma sampling ratio of 4:2:0 by using an image that is previously decoded at the luma-chroma sampling ratio of 4:2:0. The inter predictor 34 may change the prediction block of the luma-chroma sampling ratio of 4:2:0 to a prediction block of a luma-chroma sampling ratio of 4:2:2.

A process of changing data of a second sampling rate to a first sampling rate is called upsampling. For example, when upsampling is performed in a manner that a ratio of luma-chroma sampling is increased, the inter predictor 34 generates a sample value of a sampling position based on a first sampling rate by using a sample value of a sampling position based on a second sampling rate, thereby generating a sample of the first sampling rate. The sampling position based on the first sampling rate may include the sampling position and a sub-position based on the second sampling rate. For example, the inter predictor 34 may generate the sample value of the sampling position based on the first sampling rate by using a sample average value at the sampling position based on the second sampling rate.

The residue generator/transformer/quantizer 35 determines a residue indicating a difference between an original image and the prediction block of the current block which is generated by the predictor 32. The residue generator/transformer/quantizer 35 determines the residue indicating the difference between the original image and the prediction block of the first sampling rate. In this regard, the residue may be a residue of the first sampling rate.

The residue generator/transformer/quantizer 35 transforms the residue of the first sampling rate from a spatial domain to a transform domain. The residue generator/transformer/quantizer 35 may quantize the transformed residue of the first sampling rate by using a predetermined quantization parameter. The bitstream generator 36 generates a bitstream including the residue quantized by the generator/transformer/quantizer 35. For example, the bitstream generator 36 may generate the bitstream including the residue of the first sampling rate.

The bitstream generator 36 may generate the bitstream including the residue along with an encoding parameter and the motion information determined in an image encoding process.

The inverse-quantizer/inverse-transformer/residue synthesizer 37 inverse-quantizes the quantized residue. The inverse-quantizer/inverse-transformer/residue synthesizer 37 may inverse-transform the inverse-quantized residue from the transform domain to the spatial domain. The inverse-quantizer/inverse-transformer/residue synthesizer 37 may generate a reconstruction block by using the inverse-quantized residue and the prediction block generated by the predictor 32.

For example, the inverse-quantizer/inverse-transformer/residue synthesizer 37 may generate a reconstruction block of a luma-chroma sampling ratio of 4:2:2 by using the prediction block of the luma-chroma sampling ratio of 4:2:2 and the residue of the luma-chroma sampling ratio of 4:2:2.

The inverse-quantizer/inverse-transformer/residue synthesizer 37 may generate a reconstruction image including reconstruction blocks. For example, the inverse-quantizer/inverse-transformer/residue synthesizer 37 may change the reconstruction block of the first sampling rate to the reconstruction block of the second sampling rate, and may generate a reconstruction image of the second sampling rate which includes the reconstruction block of the second sampling rate.

The first buffer 38 may store the reconstruction block of the first sampling rate. The second buffer 39 may store the reconstruction image of the second sampling rate.

The reconstruction block of the current block which is stored in the first buffer 38 may be used in predicting a block to be encoded after the current block. The reconstruction image including the current block which is stored in the second buffer 39 may be used in predicting an image to be encoded after the current image.

For example, the intra predictor 33 may generate a prediction block of the block to be encoded after the current block, by using the reconstruction block of the first sampling rate which is stored in the first buffer 38. The inter predictor 34 may generate a prediction block of the image to be encoded after the current image, by using the reconstruction image of the second sampling rate which is stored in the second buffer 39.

The video encoding apparatus 30 according to an embodiment may include a central processor (not shown) to generally control the predictor 32, the residue generator/transformer/quantizer 35, the bitstream generator 36, the inverse-quantizer/inverse-transformer/residue synthesizer 37, the first buffer 38, and the second buffer 39. Alternatively, the predictor 32, the residue generator/transformer/quantizer 35, the bitstream generator 36, the inverse-quantizer/inverse-transformer/residue synthesizer 37, the first buffer 38, and the second buffer 39 operate due to respective dedicated-processors (not shown), and the processors (not shown) systemically operate with each other so that the entire video encoding apparatus 30 may operate. Alternatively, the predictor 12, the residue generator/transformer/quantizer 15, the bitstream generator 16, the inverse-quantizer/inverse-transformer/residue synthesizer 17, the first buffer 18, and the second buffer 19 may be controlled by the control of an external processor (not shown) of the video encoding apparatus 10 according to an embodiment.

Alternatively, the predictor 32, the residue generator/transformer/quantizer 35, the bitstream generator 36, the inverse-quantizer/inverse-transformer/residue synthesizer 37, the first buffer 38, and the second buffer 39 may be controlled by the control of an external processor (not shown) of the video encoding apparatus 30 according to an embodiment.

The video encoding apparatus 30 according to an embodiment may include one or more data storages (not shown) in which input and output data of the predictor 32, the residue generator/transformer/quantizer 35, the bitstream generator 36, the inverse-quantizer/inverse-transformer/residue synthesizer 37, the first buffer 38, and the second buffer 39 are stored. The video encoding apparatus 30 may include a memory controller (not shown) to manage data input and output of the data storages (not shown).

In order to output a video encoding result, the video encoding apparatus 30 according to an embodiment may operate in cooperation with an internal video encoding processor installed therein or an external video encoding processor so as to perform video encoding operations including transformation.

The internal video encoding processor of the video encoding apparatus 30 according to an embodiment may perform, as a separate processor, the video encoding operation. Also, basic video encoding operations may be realized as the video encoding apparatus 30, a central processing apparatus, or a graphic processing apparatus includes a video encoding processing module.

Figure 2B:
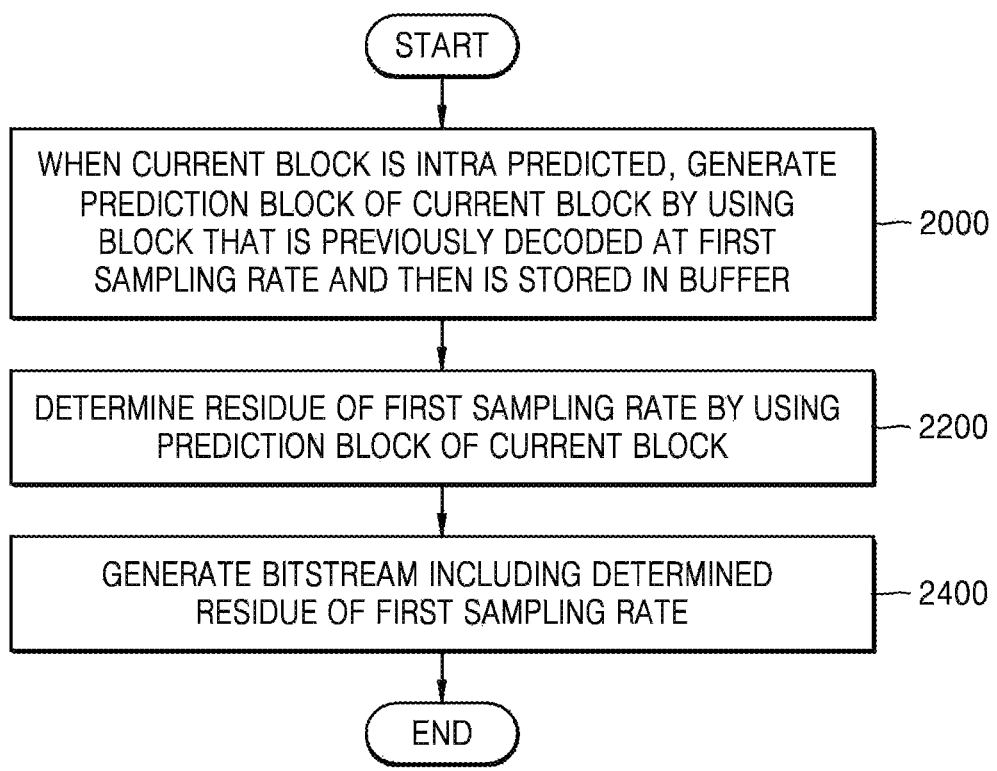
FIG. 2B is a flowchart of a video encoding method, according to another embodiment.

FIG. 2B is a flowchart of a video encoding method, according to another embodiment.

In operation 2000, when the video encoding apparatus 30 intra predicts a current block, the video encoding apparatus 30 may generate a prediction block of the current block by using a block that is previously decoded at a first sampling rate and then is stored in a buffer.

In operation 2200, when the video encoding apparatus 30 intra predicts the current block, the video encoding apparatus 30 determines a residue of the first sampling rate.

In operation 2400, the video encoding apparatus 30 generate a bitstream including the residue of the first sampling rate.

When the video encoding apparatus 30 inter predicts the current block, the video encoding apparatus 30 may generate a prediction block of the current block by using an image that is previously decoded at a second sampling rate. In this regard, the second sampling rate indicates a sampling rate different from the first sampling rate. For example, the first sampling rate may be higher than the second sampling rate. In more detail, the first sampling rate may be a sampling rate based on a luma-chroma sampling ratio of 4:2:2, and the second sampling rate may be a sampling rate based on a luma-chroma sampling ratio of 4:2:0.

After the video encoding apparatus 30 generates the prediction block of the current block of which sampling rate is the second sampling rate by using the image that is previously decoded at the second sampling rate, the video encoding apparatus 30 may generate the prediction block of which sampling rate is the first sampling rate by using the prediction block of the second sampling rate.

That is, the video encoding apparatus 30 may change the prediction block of the second sampling rate to the first sampling rate, thereby generating the prediction block of the first sampling rate.

Figure 2C:
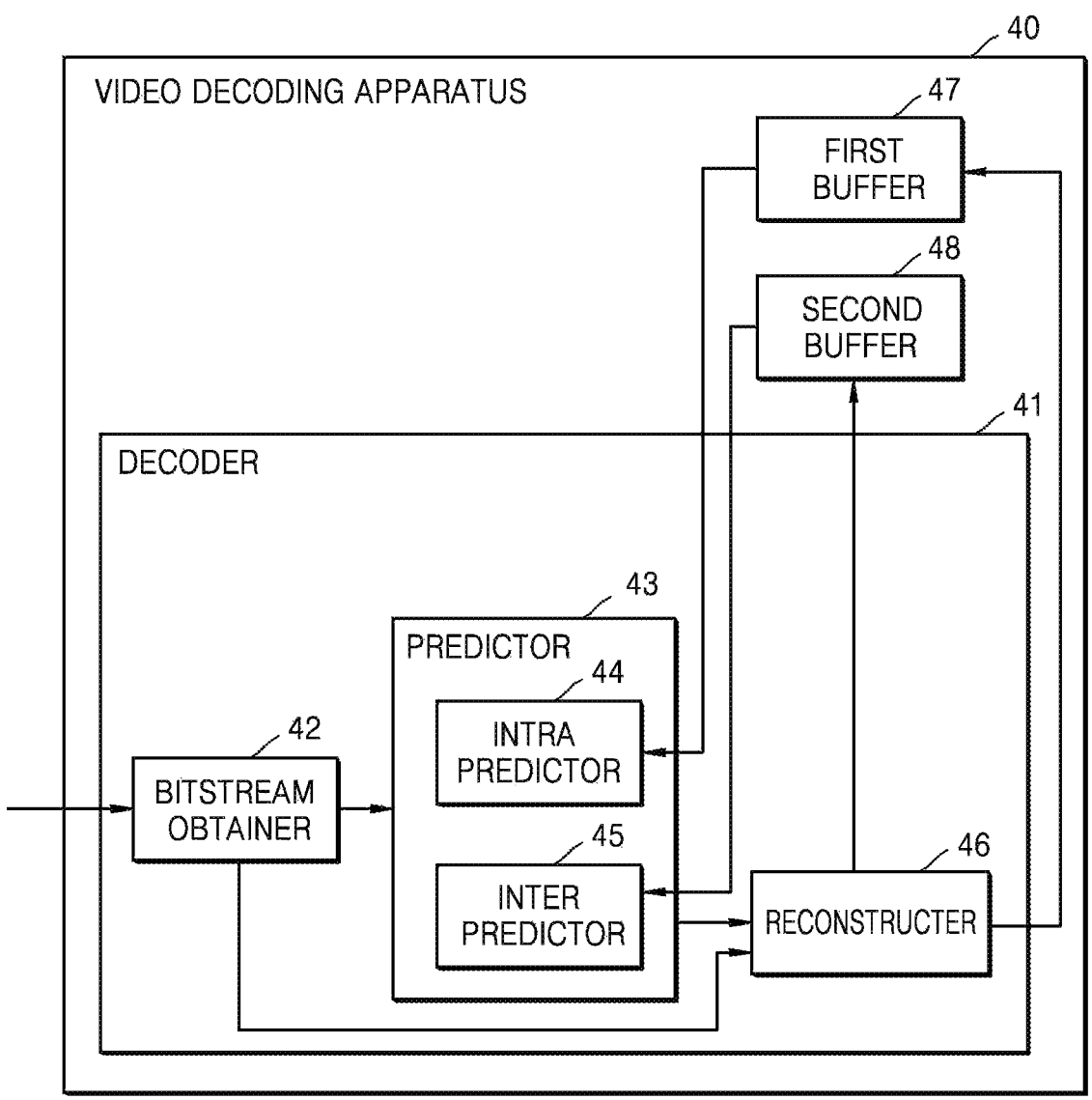
FIG. 2C is a block diagram of a video decoding apparatus, according to an embodiment.

FIG. 2C is a block diagram of a video decoding apparatus, according to an embodiment.

A video decoding apparatus 40 according to an embodiment includes a decoder 41, a first buffer 47, and a second buffer 48.

The decoder 41 may include a bitstream obtainer 42, a predictor 43, and a reconstructor 46.

The bitstream obtainer 42 obtains a bitstream including a residue, an encoding parameter, and motion information.

The predictor 43 may generate a prediction block of a current block by using an image that is decoded before a current image. Alternatively, the predictor 43 may generate the prediction block of the current block by using a block that is from among blocks decoded before the current block and is included in the current image.

The predictor 43 may include an intra predictor 44 and an inter predictor 45.

The intra predictor 44 may generate the prediction block of the current block by using a neighboring block that is located adjacent to the current block and is from among the blocks decoded before the current block. For example, the intra predictor 44 may determine at least one reference pixel to be referenced from among pixels adjacent to the left of the current block and pixels adjacent to the top of the current block, and may generate the prediction block of the current block by using the determined reference pixel.

For example, the intra predictor 44 may obtain a reference direction from the bitstream. Afterward, the intra predictor 44 may determine the reference pixel from among the neighboring blocks by using the obtained reference direction, and may generate the prediction block of the current block by using the determined reference pixel.

When the intra predictor 44 intra predicts the current block, the intra predictor 44 may generate a prediction block of the current block by using a block that is previously decoded at a first sampling rate and then is stored in the first buffer 47. For example, the intra predictor 44 may generate the prediction block of the current block by using a block that is previously decoded at a luma-chroma sampling ratio of 4:2:2 and then is stored in the first buffer 47. In this regard, a luma-chroma sampling ratio of the generated prediction block may be the luma-chroma sampling ratio equal to the luma-chroma sampling ratio of the block that is previously decoded and stored in the first buffer 47.

The inter predictor 45 may generate a prediction block of a current block by using an image that is decoded before the current image. For example, the inter predictor 45 may obtain motion information including a motion vector, a reference picture index, and picture list information from the bitstream.

The inter predictor 45 may determine, by using the motion information, a picture list from among picture lists including images decoded before the current image, may determine a reference image from among images included in the determined picture list, and may determine a reference block of the reference image which is to be used in predicting the current block. The inter predictor 45 may determine the prediction block of the current block by using the reference block.

The inter predictor 45 determines a list including neighboring blocks for deriving the motion information, and obtains, from the bitstream, information indicating a neighboring block from among the neighboring blocks included in the list. The inter predictor 45 may determine the neighboring block by using the information indicating the neighboring block from among the neighboring blocks included in the list, and may determine motion the information of the current block by using motion information of the determined neighboring block. That is, the inter predictor 45 may determine the motion vector, the reference picture index, and the picture list information of the current block.

When the inter predictor 45 inter predicts the current block, the inter predictor 45 may generate a prediction block of a second sampling rate by using the image that is previously decoded at the second sampling rate. The inter predictor 45 may change the prediction block of the second sampling rate to a first sampling rate, thereby generating a prediction block of the first sampling rate. For example, when the inter predictor 45 inter predicts the current block, the inter predictor 45 may generate a prediction block of a luma-chroma sampling ratio of 4:2:0 by using an image that is previously decoded at the luma-chroma sampling ratio of 4:2:0. The inter predictor 45 may change the prediction block of the luma-chroma sampling ratio of 4:2:0, thereby generating a prediction block of a luma-chroma sampling ratio of 4:2:2. When the inter predictor 45 changes the second sampling rate to the first sampling rate, the inter predictor 45 may perform upsampling. For example, when upsampling is performed in a manner that a ratio of luma-chroma sampling is increased, the inter predictor 44 generates a sample value of a sampling position based on the first sampling rate by using a sample value of a sampling position based on the second sampling rate, thereby generating a sample of the first sampling rate. The sampling position based on the first sampling rate may include the sampling position and a sub-position based on the second sampling rate. For example, the inter predictor 44 may generate the sample value of the sampling position based on the first sampling rate by using a sample average value at the sampling position based on the second sampling rate which is adjacent to the sampling position based on the first sampling rate.

The reconstructor 46 may obtain the residue of the first sampling rate from the obtained bitstream. In more detail, the reconstructor 46 may inverse-quantize the bitstream, thereby obtaining the inverse-quantized residue of the first sampling rate, and may inverse-transform the inverse-quantized residue of the first sampling rate from a transform domain to a spatial domain, thereby obtaining the inverse-transformed residue of the first sampling rate.

The reconstructor 46 may generate a reconstruction block of the current block by using the residue of the first sampling rate and the prediction block of the current block which is generated by the predictor 43.

In this regard, a sampling rate of the prediction block may be the first sampling rate. Also, a sampling rate of the reconstruction block may be the first sampling rate.

The reconstructor 46 may generate a reconstruction image including reconstruction blocks.

For example, when the reconstructor 46 generates the reconstruction image, the reconstructor 46 may change reconstruction blocks of the first sampling rate to reconstruction blocks of the second sampling rate, and may generate the reconstruction image of the second sampling rate, the reconstruction image including the reconstruction blocks that are changed to the second sampling rate.

The first buffer 47 may store the reconstruction block generated by the reconstructor 46. The second buffer 48 may store the reconstruction image of the second sampling rate. The reconstruction block stored in the first buffer 47 may be used in intra predicting a block to be encoded after the current block.

The reconstruction image stored in the second buffer 48 may be used in inter predicting a block included in an image to be encoded after the current image.

For example, the intra predictor 44 may generate a prediction block of a block to be encoded after the current block, by using the reconstruction block of the first sampling rate stored in the first buffer 47. The inter predictor 45 may generate a prediction block of an image to be encoded after the current block, by using the reconstruction image of the second sampling rate stored in the second buffer 48.

The video decoding apparatus 40 according to an embodiment may include a central processor (not shown) to generally control the bitstream obtainer 42, the predictor 43, the reconstructor 46, the first buffer 47, and the second buffer 48. Alternatively, the bitstream obtainer 42, the predictor 43, the reconstructor 46, the first buffer 47, and the second buffer 48 operate due to respective dedicated-processors (not shown), and the processors (not shown) systemically operate with each other so that the entire video decoding apparatus 40 may operate. Alternatively, the bitstream obtainer 42, the predictor 43, the reconstructor 46, the first buffer 47, and the second buffer 48 may be controlled by the control of an external processor (not shown) of the video decoding apparatus 40 according to an embodiment.

The video decoding apparatus 40 according to an embodiment may include one or more data storages (not shown) in which input and output data of the bitstream obtainer 42, the predictor 43, the reconstructor 46, the first buffer 47, and the second buffer 48 are stored. The video decoding apparatus 40 may include a memory controller (not shown) to manage data input and output of the data storages (not shown).

In order to reconstruct a video through video decoding, the video decoding apparatus 40 according to an embodiment may operate in cooperation with an internal video decoding processor installed therein or an external video decoding processor so as to perform video decoding operations. The internal video decoding processor of the video decoding apparatus 40 according to an embodiment may perform, as a separate processor, basic video decoding operations. Also, the basic video encoding operations may be realized as the video decoding apparatus 40, a central processing apparatus, or a graphic processing apparatus includes a video decoding processing module.

Figure 2D:
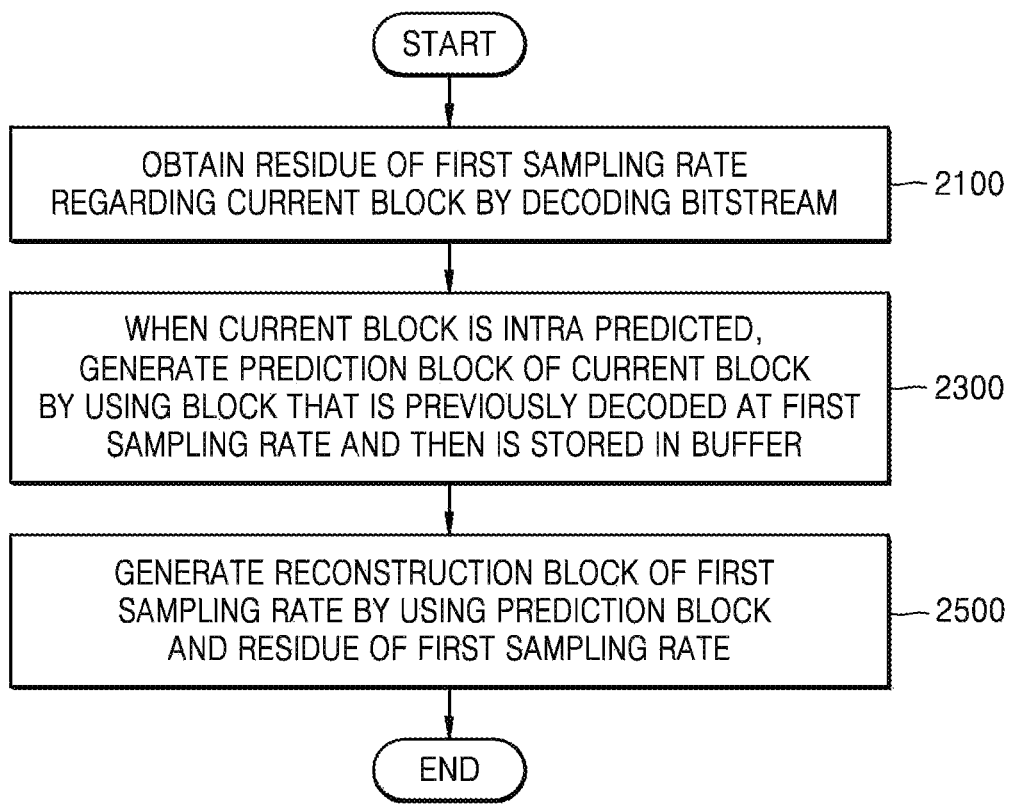
FIG. 2D is a flowchart of a video decoding method, according to an embodiment.

FIG. 2D is a flowchart of a video decoding method, according to an embodiment.

In operation 2100, when the video decoding apparatus 40 intra predicts a current block, the video decoding apparatus 40 generates a prediction block of the current block by using a block that is previously decoded at a first sampling rate and then is stored in a buffer.

In operation 2300, the video decoding apparatus 40 determines a residue of the first sampling rate by using the prediction block of the current block.

In operation 2500, the video decoding apparatus 40 generates a bitstream including the determined residue of the first sampling rate.

When the video decoding apparatus 40 inter predicts the current block, the video decoding apparatus 40 may generate the prediction block of the current block by using a block that is previously decoded at a second sampling rate. In this regard, the second sampling rate indicates a sampling rate different from the first sampling rate. For example, the first sampling rate may be higher than the second sampling rate.

After the video decoding apparatus 40 generates the prediction block of the current block of which sampling rate is the second sampling rate by using an image that is previously decoded at the second sampling rate, the video decoding apparatus 40 may generate a prediction block of which sampling rate is the first sampling rate by using the prediction block of the second sampling rate. That is, the video decoding apparatus 40 may change the prediction block of the second sampling rate to the first sampling rate, thereby generating the prediction block of the first sampling rate.

When the video decoding apparatus 40 according to an embodiment intra predicts the current block, the video decoding apparatus 40 generates the prediction block of the first sampling rate by using a block that is previously decoded at the first sampling rate higher than the second sampling rate that is processible based on a processing capability of the video decoding apparatus 40.

Thus, the video decoding apparatus 40 obtains the bitstream including the residue of the first sampling rate higher than the second sampling rate that is processible based on the processing capability of the video decoding apparatus 40, so that an image-quality deterioration phenomenon that may occur in reconstruction of an image may be minimized.

When inter prediction is performed based on the processing capability of the video decoding apparatus 40, a processible sampling rate is proportional to power consumption of a video decoding apparatus. This is because the sampling rate is proportional to the number of processed samples, and the number of processed samples is proportional to the power consumption used when the inter prediction is performed. When the video decoding apparatus 40 performs the inter prediction, the video decoding apparatus 40 generates the prediction block of the second sampling rate by using the image that is previously decoded at the second sampling rate. Because the video decoding apparatus 40 uses the second sampling rate lower than the first sampling rate during the inter prediction, power consumption may be sharply reduced compared to a case of using the first sampling rate.

Figure 3:
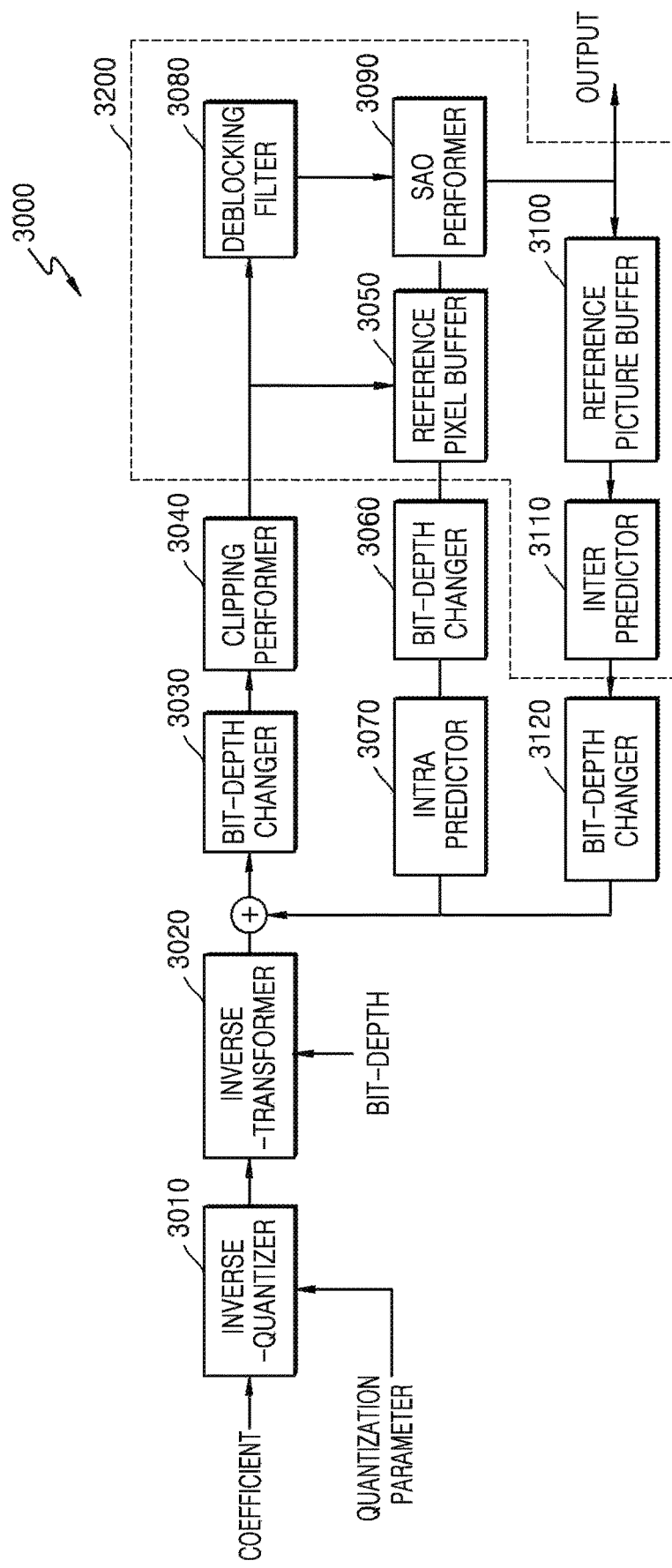
FIG. 3 is a block diagram for describing an operation of a video decoding apparatus that decodes a high bit-depth bitstream, according to an embodiment.

FIG. 3 is a block diagram for describing an operation of a video decoding apparatus that decodes a high bit-depth bitstream, according to an embodiment.

A video decoding apparatus 3000 according to an embodiment may include an inverse-quantizer 3010, an inverse-transformer 3020, a bit-depth changer 3030, a clipping performer 3040, a reference pixel buffer 3050, a bit-depth changer 3060, an intra predictor 3070, a deblocking filter 3080, a sample adaptive offset (SAO) performer 3090, a reference picture buffer 3100, an inter predictor 3110, and a bit-depth changer 3120.

The inverse-quantizer 3010 inverse-quantizes a coefficient included in a current block. The coefficient included in the current block may be obtained from a bitstream.

The inverse-quantizer 3010 may obtain a quantization parameter, and may inverse-quantize the coefficient by using the obtained quantization parameter. For example, the inverse-quantizer 3010 may inverse-quantize the coefficient. When the coefficient of a first bit-depth obtained from the bitstream is inverse-quantized, a transform coefficient of the first bit-depth may be generated. In this regard, the first bit-depth may be 10.

The inverse-transformer 3020 inverse-transforms the inverse-quantized coefficient from a transform domain to a spatial domain, thereby generating the inverse-transformed coefficient. The inverse-transformed coefficient may indicate a residue of respect to the coefficient in the spatial domain. For example, the inverse-transformer 3020 may inverse-transform the inverse-quantized coefficient of the first bit-depth, thereby generating the residue of the first bit-depth.

The residue with respect to the coefficient is determined to be a positive value or a negative value according to a sign bit. Thus, the residue with respect to the inverse-transformed coefficient may be expressed with respect to a bit obtained by adding the sign bit to a bit based on a bit-depth.

A prediction block generated by the intra predictor 3070 may be a prediction block of the first bit-depth. A prediction block generated by the bit-depth changer 3120 through the inter predictor 3110 may be a prediction block of the first bit-depth.

The video decoding apparatus 3000 may reconstruct the coefficient of the first bit-depth by using the prediction block of the first bit-depth and the residue with respect to the inverse-transformed coefficient. That is, the video decoding apparatus 3000 may reconstruct the coefficient of the first bit-depth by summing a sample value of the prediction block of the first bit-depth and a sample value of the residue with respect to the inverse-transformed coefficient.

The video decoding apparatus 3000 may reconstruct the current block of the first bit-depth which includes one or more coefficients reconstructed at the first bit-depth.

The bit-depth changer 3030 may change the current block reconstructed at the first bit-depth to a second bit-depth. Because a sample value expressed with respect to a large number of bits is expressed with respect to a small number of bits, a loss of information may occur. In this regard, the second bit-depth means a depth different from the first bit-depth. The second bit-depth may be lower than the first bit-depth. For example, the second bit-depth may be 8.

The bit-depth changer 3030 performs a right shift operation on the reconstructed coefficient of the first bit-depth, thereby changing the coefficient to a coefficient of the second bit-depth.

When the sample value of the prediction block of the first bit-depth and the sample value of the residue with respect to the inverse-transformed coefficient are summed, a summed sample value may exceed a range of sample values expressed with respect to a bit-depth.

When the reconstructed sample value exceeds a range of sample values expressed with respect to the second bit-depth, the clipping performer 3040 may change the value to a value that is from among values that can be expressed with respect to the second bit-depth and is closest to the sample value. For example, when a reconstructed coefficient of a bit-depth of 8 is 258, the value may be changed to 255 that is closest to 258 and is expressed with respect to a bit-depth of 8.

The reference pixel buffer 3050 may store the coefficient of the second bit-depth. The bit-depth changer 3060 may change the coefficient of the second bit-depth, which is stored in the reference pixel buffer 3050, to the first bit-depth. For example, the bit-depth changer 3060 may change a coefficient of which bit-depth is 8 and is stored in the reference pixel buffer 3050 to a coefficient of which bit-depth is 10.

When the bit-depth changer 3060 changes to a higher bit-depth, the bit-depth changer 3060 may perform a left shift operation on a bit based on a predetermined bit-depth, and may allocate 0 to an empty space created due to the shift operation, thereby changing a bit-depth.

The intra predictor 3070 may intra predict the current block by using a previously-reconstructed coefficient. In this regard, a prediction block of the current block may be generated by using the coefficient changed to the first bit-depth by the bit-depth changer 3060.

The deblocking filter 3080 performs deblocking filtering on reconstruction blocks of the current block, the reconstruction blocks including reconstructed coefficients. In this regard, deblocking filtering means filtering performed on boundaries of reconstruction blocks so as to improve blocking deterioration that is a distortion phenomenon in which discontinuities occur according to values of quantization parameters at the boundaries of the reconstruction blocks.

In this regard, the deblocking filter 3080 performs deblocking filtering on the reconstruction blocks including the coefficients reconstructed at the second bit-depth.

The SAO performer 3090 adjusts sample values of deblocking-filtered blocks, thereby reconstructing an image close to an original image. The SAO performer 3090 adjusts the sample values of the reconstruction blocks that are deblocking filtered at the second bit-depth by the deblocking filter 3080, thereby reconstructing an image close to the original image. In this regard, the image that is reconstructed at the second bit-depth is output.

The reference picture buffer 3100 stores the reconstruction image including the sample values adjusted by the SAO performer 3090. For example, the reference picture buffer 3100 may store the reconstruction image of the second bit-depth.

The inter predictor 3110 generates the prediction block of the current block included in a current image, by using the image that is decoded before the current image and then is stored in the reference picture buffer 3100. The inter predictor 3110 inter predicts the current block by using the reconstruction image of the second bit-depth which is stored in the reference picture buffer 3100.

The bit-depth changer 3120 changes the prediction block of the second bit-depth, which is changed by the inter predictor 3110, to the first bit-depth.

The prediction blocks of the current block generated by the intra predictor 3070 and the bit-depth changer 3120 may all correspond to the first bit-depth. Thus, a block may be reconstructed at the first bit-depth by using the prediction blocks of the first bit-depth and the inverse-transformed coefficient.

A region 3200 indicates an area that is processible at the second bit-depth. That is, because the region 3200 is processed at the second bit-depth, some modules processing at the second bit-depth which are included in a low-cost video decoding apparatus may be reused.

If the inter predictor 3110 included in the region 3200 does not use a reconstruction image of the second bit-depth but uses an image reconstructed at the first bit-depth, power consumption by the inter predictor 3110 that uses a bus interface is sharply increased. Equally, because modules such as the deblocking filter 3080 and the SAO performer 3090 also use the bus interface, if blocks reconstructed at the second bit-depth are used, required power consumption is sharply increased. Thus, when an operation is performed at a low bit-depth in the region 3200 that uses a considerable amount of power, efficiency of power consumption may be increased.

Figure 4:
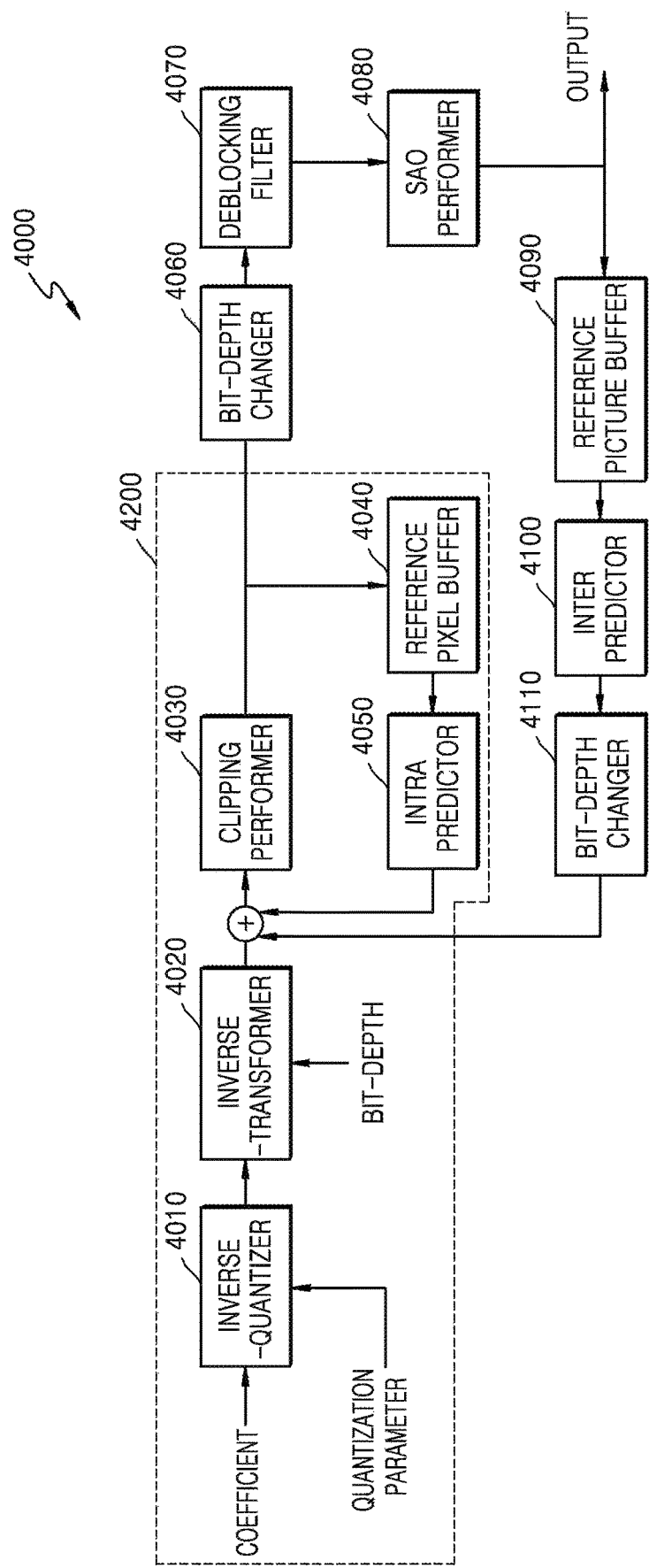
FIG. 4 is a block diagram for describing an operation of a video decoding apparatus that decodes a high bit-depth bitstream, according to another embodiment.

FIG. 4 is a block diagram for describing an operation of a video decoding apparatus that decodes a high bit-depth bitstream, according to another embodiment.

When the video decoding apparatus 3000 illustrated in FIG. 3 intra predicts a current block, the video decoding apparatus 3000 changes blocks, which are previously decoded at a lower second bit-depth and then are stored, to a high first bit-depth, and performs intra prediction by using the changed blocks of the first bit-depth. In this regard, because a bit-depth of the block stored in a reference pixel buffer is decreased, information is lost, and even if it is changed to the first bit-depth, the lossy information cannot be restored. Thus, a prediction block generated through the intra prediction has a low correlation with an original block, an image-quality deterioration phenomenon occurs, in which an image quality significantly deteriorates compared to an image quality of an image reconstructed through intra prediction using a block that is previously decoded at the first bit-depth.

Referring to FIG. 4, unlike to FIG. 3, a region 4200 in which an operation is performed at a first bit-depth includes a reference pixel buffer 4040 and an intra predictor 4050. That is, the intra predictor 4050 generates a prediction block of a current block by using a reconstruction block of a first bit-depth which is stored in the reference pixel buffer 4040. Unlike to the reference pixel buffer 3050 illustrated in FIG. 3, the reference pixel buffer 4040 does not store a reconstruction block changed to a second bit-depth but stores the reconstruction block of the first bit-depth.

Because the intra predictor 4050 generates a prediction block of the first bit-depth by using a block of the first bit-depth, the block being previously reconstructed and then stored in the reference pixel buffer 4040, an image-quality deterioration phenomenon of an image may be minimized.

Because only some modules among modules included in a video decoding apparatus 4000 operate at the first bit-depth, costs may be reduced by changing only some modules of a video decoding apparatus which support a second bit-depth. In addition, an inter predictor 4100, a deblocking filter 4070, and a SAO performer 4080 which occupy a considerable portion in power consumption by using a bus interface perform a process at a second bit-depth, so that an apparatus of a low power consumption may be embodied.

Referring to FIG. 4, the video decoding apparatus 4000 according to an embodiment may include an inverse-quantizer 4010, an inverse-transformer 4020, a clipping performer 4030, the reference pixel buffer 4040, an intra predictor 4050, a bit-depth changer 4060, the deblocking filter 4070, the SAO performer 4080, a reference picture buffer 4090, the inter predictor 4100, and a bit-depth changer 4110.

The inverse-quantizer 4010 inverse-quantizes a block including at least one coefficient obtained from a bitstream. The inverse-quantizer 4010 may obtain a quantization parameter, and may inverse-quantize the coefficient by using the obtained quantization parameter. The quantization parameter may be obtained from the bitstream.

For example, the inverse-quantizer 4010 may inverse-quantize the coefficient of a first bit-depth included in the bitstream, thereby obtaining the inverse-quantized coefficient of the first bit-depth. The inverse-quantized coefficient of the first bit-depth may be a transform coefficient of the first bit-depth.

The inverse-transformer 4020 inverse-transforms the inverse-quantized coefficient from a transform domain to a spatial domain, thereby generating the inverse-transformed coefficient. In this regard, the inverse-transformed coefficient may indicate a residue with respect to a coefficient.

For example, the inverse-transformer 4020 inverse-transforms the inverse-quantized coefficient from the transform domain to the spatial domain, thereby generating the inverse-transformed coefficient of the first bit-depth. In this regard, the first bit-depth may be 10. The inverse-transformed coefficient may indicate the residue with respect to the coefficient of the first bit-depth in the spatial domain. In this regard, the first bit-depth of the inverse-transformed coefficient may be 10. The residue with respect to the coefficient obtained after inverse-transformation is determined to have a positive value or a negative value according to a sign bit. Thus, the residue with respect to the inverse-transformed coefficient may be expressed with respect to a bit obtained by adding the sign bit to a bit based on a bit-depth.

The prediction block generated by the intra predictor 4050 may be a prediction block of the first bit-depth. In addition, a prediction block generated by the bit-depth changer 4110 through the inter predictor 4100 may be a prediction block of the first bit-depth.

The video decoding apparatus 4000 may reconstruct the coefficient of the first bit-depth by using the prediction block of the first bit-depth and the residue with respect to the inverse-transformed coefficient. The video decoding apparatus 4000 may reconstruct the coefficient of the first bit-depth by summing a sample value of the prediction block of the first bit-depth and a sample value of the residue with respect to the inverse-transformed coefficient. The video decoding apparatus 4000 may reconstruct the block of the first bit-depth which includes one or more coefficients reconstructed at the first bit-depth.

When the sample value of the prediction block of the first bit-depth and the sample value of the residue with respect to the inverse-transformed coefficient are summed, a summed sample value may exceed a range of sample values expressed with respect to a bit-depth.

When the summed sample value exceeds the range of the sample values expressed with respect to the bit-depth, the clipping performer 4030 may change the value to a value that is from among values that can be expressed with respect to the bit-depth and is closest to the sample value. When the summed sample value exceeds a range of sample values expressed with respect to the bit-depth, the clipping performer 4030 may change the value to a value that is from among values that can be expressed with respect to the first bit-depth and is closest to the sample value.

For example, when a reconstructed coefficient of a first bit-depth is 1028, the value may be changed to 1023 that is closest to 1028 and is expressed with respect to a bit-depth of 10.

The reference pixel buffer 4040 may store the coefficient reconstructed at the first bit-depth. The reference pixel buffer 4040 may store a block including the at least one coefficient reconstructed at the first bit-depth.

The intra predictor 4050 may reconstruct the current block by using the coefficient that is previously reconstructed and then is stored in the reference pixel buffer 4040.

The bit-depth changer 4060 may change the coefficient reconstructed at the first bit-depth to the second bit-depth. Because a sample value expressed with respect to a large number of bits is expressed with respect to a small number of bits, a loss of information may occur. For example, the bit-depth changer 4060 performs a right shift operation on the reconstructed coefficient of the first bit-depth, thereby changing the coefficient to a coefficient of the second bit-depth.

The deblocking filter 4070 performs deblocking filtering on reconstruction blocks including reconstructed coefficients. In this regard, the deblocking filter 4070 performs deblocking filtering on reconstruction blocks including coefficients reconstructed at the second bit-depth.

The SAO performer 4080 adjusts sample values of deblocking-filtered blocks, thereby reconstructing an image close to an original image. The SAO performer 4080 adjusts the sample values of the reconstruction blocks that are deblocking filtered at the second bit-depth by the deblocking filter 4070, thereby reconstructing an image close to the original image. In this regard, the image that is reconstructed at the second bit-depth is output.

The reference picture buffer 4090 stores the reconstruction image including the sample values adjusted by the SAO performer 4080. For example, the reference picture buffer 4090 may store the reconstruction image of the second bit-depth.

The inter predictor 4100 generates the prediction block of the current block by using the image stored in the reference picture buffer 4090. The inter predictor 4100 inter predicts the current block by using the reconstruction image of the second bit-depth which is stored in the reference picture buffer 4090. The bit-depth changer 4110 changes the prediction block of the second bit-depth, which is changed by the inter predictor 4100, to the first bit-depth.

Bit-depths of the prediction blocks generated by the intra predictor 4050 and the bit-depth changer 4110 may all correspond to the first bit-depth. Thus, the block of the first bit-depth may be reconstructed by using the prediction blocks of the first bit-depth and the inverse-transformed coefficient.

Figure 5:
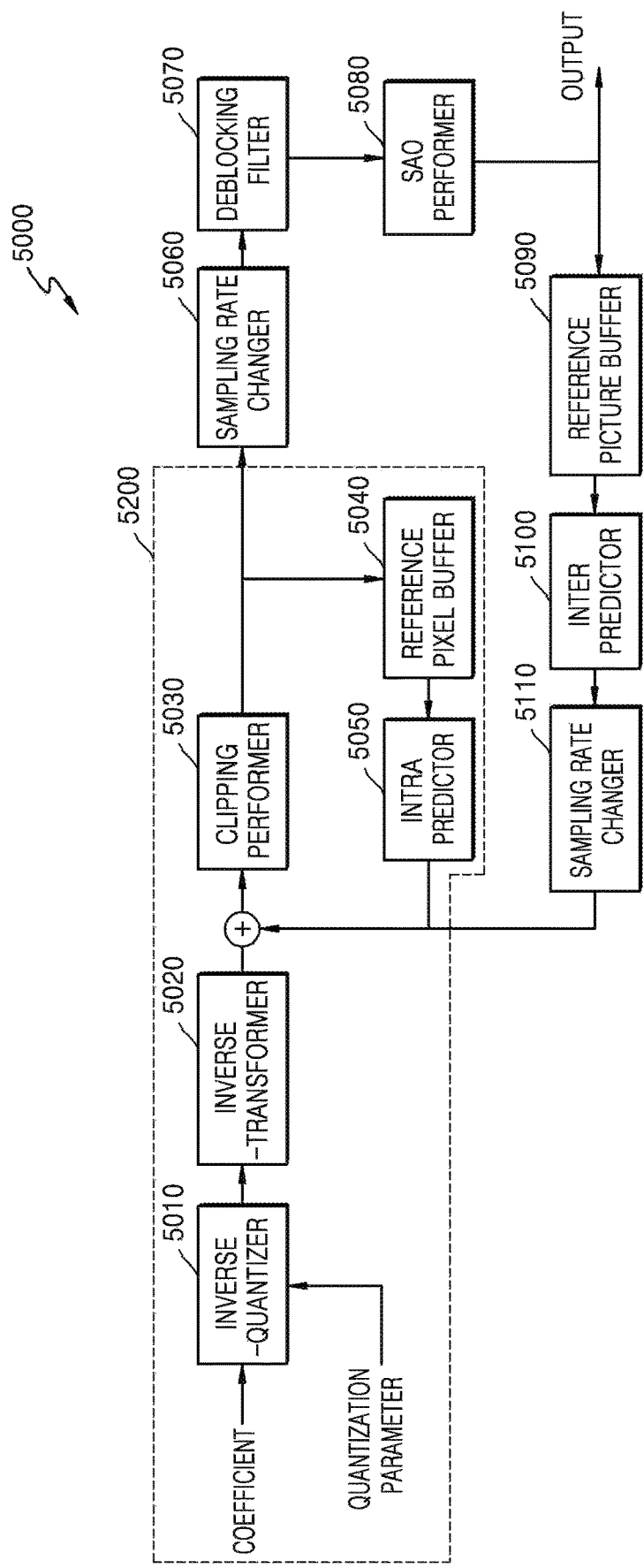
FIG. 5 is a block diagram for describing an operation of a video decoding apparatus that decodes a high sampling rate bitstream, according to another embodiment.

FIG. 5 is a block diagram for describing an operation of a video decoding apparatus that decodes a high sampling rate bitstream, according to another embodiment.

Referring to FIG. 5, a video decoding apparatus 5000 according to an embodiment may include an inverse-quantizer 5010, an inverse-transformer 5020, a clipping performer 5030, a reference pixel buffer 5040, an intra predictor 5050, a sampling rate changer 5060, a deblocking filter 5070, a SAO performer 5080, a reference picture buffer 5090, an inter predictor 5100, and a sampling rate changer 5110.

The inverse-quantizer 5010 inverse-quantizes a block including a coefficient obtained from a bitstream.

The inverse-quantizer 5010 may obtain a quantization parameter, and may inverse-quantize the coefficient by using the quantization parameter. For example, the inverse-quantizer 5010 may inverse-quantize the coefficient of a first sampling rate which is obtained from the bitstream, thereby obtaining the inverse-quantized coefficient of the first sampling rate. The inverse-quantized coefficient of the first sampling rate may be a transform coefficient of the first sampling rate. The inverse-transformer 5020 inverse-transforms the inverse-quantized coefficient from a transform domain to a spatial domain, thereby generating the inverse-transformed coefficient. In this regard, the inverse-transformed coefficient may indicate a residue with respect to a coefficient in the spatial domain.

For example, the inverse-transformer 5020 inverse-transforms the inverse-quantized coefficient from the transform domain to the spatial domain, thereby generating the residue with respect to the coefficient of the first sampling rate. In this regard, the first sampling rate of the inverse-transformed transform coefficient may be a sampling rate according to a luma-chroma sampling ratio of 4:2:2.

All of prediction blocks generated by the intra predictor 5050 and the inverse-quantizer 5010 may be prediction blocks of the first sampling rate. The video decoding apparatus 5000 may reconstruct the coefficient of the first sampling rate by using the prediction block of the first sampling rate and the residue with respect to the inverse-transformed coefficient. The video decoding apparatus 5000 may reconstruct the coefficient of the first sampling rate by summing a sample value of the prediction block of the first sampling rate and a sample value of the residue with respect to the inverse-transformed coefficient. The video decoding apparatus 5000 may reconstruct the block of the first sampling rate which includes the coefficient of the first sampling rate.

When the sample value of the prediction block of the first sampling rate and the sample value of the residue with respect to the inverse-transformed coefficient are summed, a sample value thereof may exceed a range of sample values expressed with respect to a predetermined bit-depth.

When the sample value thereof exceeds the range of the sample values expressed with respect to the predetermined bit-depth, the clipping performer 5030 may change the value to a value that is from among values that can be expressed with respect to the predetermined bit-depth and is closest to the sample value. For example, when a reconstructed coefficient is 1028, the value may be changed to 1023 that is closest to 1028 and is expressed with respect to a predetermined bit-depth of 10.

The reference pixel buffer 5040 may store the coefficient reconstructed at the first sampling rate. For example, the reference pixel buffer 5040 may store the coefficient reconstructed at the luma-chroma sampling ratio of 4:2:2. The intra predictor 5050 may perform intra prediction on the current block by using the coefficient of the first sampling rate which is previously reconstructed and then is stored in the reference pixel buffer 5040.

The sampling rate changer 5060 may change the coefficient reconstructed at the first sampling rate to a second sampling rate. In this regard, a change from a high sampling rate to a low sampling rate is performed in a manner that some samples among samples that are reconstructed at the high sampling rate are not used, thus, a loss of information occurs. In this regard, the second sampling rate means a sampling rate different from the first sampling rate, and the second sampling rate may be lower than the first sampling rate. For example, the second sampling rate may be a luma-chroma sampling ratio of 4:2:0.

For example, the sampling rate changer 5060 may change the first sampling rate to the second sampling rate by performing a downsampling operation so as not to use some samples that are reconstructed at the first sampling rate.

The deblocking filter 5070 performs deblocking filtering on reconstruction blocks including reconstructed coefficients. In this regard, the deblocking filter 5070 performs deblocking filtering on reconstruction blocks including coefficients reconstructed at the second sampling rate.

The SAO performer 5080 adjusts sample values of deblocking-filtered blocks, thereby reconstructing an image close to an original image. The SAO performer 5080 adjusts the sample values of the reconstruction blocks that are deblocking filtered at the second sampling rate by the deblocking filter 5070, thereby reconstructing an image close to the original image. In this regard, the image that is reconstructed at the second sampling rate is output.

The reference picture buffer 5090 stores the reconstruction image including the sample values adjusted by the SAO performer 5080. In this regard, an image stored in the reference picture buffer 5090 may be the image reconstructed at the second sampling rate.

The inter predictor 5100 generates the prediction block of the current block by using the image of the second sampling rate which is stored in the reference picture buffer 5090. The inter predictor 5100 inter predicts the current block by using the reconstruction image of the second sampling rate which is stored in the reference picture buffer 5090.

The sampling rate changer 5110 changes the prediction block of the second sampling rate, which is changed by the inter predictor 5100, to the first sampling rate.

Sampling rates of the prediction blocks generated by the intra predictor 5050 and the sampling rate changer 5110 may all correspond to the first sampling rate. Thus, the block of the first sampling rate may be reconstructed by using the prediction blocks of the first sampling rate and the inverse-transformed coefficient.

A region 5200 in which an operation is performed at the first sampling rate includes the reference pixel buffer 5040 and the intra predictor 5050.

That is, the intra predictor 5050 generates the prediction block of the current block by using the reconstruction block of the first sampling rate which is stored in the reference pixel buffer 5040. The reference pixel buffer 5040 does not store the reconstruction block changed to the second sampling rate but stores the reconstruction block of the first sampling rate. Because the intra predictor 5050 generates the prediction block of the current block by using the reconstruction block of the first sampling rate which is previously decoded and then is stored in the reference pixel buffer 5040, an image-quality deterioration phenomenon of an image may be minimized.

Because only some modules among modules included in the video decoding apparatus 5000 operate at the first sampling rate, costs may be reduced by changelessly using some modules of a video decoding apparatus which are processed at a second sampling rate. In addition, the inter predictor 5100, the deblocking filter 5070, and the SAO performer 5080 which occupy a considerable portion in power consumption by using a bus interface perform a process at a second sampling rate, so that an apparatus of a low power consumption may be embodied.

Figure 6A:
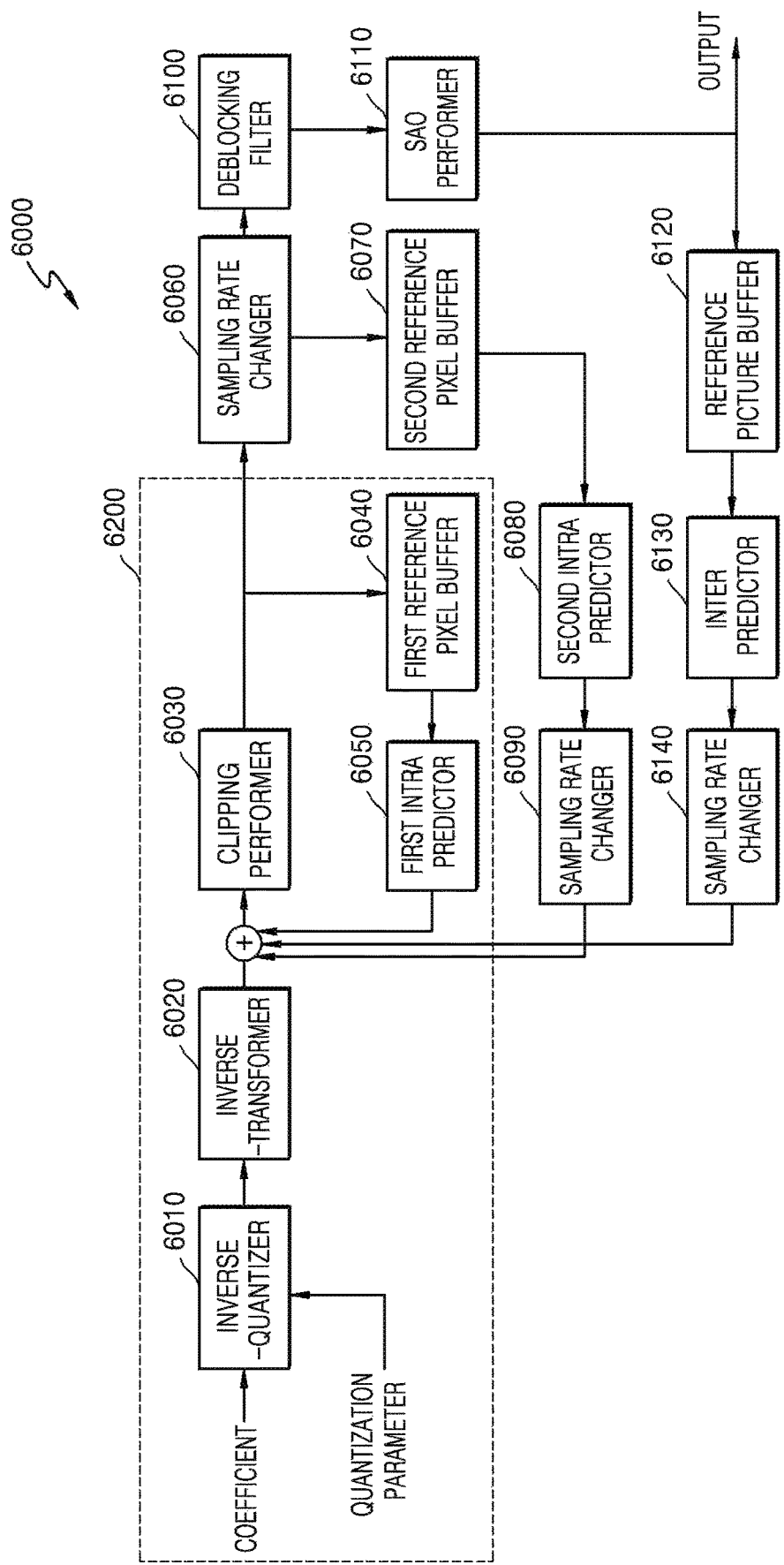
FIGS. 6A through 6E are diagrams for describing a process in which a video decoding apparatus decodes a high sampling rate bitstream while varying an intra prediction scheme according to a type of a pixel to be currently predicted, according to another embodiment.

FIG. 6A is a diagram for describing a process of decoding a high sampling rate bitstream while varying an intra prediction scheme according to a type of a pixel to be currently predicted, according to another embodiment.

Referring to FIG. 6A, unlike the intra predictor 5050 illustrated in FIG. 5, a video decoding apparatus 6000 includes a first intra predictor 6050 and a second intra predictor 6080. In addition, unlike the reference pixel buffer 5040 illustrated in FIG. 5, the video decoding apparatus 6000 includes a first reference pixel buffer 6040 and a second reference pixel buffer 6070. That is, the video decoding apparatus 6000 includes the first intra predictor 6050 and the second intra predictor 6080 which change an intra prediction scheme according to a type of a pixel to be currently predicted. The video decoding apparatus 6000 includes the first reference pixel buffer 6040 and the second reference pixel buffer 6070 which store blocks with different sampling rates.

The first reference pixel buffer 6040 stores a reconstruction block of a first sampling rate. The second reference pixel buffer 6070 stores a block changed from the first sampling rate to a second sampling rate.

When the first intra predictor 6050 intra predicts reference pixels that are from among pixels included in a current pixel and are to be used in a block to be decoded thereafter, the first intra predictor 6050 may predict the reference pixels by using a block that is previously decoded at the first sampling rate and then is stored in the first reference pixel buffer 6040. In this regard, the reference pixels predicted by the first intra predictor 6050 may be predicted at the first sampling rate. For example, the predicted reference pixels may be samples of which luma-chroma sampling ratio is 4:2:2. Detailed descriptions with respect to determining, by the first intra predictor 6050, the reference pixels from among the pixels included in the current block will be provided with reference to FIG. 6B. The pixels excluding the reference pixels may be pixels that are not used in intra predicting the block to be decoded thereafter. Hereinafter, the pixels are referred to as non-reference pixels.

When the second intra predictor 6080 intra predicts the non-reference pixels from among the pixels included in the current block, the second intra predictor 6080 may predict the non-reference pixel by using the block that is previously decoded at the second sampling rate and thus is stored in the second reference pixel buffer 6070. In this regard, the non-reference pixels predicted by the second intra predictor 6080 may be predicted at the second sampling rate. For example, decoded non-reference pixels may be samples of which luma-chroma sampling ratio is 4:2:0. When the second intra predictor 6080 intra predicts the current block, the second intra predictor 6080 may obtain a prediction direction with respect to the current block from a bitstream. The obtained prediction direction may be a prediction direction determined based on the first sampling rate. In order to intra predict the non-reference pixels at the second sampling rate, prediction has to be performed by changing the prediction direction determined based on the first sampling rate. Descriptions with respect to changing, by the second intra predictor 6080, the prediction direction based on the first sampling rate will be described with reference to FIG. 6E.

The video decoding apparatus 6000 according to an embodiment may include an inverse-quantizer 6010, an inverse-transformer 6020, a clipping performer 6030, a sampling rate changer 6060, the first reference pixel buffer 6040, the first intra predictor 6050, the second reference pixel buffer 6070, the second intra predictor 6080, a sampling rate changer 6090, a deblocking filter 6100, a SAO performer 6110, a reference picture buffer 6120, an inter predictor 6130, and a sampling rate changer 6140.

The inverse-quantizer 6010 inverse-quantizes a coefficient obtained from the bitstream. In this regard, the inverse-quantizer 6010 may inverse-quantize the coefficient by using a predetermined quantization parameter. For example, the inverse-quantizer 6010 may inverse-quantize the coefficient of a first sampling rate which is obtained from the bitstream, thereby obtaining the inverse-quantized coefficient of the first sampling rate. The inverse-quantized coefficient of the first sampling rate may be a transform coefficient of the first sampling rate.

The inverse-transformer 6020 inverse-transforms the inverse-quantized coefficient from a transform domain to a spatial domain, thereby generating the inverse-transformed coefficient in the spatial domain. The inverse-transformed coefficient may indicate a residue with respect to the coefficient in the spatial domain.

For example, the inverse-transformer 6020 may inverse-transform the inverse-quantized coefficient of the first sampling rate. In this regard, a sampling rate of the inverse-transformed transform coefficient may be a luma-chroma sampling ratio of 4:2:2.

All prediction blocks generated by the first intra predictor 6050 and the sampling rate changers 6090 and 6140 may be prediction blocks of the first sampling rate. The video decoding apparatus 6000 may reconstruct the coefficient of the first sampling rate by using the prediction block of the first sampling rate and the residue with respect to the inverse-transformed coefficient. The video decoding apparatus 6000 may reconstruct the coefficient of the first sampling rate by summing a sample value of the prediction block of the first sampling rate and a sample value of the residue with respect to the inverse-transformed coefficient. The video decoding apparatus 6000 may reconstruct the block of the first sampling rate which includes one or more coefficients reconstructed at the first sampling rate.

When the sample value of the prediction block of the first sampling rate and the sample value of the residue with respect to the inverse-transformed coefficient are summed, a sample value thereof may exceed a range of sample values expressed with respect to a predetermined bit-depth.

When the sample value thereof exceeds the range of the sample values expressed with respect to the predetermined bit-depth, the clipping performer 6030 may change the value to a value that is from among values that can be expressed with respect to the predetermined bit-depth and is closest to the sample value. For example, when a reconstructed coefficient is 1028, the value may be changed to 1023 that is closest to 1028 and is expressed with respect to a predetermined bit-depth of 10.

The first reference pixel buffer 6040 may store the coefficient reconstructed at the first sampling rate. For example, the first reference pixel buffer 6040 may store the coefficient reconstructed at the luma-chroma sampling ratio of 4:2:2. In this regard, a neighboring pixel (i.e., the reference pixel) of the current block which is usable in predicting the current block and is from among the previously-reconstructed blocks may be the coefficient that is intra predicted and reconstructed at the luma-chroma sampling ratio of 4:2:2, and may be stored in the first reference pixel buffer 6040.

The first intra predictor 6050 may intra predict some pixels included in the current block by using the coefficient of the first sampling rate which is previously reconstructed and then is stored in the first reference pixel buffer 6040.

The sampling rate changer 6060 may change the coefficient reconstructed at the first sampling rate to a second sampling rate. In this regard, a change from a high sampling rate to a low sampling rate is performed in a manner that some samples among samples that are reconstructed at the high sampling rate are discarded, thus, a loss of information occurs.

For example, the sampling rate changer 6060 may change the first sampling rate to the second sampling rate by performing a downsampling operation so as not to use some samples that are reconstructed at the first sampling rate.

The second reference pixel buffer 6070 may store a reconstruction block including the coefficient changed to the second sampling rate by the sampling rate changer 6060.

The second intra predictor 6080 may intra predict some pixels with the second sampling rate included in the current block, by using a coefficient of the second sampling rate which is previously reconstructed and then is stored in the second reference pixel buffer 6070. The sampling rate changer 6090 may change the block, which is predicted at the second sampling rate by the second intra predictor 6080, to the first sampling rate. For example, the sampling rate changer 6090 may reconstruct a block at a luma-chroma sampling ratio of 4:2:2, the block having been predicted at a luma-chroma sampling ratio of 4:2:0.

The deblocking filter 6100 performs deblocking filtering on reconstruction blocks including reconstructed coefficients. In this regard, the deblocking filter 6100 performs deblocking filtering on reconstruction blocks including coefficients reconstructed at the second sampling rate.

The SAO performer 6110 adjusts sample values of deblocking-filtered blocks, thereby reconstructing an image close to an original image. The SAO performer 6110 adjusts the sample values of the reconstruction blocks that are deblocking filtered at the second sampling rate by the deblocking filter 6100, thereby reconstructing an image close to the original image. In this regard, the image that is reconstructed at the second sampling rate is output.

The reference picture buffer 6120 stores the reconstruction image including the sample values adjusted by the SAO performer 6110. In this regard, an image stored in the reference picture buffer 6120 may be the image reconstructed at the second sampling rate.

The inter predictor 6130 generates the prediction block of the current block by using the image of the second sampling rate which is stored in the reference picture buffer 6120.

The sampling rate changer 6140 changes the prediction block of the second sampling rate, which is generated by the inter predictor 6130, to the first sampling rate.

Sampling rates of the prediction blocks generated by the first intra predictor 6050 and the sampling rate changers 6090 and 6140 may be the first sampling rate. Thus, the block may be reconstructed at the first sampling rate by using the prediction block of the first sampling rate and the inverse-transformed transform coefficient.

Referring to FIG. 6A, a region 6200 in which a process is performed at the first sampling rate includes the first reference pixel buffer 6040 and the first intra predictor 6050.

The first intra predictor 6050 generates the reference pixels included in the current block by using the reconstruction block of the first sampling rate which is stored in the first reference pixel buffer 6040. The first reference pixel buffer 6040 does not store the reconstruction block changed to the second sampling rate but stores the reconstruction block of the first sampling rate.

Because the first intra predictor 6050 predicts the reference pixels included in the current block by using the reconstruction block of the first sampling rate which is previously decoded and then is stored in the first reference pixel buffer 6040, an image-quality deterioration phenomenon of an image may be minimized.

In more detail, because the reference pixels are generated by using the reconstruction block of the first sampling rate, an image-quality deterioration phenomenon of an image which occurs in the reference pixels may be minimized, and when intra prediction is performed in a block to be decoded thereafter, the reference pixels decoded at the first sampling rate are used so that an image-quality deterioration phenomenon of an image of the block to be decoded thereafter may be minimized.

The second intra predictor 6080 predicts the non-reference pixels included in the current block by using the reconstruction block of the second sampling rate which is previously decoded and then is stored in the second reference pixel buffer 6070. In this regard, the non-reference pixels indicate pixels that are predicted at the second sampling rate and are not used in intra predicting the block to be decoded thereafter, the pixels being from among pixels included in the current block.

Because the non-reference pixels are predicted at the second sampling rate, the number of predicted samples is decreased compared to a case of performing intra prediction at the first sampling rate as illustrated in FIG. 5, so that computation may be efficiently decreased. Unlike the reference pixels, the non-reference pixels are not used in intra predicting the block to be decoded thereafter, so that an image-quality deterioration phenomenon due to the non-reference pixels may be minimized.

Because only some modules among modules included in the video decoding apparatus 6000 operate at the first sampling rate, costs may be reduced by changelessly using some modules of a video decoding apparatus which are processed at the second sampling rate. In addition, the inter predictor 6130, the deblocking filter 6100, and the SAO performer 6110 which occupy a considerable portion in power consumption by using a bus interface perform a process at the second sampling rate, so that an apparatus of a low power consumption may be embodied.

Figure 6B:
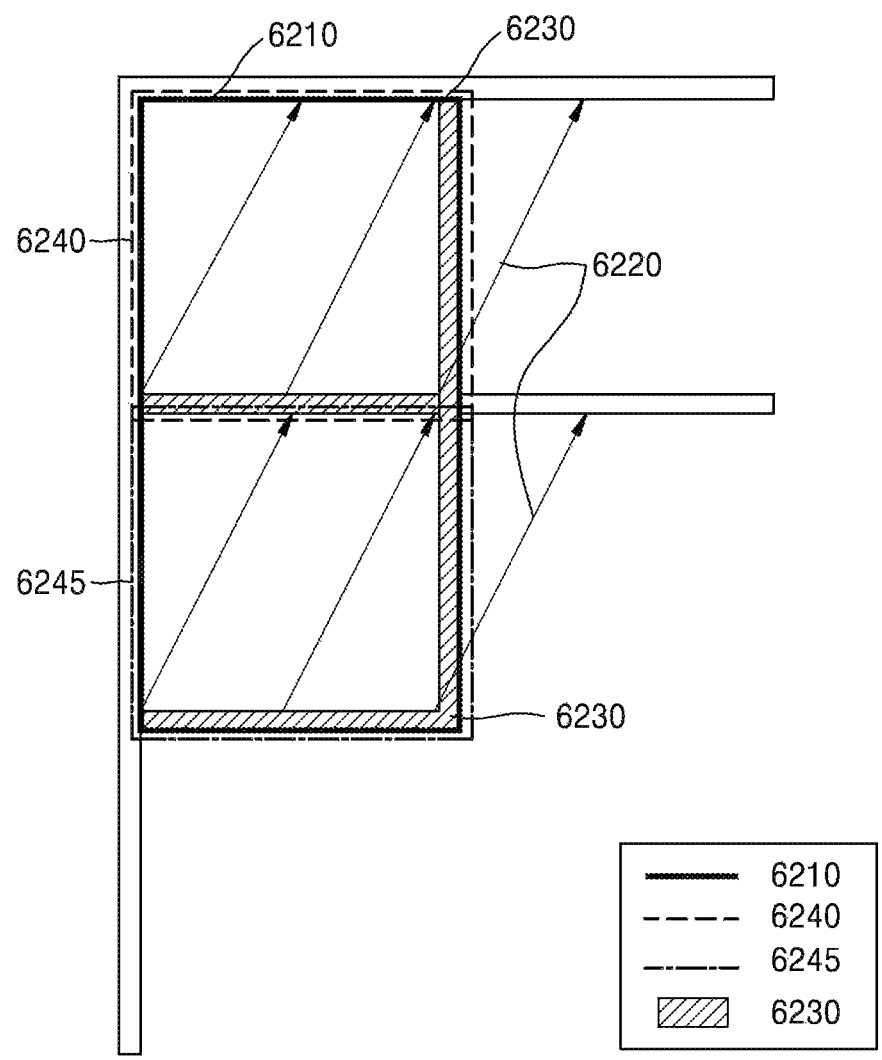

FIG. 6B is a diagram for describing a process of determining a reference pixel that is usable in intra predicting a block to be decoded thereafter, according to another embodiment. It is assumed that the video decoding apparatus 6000 performs intra prediction so as to reconstruct a current block 6210. (In this regard, a current block may be a block of a chroma component.)

Referring to FIG. 6B, the video decoding apparatus 6000 may intra predict a current block by using a previously-reconstructed block.

As described above with reference to FIG. 6A, the video decoding apparatus 6000 may determine whether to perform intra prediction by using a block reconstructed at a first sampling rate or to perform intra prediction by using a block reconstructed at a second sampling rate, according to a pixel type.

In more detail, the video decoding apparatus 6000 may determine a reference pixel that is from among pixels included in a current pixel and is to be used in intra predicting a block to be decoded after the current block.

Referring to FIG. 6B, the block to be decoded after the current block 6210 is located at the right or the bottom of the current block 6210. When the video decoding apparatus 6000 determines that the block to be decoded is to be intra predicted, the video decoding apparatus 6000 may predict the block to be decoded, by using pixels adjacent to the left or the top. In this regard, pixels of the current block 6210 which are included in a left region or an upper region of the block to be decoded after the current block 6210 are determined as reference pixels to be used in decoding the block to be decoded after the current block 6210.

For example, when the video decoding apparatus 6000 intra predicts the block to be decoded after the current block 6210, intra prediction may be performed by using pixels included in a left region 6230 or an upper region 6230 of the block to be decoded. That is, the pixels included in the region 6230 may be determined as reference pixels to be used in decoding the block to be decoded after the current block 6210.

Thus, when the video decoding apparatus 6000 intra predicts the current block 6210, the video decoding apparatus 6000 may intra predict the pixels included in the region 6230, by using a block previously reconstructed at a first sampling rate.

The video decoding apparatus 6000 may intra predict non-reference pixels by using a block previously reconstructed at a second sampling rate. In this regard, pixels that are included in the current block and exclude the pixels included in the left region or the upper region of the block to be decoded after the current block may be determined as the non-reference pixels to be used in decoding the block after the current block.

For example, when the video decoding apparatus 6000 intra predicts the current block, the video decoding apparatus 6000 may intra predict, by using the previously-reconstructed block of the second sampling rate, residual pixels that exclude the pixels included in the region 6230 and are from among the pixels included in the current block 6210.

Hereinafter, a process in which the video decoding apparatus 6000 decodes a current block based on a sampling rate will now be described.

The video decoding apparatus 6000 determines a size of the current block based on the sampling rate. The video decoding apparatus 6000 may determine the size of the current block, based on a residue of a first sampling rate which is obtained from a bitstream. The first sampling rate may be a sampling rate based on a luma-chroma sampling ratio of 4:2:2. In this regard, the size of the current block may indicate a rectangular block that is vertically twice as large as a block based on a luma-chroma sampling ratio of 4:2:0.

The current block 6210 illustrated in FIG. 6B is a block that is decoded assuming a case where the sampling rate indicates a sampling rate based on a luma-chroma sampling ratio of 4:2:2. It is obvious to one of ordinary skill in the art that, if the sampling rate indicates a sampling rate based on a luma-chroma sampling ratio of 4:2:0, a block 6240 may be the current block 6210.

Figure 6C:
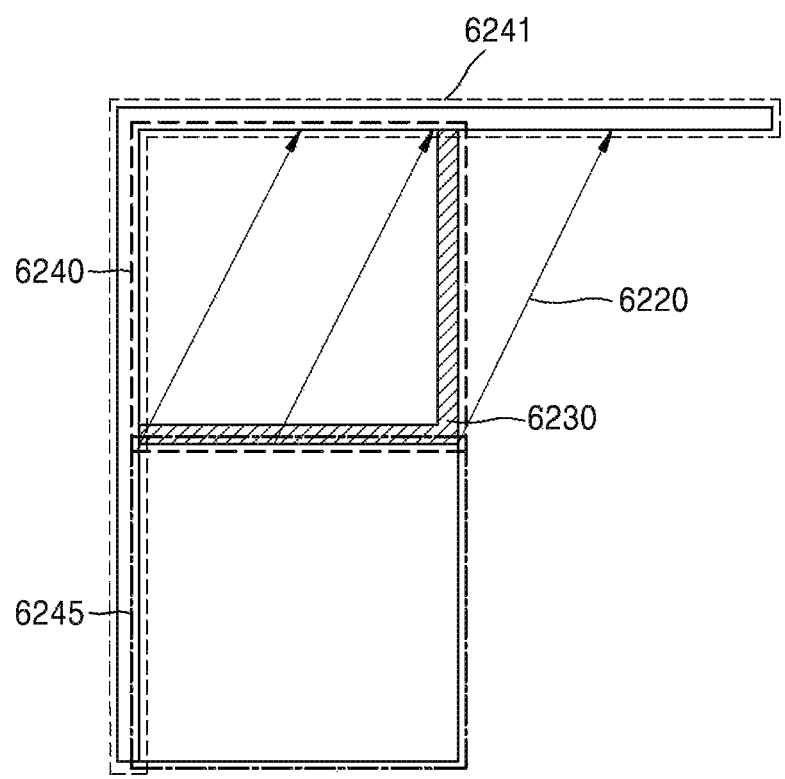
Figure 6D:
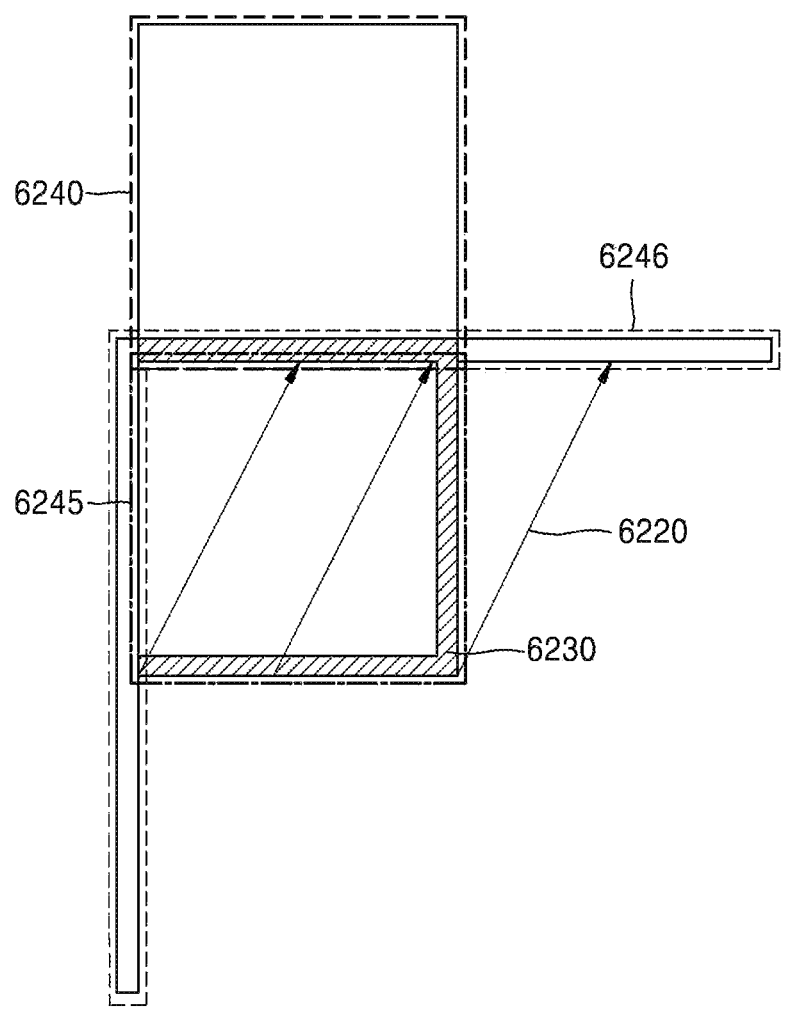

Hereinafter, with reference to FIGS. 6C to 6D, a process in which the video decoding apparatus 6000 decodes the current block 6210 at a luma-chroma sampling ratio of 4:2:2 will now be described. FIGS. 6C to 6D are diagrams for describing a decoding process by the current block 6210, based on the luma-chroma sampling ratio of 4:2:2.

Referring to FIG. 6C, when the video decoding apparatus 6000 performs intra prediction on a current block, the video decoding apparatus 6000 may perform prediction on a block with a square size. Thus, when the video decoding apparatus 6000 generates a prediction block of the current block 6210, based on the luma-chroma sampling ratio of 4:2:2, the video decoding apparatus 6000 first generates a prediction block of the block 6240 by using some pixels from among pixels 6241 that are located in the left and the top of the block 6240 in a prediction direction 6220, and reconstructs the block 6240 by using the prediction block.

Referring to FIG. 6D, after the block 6240 is reconstructed, a prediction block of a block 6245 is generated by using some pixels from among pixels 6246 that are located in the left and the top of the block 6245 in the prediction direction 6220. The video decoding apparatus 6000 reconstructs the block 6245 by using the prediction block of the block 6245.

The video decoding apparatus 6000 may reconstruct the current block 6210 by using the reconstructed block 6240 and the reconstructed block 6245. It is obvious to one of ordinary skill in the art that, if the sampling rate indicates a sampling rate based on a luma-chroma sampling ratio of 4:2:0, it is possible to reconstruct the current block 6210 by using the block 6240 that is reconstructed through the decoding process described with reference to FIG. 6C, without performing the decoding process described with reference to FIG. 6D.

Figure 6E:
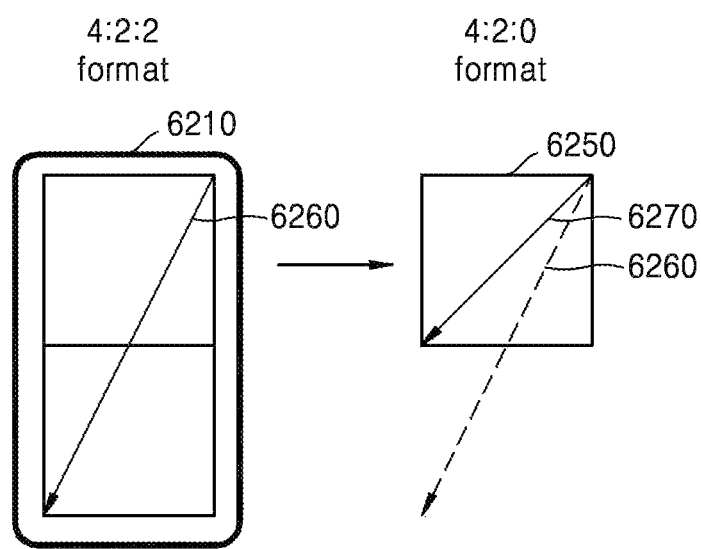

FIG. 6E is a diagram for describing a process in which a video decoding apparatus determines a prediction direction while intra predicting a non-reference pixel, according to another embodiment.

As described above with reference to FIG. 6A, when the video decoding apparatus 6000 intra predicts a non-reference pixel from among pixels included in a current block, the video decoding apparatus 6000 may intra predict the non-reference pixel at a second sampling rate by using a block that is reconstructed at the second sampling rate.

The video decoding apparatus 6000 obtains, from a bitstream, a prediction direction of the current block determined based on a first sampling rate. Thus, in order to predict the non-reference pixel, the video decoding apparatus 6000 may change the obtained prediction direction of the first sampling rate to a prediction direction of the second sampling rate.

The reason why a prediction direction is changed based on a sampling rate is because, when intra prediction is performed from the first sampling rate to the second sampling rate, the number of pixels to be sampled is decreased such that the current block to be predicted and a size of neighboring block used in the prediction are decreased. The video decoding apparatus 6000 may change the prediction direction by taking into account the decreased size of the block.

For example, referring to FIG. 6E, when the first sampling rate indicates a luma-chroma sampling ratio of 4:2:2, a sample value of a chroma component is present only in an even column or an odd column.

When the second sampling rate indicates a luma-chroma sampling ratio of 4:2:0, a sample value of a chroma component is present only in one of an even row and an odd row or one of an even column and an odd column.

Thus, when the luma-chroma sampling ratio of 4:2:2 is compared to the luma-chroma sampling ratio of 4:2:0, if a luma-chroma sampling ratio is changed from 4:2:2 to 4:2:0, the number of samples in a vertical direction with respect to a chroma component is halved.

Referring to FIG. 6E, in a case where the current block is reconstituted by re-arranging samples to contact each other with respect to a sample of the current block at the upper left end, when the luma-chroma sampling ratio is changed from the luma-chroma sampling ratio of 4:2:2 to the luma-chroma sampling ratio of 4:2:0, a size of the current block 6210 with respect to the chroma component is halved in a vertical direction.

Thus, when the luma-chroma sampling ratio is changed from 4:2:2 to 4:2:0, it is required to change a prediction direction of the luma-chroma sampling ratio of 4:2:2 to a prediction direction of 4:2:0, in consideration of a size of the reconstituted block.

For example, when an angle of a prediction direction 6260 with respect to the luma-chroma sampling ratio of 4:2:2 is 63.44 degrees (arctan(2)) with respect to a horizontal direction, an angle of a prediction direction 6270 with respect to the luma-chroma sampling ratio of 4:2:0 may be determined to be 45 degrees (arctan(1)), in consideration of the size of the block.

The video decoding apparatus 6000 may have in advance a predetermined change table indicating a prediction direction of a second sub-sampling rate which corresponds to a prediction direction of a first sub-sampling rate. The video decoding apparatus 6000 may determine the prediction direction of the second sub-sampling rate from the prediction direction of the first sub-sampling rate by using the predetermined change table.

When the video decoding apparatus according to an embodiment receives a bitstream and reconstructs an image by using the bitstream that includes a residue of a bit-depth higher than a processible bit-depth based on a processing capability of the video decoding apparatus, the video decoding apparatus includes some modules (e.g., an intra predictor and a reference pixel buffer, particularly, the reference pixel buffer) that support the bit-depth higher than the processible bit-depth based on the processing capability of the video decoding apparatus, so that an image-quality deterioration phenomenon may be minimized. In addition, the video decoding apparatus includes some modules (an inter predictor, an SAO performer, and a deblocking filter) that are processed at the processible bit-depth based on the processing capability, so that an apparatus of a low cost and low power consumption may be embodied.

When the video decoding apparatus according to an embodiment receives a bitstream and reconstructs an image by using the bitstream that includes a residue of a sampling rate higher than a processible sampling rate based on a processing capability of the video decoding apparatus, the video decoding apparatus includes some modules (e.g., an intra predictor and a reference pixel buffer, particularly, the reference pixel buffer) that support the sampling rate higher than the processible sampling rate based on the processing capability of the video decoding apparatus, so that an image-quality deterioration phenomenon may be minimized. In addition, the video decoding apparatus includes some modules (an inter predictor, an SAO performer, and a deblocking filter) that are processed at the processible sampling rate based on the processing capability of the video decoding apparatus, so that an apparatus of a low cost and low power consumption may be embodied.

As described above, the video encoding apparatuses 10 and 30 according to an embodiment and the video decoding apparatuses 20 and 40 according to an embodiment split video data into largest coding units that are split blocks, and encode and decode each of the largest coding units based on coding units of a tree structure. Hereinafter, with reference to FIGS. 7 through 26, examples of a video encoding scheme and a video decoding scheme based on coding units of a tree structure according to various embodiments will now be provided.

Figure 7:
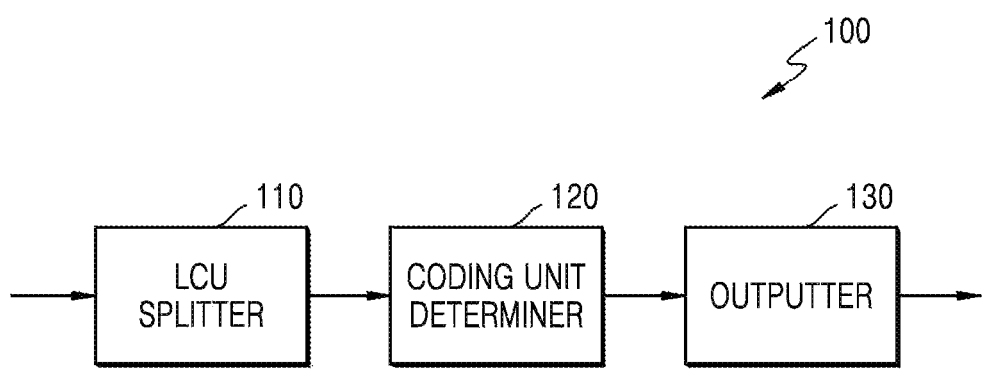
FIG. 7 illustrates a block diagram of a video encoding apparatus based on coding units of a tree structure, according to various embodiments.

FIG. 7 illustrates a block diagram of a video encoding apparatus based on coding units of a tree structure 100, according to an embodiment.

The video encoding apparatus involving video prediction based on coding units of the tree structure 100 includes a largest coding unit splitter 110, a coding unit determiner 120, and an output unit 130. Hereinafter, for convenience of description, the video encoding apparatus involving video prediction based on coding units of the tree structure 100 is referred to as the 'video encoding apparatus 100'.

The largest coding unit splitter 110 may split a current picture based on a largest coding unit that is a coding unit having a maximum size for a current picture of an image. If the current picture is larger than the largest coding unit, image data of the current picture may be split into the at least one largest coding unit. The largest coding unit according to an embodiment may be a data unit having a size of 32×32, 64×64, 128×128, 256×256, etc., wherein a shape of the data unit is a square having a width and length in powers of 2. Image data may be output to the coding unit determiner 120 according to the at least one largest coding unit.

A coding unit according to an embodiment may be characterized by a maximum size and a depth. The depth denotes the number of times the coding unit is spatially split from the largest coding unit, and as the depth deepens, deeper coding units according to depths may be split from the largest coding unit to a smallest coding unit. A depth of the largest coding unit may be defined as an uppermost depth and a depth of the smallest coding unit may be defined as a lowermost depth. Since a size of a coding unit corresponding to each depth decreases as the depth of the largest coding unit deepens, a coding unit corresponding to an upper depth may include a plurality of coding units corresponding to lower depths.

As described above, the image data of the current picture is split into the largest coding units according to a maximum size of the coding unit, and each of the largest coding units may include deeper coding units that are split according to depths. Since the largest coding unit according to an embodiment is split according to depths, the image data of a spatial domain included in the largest coding unit may be hierarchically classified according to depths.

A maximum depth and a maximum size of a coding unit, which limit the total number of times a height and a width of the largest coding unit are hierarchically split, may be predetermined.

The coding unit determiner 120 encodes at least one split region obtained by splitting a region of the largest coding unit according to depths, and determines a depth to output a finally encoded image data according to the at least one split region. That is, the coding unit determiner 120 determines a depth by encoding the image data in the deeper coding units according to depths, according to the largest coding unit of the current picture, and selecting a depth having the minimum encoding error. The determined depth and image data according to largest coding units are output to the output unit 130.

The image data in the largest coding unit is encoded based on the deeper coding units corresponding to at least one depth equal to or below the maximum depth, and results of encoding the image data based on each of the deeper coding units are compared. A depth having the minimum encoding error may be selected after comparing encoding errors of the deeper coding units. At least one depth may be selected for each largest coding unit.

The size of the largest coding unit is split as a coding unit is hierarchically split according to depths, and as the number of coding units increases. Also, even if coding units correspond to the same depth in one largest coding unit, it is determined whether to split each of the coding units corresponding to the same depth to a lower depth by measuring an encoding error of the image data of the each coding unit, separately. Accordingly, even when image data is included in one largest coding unit, the encoding errors may differ according to regions in the one largest coding unit, and thus the depths may differ according to regions in the image data. Thus, one or more depths may be determined in one largest coding unit, and the image data of the largest coding unit may be divided according to coding units of at least one depth.

Accordingly, the coding unit determiner 120 according to the embodiment may determine coding units having a tree structure included in the current largest coding unit. The 'coding units having a tree structure' according to an embodiment include coding units corresponding to a depth determined to be the depth, from among all deeper coding units included in the current largest coding unit. A coding unit of a depth may be hierarchically determined according to depths in the same region of the largest coding unit, and may be independently determined in different regions. Equally, a depth in a current region may be independently determined from a depth in another region.

A maximum depth according to an embodiment is an index related to the number of splitting times from a largest coding unit to a smallest coding unit. A first maximum depth according to an embodiment may denote the total number of splitting times from the largest coding unit to the smallest coding unit. A second maximum depth according to an embodiment may denote the total number of depth levels from the largest coding unit to the smallest coding unit. For example, when a depth of the largest coding unit is 0, a depth of a coding unit, in which the largest coding unit is split once, may be set to 1, and a depth of a coding unit, in which the largest coding unit is split twice, may be set to 2. In this regard, if the smallest coding unit is a coding unit in which the largest coding unit is split four times, depth levels of depths 0, 1, 2, 3, and 4 exist, and thus the first maximum depth may be set to 4, and the second maximum depth may be set to 5.

Prediction encoding and transformation may be performed according to the largest coding unit. The prediction encoding and the transformation are also performed based on the deeper coding units according to a depth equal to or depths less than the maximum depth, according to the largest coding unit.

Since the number of deeper coding units increases whenever the largest coding unit is split according to depths, encoding, including the prediction encoding and the transformation, is performed on all of the deeper coding units generated as the depth deepens. Hereinafter, for convenience of description, the prediction encoding and the transformation will be described based on a coding unit of a current depth in at least one largest coding unit.

The video encoding apparatus 100 according to the embodiment may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but may also select a data unit different from the coding unit so as to perform the prediction encoding on the image data in the coding unit.

In order to perform prediction encoding in the largest coding unit, the prediction encoding may be performed based on a coding unit corresponding to a depth according to an embodiment, i.e., based on a coding unit that is no longer split to coding units corresponding to a lower depth. A prediction unit in a partition for prediction is determined from the coding unit. The prediction unit may include the coding unit and the partition obtained by splitting at least one of a height and width of the coding unit. The partition is a data unit where the prediction unit of the coding unit is split, and may have a same size as the coding unit.

For example, when a coding unit of 2N×2N (where N is a positive integer) is no longer split, it becomes a prediction unit of 2N×2N, and a size of a partition may be 2N×2N, 2N×N, N×2N, or N×N. Examples of a partition mode may include symmetrical partitions obtained by symmetrically splitting a height or width of the prediction unit, and may selectively include partitions obtained by asymmetrically splitting the height or width of the prediction unit, such as 1:n or n:1, partitions obtained by geometrically splitting the prediction unit, partitions having arbitrary types, or the like.

A prediction mode of the prediction unit may be at least one of an intra mode, an inter mode, and a skip mode. For example, the intra mode and the inter mode may be performed on the partition of 2N×2N, 2N×N, N×2N, or N×N. Also, the skip mode may be performed only on the partition of 2N×2N. The encoding may be independently performed on one prediction unit in a coding unit, so that a prediction mode having a minimum encoding error may be selected.

The video encoding apparatus 100 according to the embodiment may also perform the transformation on the image data in a coding unit based on not only the coding unit for encoding the image data, but also based on a data unit that is different from the coding unit. In order to perform the transformation in the coding unit, the transformation may be performed based on a transformation unit having a size smaller than or equal to the coding unit. For example, the transformation unit may include a data unit for an intra mode and a transformation unit for an inter mode.

The transformation unit in the coding unit may be recursively split into smaller sized regions in a manner similar to that in which the coding unit is split according to the tree structure, according to an embodiment. Thus, residual data in the coding unit may be split according to the transformation unit having the tree structure according to transformation depths.

A transformation depth indicating the number of splitting times to reach the transformation unit by splitting the height and width of the coding unit may also be set in the transformation unit according to an embodiment. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. That is, with respect to the transformation unit, the transformation unit having the tree structure may be set according to the transformation depths.

Encoding information according to depths requires not only information about a depth but also requires information related to prediction and transformation. Accordingly, the coding unit determiner 120 not only determines a depth having a minimum encoding error but also determines a partition mode in which a prediction unit is split to partitions, a prediction mode according to prediction units, and a size of a transformation unit for transformation.

Coding units according to a tree structure in a largest coding unit and methods of determining a prediction unit/partition, and a transformation unit, according to embodiments, will be described in detail later with reference to FIGS. 7 through 19.

The coding unit determiner 120 may measure an encoding error of deeper coding units according to depths by using Rate-Distortion Optimization based on Lagrangian multipliers.

The output unit 130 outputs, in bitstreams, the image data of the largest coding unit, which is encoded based on the at least one depth determined by the coding unit determiner 120, and encoding mode information according to depths.

The encoded image data may correspond to a result obtained by encoding residual data of an image.

The encoding mode information according to depths may include depth information, partition mode information of the prediction unit, prediction mode information, and the size information of the transformation unit.

The depth information may be defined by using split information according to depths, which specifies whether encoding is performed on coding units of a lower depth instead of a current depth. If the current depth of the current coding unit is a depth, the current coding unit is encoded by using the coding unit of the current depth, and thus split information of the current depth may be defined not to split the current coding unit to a lower depth. On the contrary, if the current depth of the current coding unit is not the depth, the encoding has to be performed on the coding unit of the lower depth, and thus the split information of the current depth may be defined to split the current coding unit to the coding units of the lower depth.

If the current depth is not the depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed on the coding units having the same depth.

Since the coding units having a tree structure are determined for one largest coding unit, and at least one piece of encoding mode information has to be determined for a coding unit of a depth, at least one piece of encoding mode information may be determined for one largest coding unit. Also, data of the largest coding unit may vary according to locations since the data is hierarchically split according to depths, and thus split information may be set for the data.

Accordingly, the output unit 130 according to the embodiment may assign split information to at least one of the coding unit, the prediction unit, and a minimum unit included in the largest coding unit.

The minimum unit according to an embodiment is a square data unit obtained by splitting the smallest coding unit constituting the lowermost depth by 4. Alternatively, the minimum unit according to an embodiment may be a maximum square data unit that may be included in all of the coding units, prediction units, partition units, and transformation units included in the largest coding unit.

For example, the encoding information output by the output unit 130 may be classified into encoding information according to deeper coding units, and encoding information according to prediction units. The encoding information according to the deeper coding units may include the prediction mode information and the partition size information. The encoding information according to the prediction units may include information about an estimated direction of an inter mode, about a reference image index of the inter mode, about a motion vector, about a chroma component of an intra mode, and about an interpolation method of the intra mode.

Information about a maximum size of the coding unit defined according to pictures, slices, or GOPs, and information about a maximum depth may be inserted into a header of a bitstream, a sequence parameter set, or a picture parameter set.

Information about a maximum size of the transformation unit permitted with respect to a current video, and information about a minimum size of the transformation unit may also be output through a header of a bitstream, a sequence parameter set, or a picture parameter set. The output unit 130 may encode and output an SAO parameter described above with reference to FIGS. 1A through 14.

According to the simplest embodiment of the video encoding apparatus 100, the deeper coding unit may be a coding unit obtained by dividing a height and width of a coding unit of an upper depth, which is one layer above, by two. That is, when the size of the coding unit of the current depth is 2N×2N, the size of the coding unit of the lower depth is N×N. Also, a current coding unit having a size of 2N×2N may maximally include four lower-depth coding units having a size of N×N.

Accordingly, the video encoding apparatus 100 may form the coding units having the tree structure by determining coding units having an optimum shape and an optimum size for each largest coding unit, based on the size of the largest coding unit and the maximum depth determined considering characteristics of the current picture. Also, since encoding may be performed on each largest coding unit by using any one of various prediction modes and transformations, an optimum encoding mode may be determined by taking into account characteristics of the coding unit of various image sizes.

Thus, if an image having a high resolution or a large data amount is encoded in a conventional macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus according to the embodiment, image compression efficiency may be increased since a coding unit is adjusted while considering characteristics of an image while increasing a maximum size of a coding unit while considering a size of the image.

The video encoding apparatus 100 of FIG. 7 may perform operations of the video encoding apparatuses 10 and 30 described above with reference to FIGS. 1A and 6.

Figure 8:
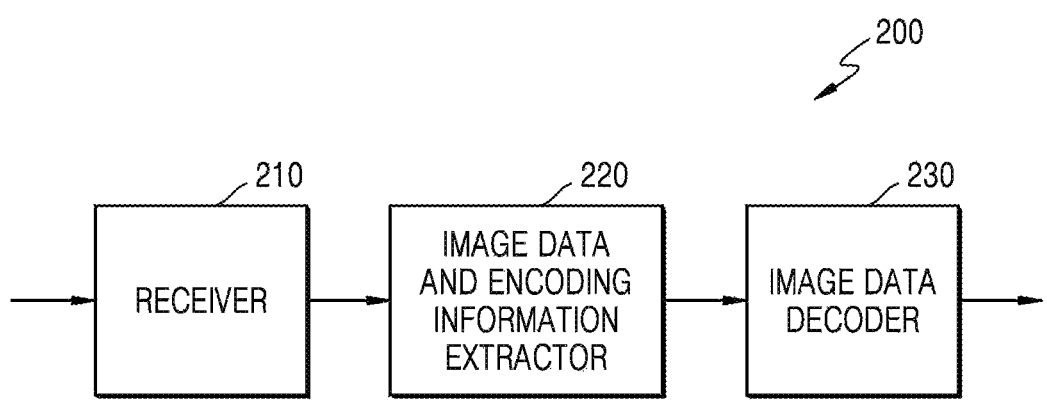
FIG. 8 illustrates a block diagram of a video decoding apparatus based on coding units of a tree structure, according to various embodiments.

FIG. 8 illustrates a block diagram of a video decoding apparatus based on coding units of a tree structure 200, according to an embodiment.

The video decoding apparatus involving video prediction based on coding units of the tree structure 200 according to the embodiment includes a receiver 210, an image data and encoding information extractor 220, and an image data decoder 230. Hereinafter, for convenience of description, the video decoding apparatus involving video prediction based on coding units of the tree structure 200 according to the embodiment is referred to as the 'video decoding apparatus 200'.

Definitions of various terms, such as a coding unit, a depth, a prediction unit, a transformation unit, and various encoding mode information, for decoding operations of the video decoding apparatus 200 according to an embodiment are identical to those described with reference to FIG. 15 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each largest coding unit, and outputs the extracted image data to the image data decoder 230. The image data and encoding information extractor 220 may extract information about a maximum size of a coding unit of a current picture, from a header about the current picture, a sequence parameter set, or a picture parameter set.

Also, the image data and encoding information extractor 220 extracts, from the parsed bitstream, split information and encoding information about the coding units having a tree structure according to each largest coding unit. The extracted split information and the extracted encoding information are output to the image data decoder 230. That is, the image data in a bitstream is split into the largest coding unit so that the image data decoder 230 may decode the image data for each largest coding unit.

Split information and encoding information split information according to each largest coding unit and encoding information may be set with respect to at least one split information, and encoding information according to depths may include partition mode information of a corresponding coding unit, prediction mode information, split information of a transformation unit, or the like.

Also, as final depth information, the split information according to depths may be extracted.

The split information and the encoding information according to each of the largest coding units extracted by the image data and encoding information extractor 220 are split information and encoding information determined to generate a minimum encoding error when an encoder, such as the video encoding apparatus 100, repeatedly performs encoding on each deeper coding unit according to depths according to each largest coding unit. Accordingly, the video decoding apparatus 200 may reconstruct an image by decoding data according to an encoding method that generates the minimum encoding error.

Because the split information and the encoding information according to an embodiment may be assigned to a predetermined data unit from among a corresponding coding unit, a prediction unit, and a minimum unit, the image data and encoding information extractor 220 may extract the split information and the encoding information according to the predetermined data units. If the split information and the encoding information of a corresponding largest coding unit are recorded according to each of the predetermined data units, predetermined data units having same split information and encoding information may be inferred to be the data units included in the same largest coding unit.

The image data decoder 230 may reconstruct the current picture by decoding the image data in each largest coding unit based on the split information and the encoding information according to the largest coding units. That is, the image data decoder 230 may decode the encoded image data, based on a read partition mode, a prediction mode, and a transformation unit for each coding unit from among the coding units having the tree structure included in each largest coding unit. A decoding process may include a prediction process including intra prediction and motion compensation, and an inverse transformation process.

The image data decoder 230 may perform intra prediction or motion compensation according to a partition and a prediction mode of each coding unit, based on the information about the partition mode and the prediction mode of the prediction unit of the coding unit according to depths.

In addition, for inverse transformation for each largest coding unit, the image data decoder 230 may read information about a transformation unit according to a tree structure for each coding unit so as to perform inverse transformation based on transformation units for each coding unit. Due to the inverse transformation, a pixel value of a spatial domain of the coding unit may be reconstructed.

The image data decoder 230 may determine a final depth of a current largest coding unit by using split information according to depths. If the split information indicates that image data is no longer split in the current depth, the current depth is a final depth. Accordingly, the image data decoder 230 may decode the image data of the current largest coding unit by using the information about the partition mode of the prediction unit, the prediction mode, and the split of the transformation unit for each coding unit corresponding to the current depth.

That is, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode. As such, the current coding unit may be decoded by obtaining the information about the encoding mode for each coding unit.

In addition, the video decoding apparatus 200 of FIG. 8 may perform operations of the video decoding apparatuses 20 and 40 described above with reference to FIG. 2A.

Figure 9:
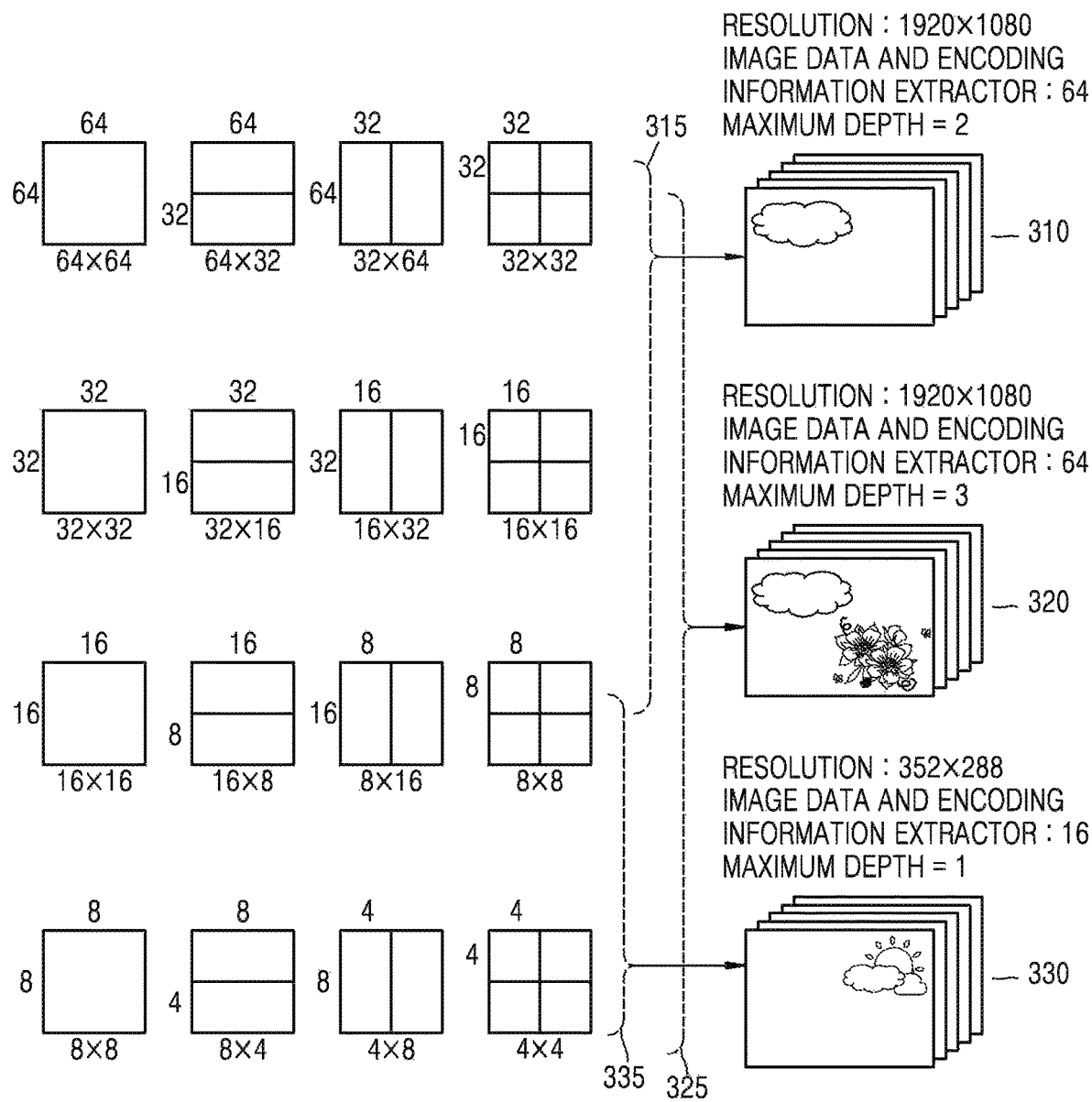
FIG. 9 illustrates a concept of coding units, according to various embodiments.

FIG. 9 illustrates a concept of coding units, according to various embodiments.

A size of a coding unit may be expressed by width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 19 denotes a total number of splits from a largest coding unit to a smallest coding unit.

If a resolution is high or a data amount is large, it is preferable that a maximum size of a coding unit is large so as to not only increase encoding efficiency but also to accurately reflect characteristics of an image. Accordingly, the maximum size of the coding unit of the video data 310 and 320 having a higher resolution than the video data 330 may be selected to 64.

Since the maximum depth of the video data 310 is 2, coding units 315 of the video data 310 may include a largest coding unit having a long axis size of 64, and coding units having long axis sizes of 32 and 16 since depths are deepened to two layers by splitting the largest coding unit twice. On the other hand, since the maximum depth of the video data 330 is 1, coding units 335 of the video data 330 may include a largest coding unit having a long axis size of 16, and coding units having a long axis size of 8 since depths are deepened to one layer by splitting the largest coding unit once.

Since the maximum depth of the video data 320 is 3, coding units 325 of the video data 320 may include a largest coding unit having a long axis size of 64, and coding units having long axis sizes of 32, 16, and 8 since the depths are deepened to 3 layers by splitting the largest coding unit three times. As a depth deepens, detailed information may be precisely expressed.

Figure 10:
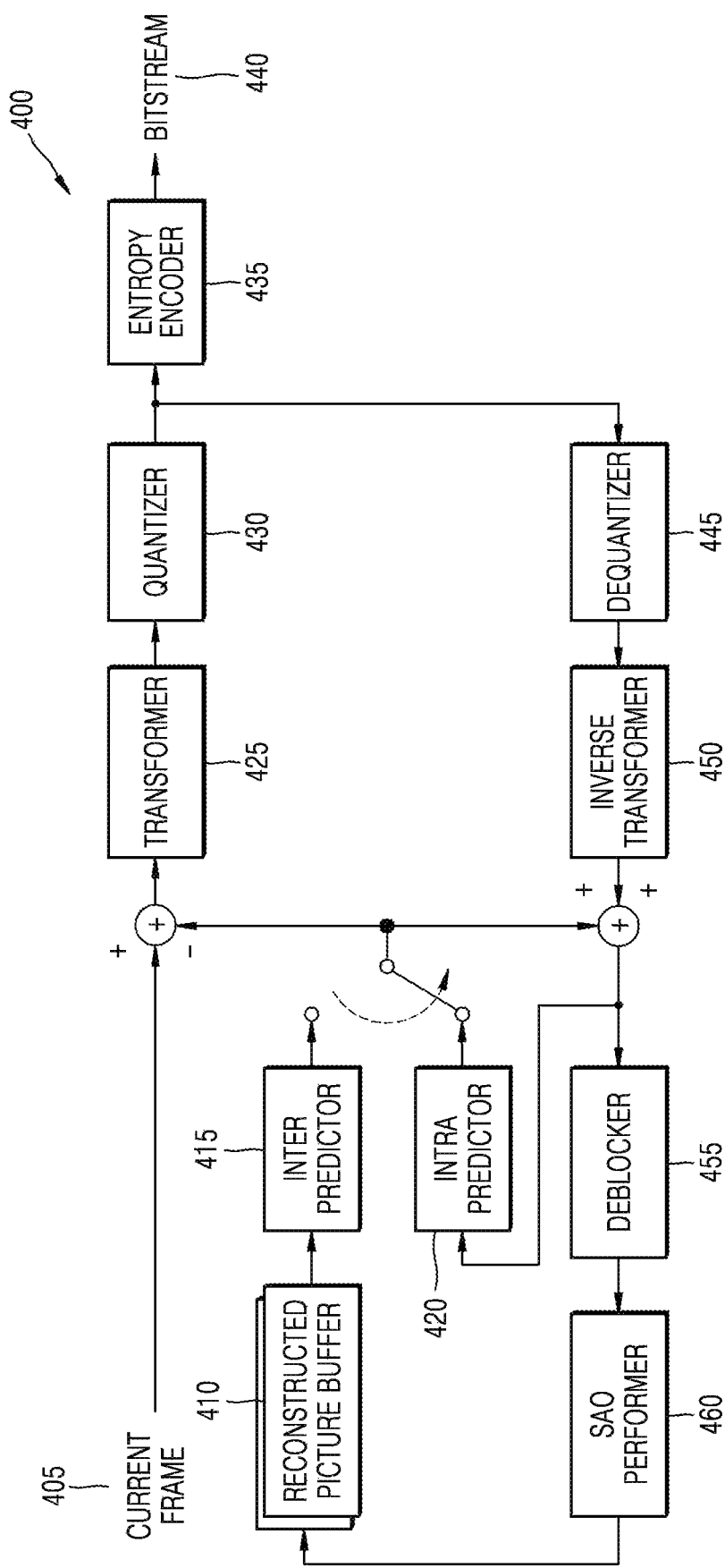
FIG. 10 is a block diagram of an image encoder based on coding units, according to various embodiments.

FIG. 10 illustrates a block diagram of an image encoder 400 based on coding units, according to various embodiments.

The image encoder 400 according to an embodiment performs operations of a picture encoder 120 of the video encoding apparatus 100 so as to encode image data. That is, an intra predictor 420 performs intra prediction on coding units in an intra mode, from among a current image 405, per prediction unit, and an inter predictor 415 performs inter prediction on coding units in an inter mode by using the current image 405 and a reference image obtained from a reconstructed picture buffer 410 according to prediction units. The current picture 405 may be split into largest coding units, and then the largest coding units may be sequentially encoded. In this regard, the largest coding unit that is to be split into coding units having a tree structure may be encoded.

Residual data is generated by subtracting prediction data of a coding unit of each mode output from the intra predictor 420 or the inter predictor 415 from data of the current image 405 to be encoded, and the residual data is output as a quantized transformation coefficient through a transformer 425 and a quantizer 430 per transformation unit. The quantized transformation coefficient is reconstructed as the residue data in a spatial domain through an inverse-quantizer 445 and an inverse-transformer 450. The reconstructed residue data in the spatial domain is added to the prediction data of the coding unit of each mode output from the intra predictor 420 or the inter predictor 415 to be reconstructed as data in a spatial domain of the coding unit of the current image 405. The reconstructed data in the spatial domain is generated as a reconstructed image through a deblocking unit 455 and an SAO performer 460. The reconstructed image is stored in the reconstructed picture buffer 410. Reconstructed images stored in the reconstructed picture buffer 410 may be used as a reference image for inter prediction of another image. The transformation coefficient quantized by the transformer 425 and the quantizer 430 may be output as a bitstream 440 through an entropy encoder 435.

In order for the image encoder 400 to be applied in the video encoding apparatus 100, all elements of the image encoder 400, i.e., the inter predictor 415, the intra predictor 420, the transformer 425, the quantizer 430, the entropy encoder 435, the inverse-quantizer 445, the inverse-transformer 450, the deblocking unit 455, and the SAO performer 460, may perform operations based on each coding unit among coding units having a tree structure according to each largest coding unit.

In particular, the intra predictor 420 and the inter predictor 415 may determine a partition mode and a prediction mode of each coding unit from among the coding units having a tree structure, by taking into account the maximum size and the maximum depth of a current largest coding unit, and the transformer 425 may determine whether to split a transformation unit according to a quad tree in each coding unit from among the coding units having a tree structure.

Figure 11:
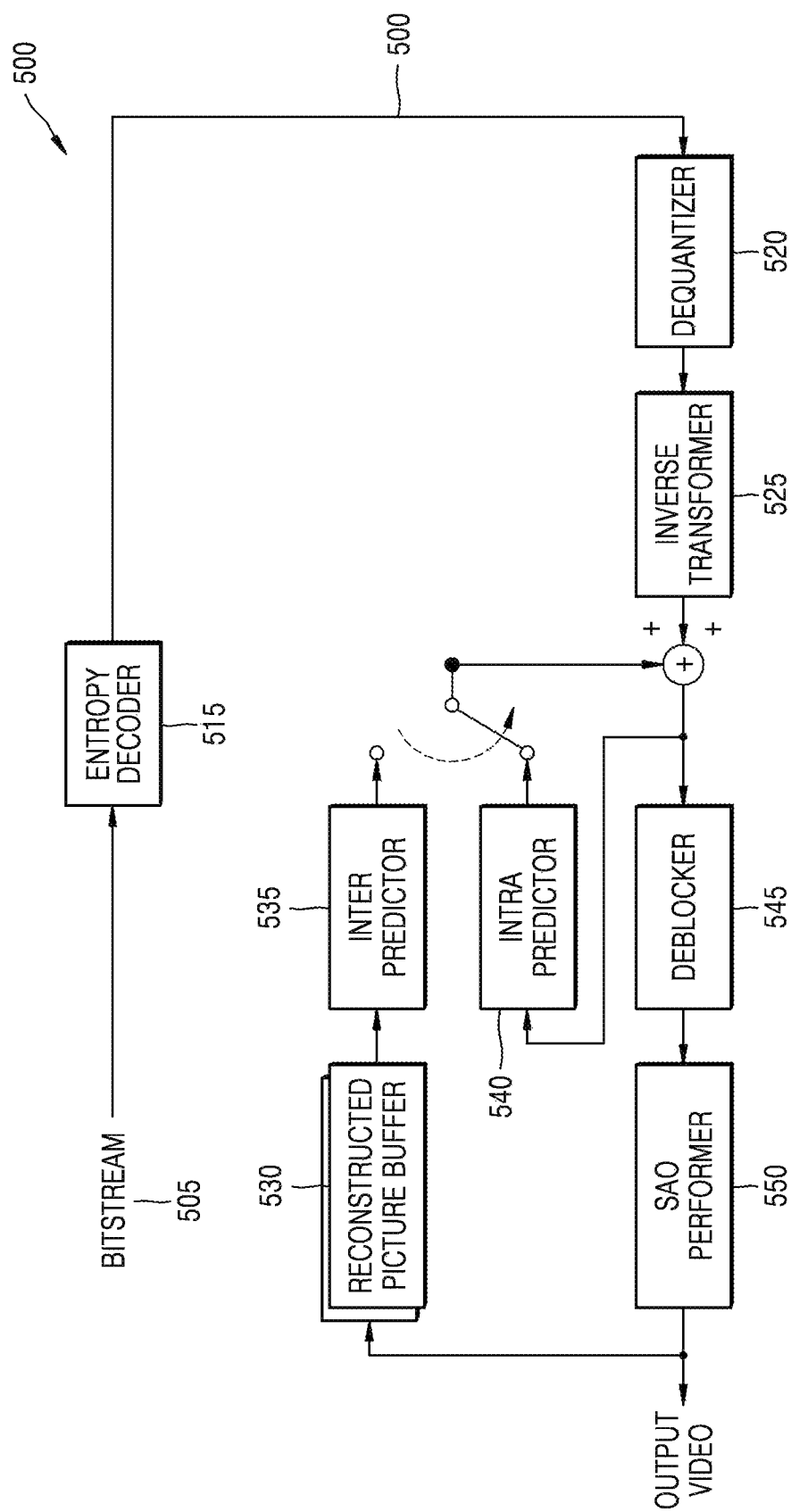
FIG. 11 is a block diagram of an image decoder based on coding units, according to various embodiments.

FIG. 11 illustrates a block diagram of an image decoder 500 based on coding units, according to various embodiments.

An entropy decoder 515 parses, from a bitstream 505, encoded image data to be decoded and encoding information required for decoding. The encoded image data corresponds to a quantized transformation coefficient, and an inverse-quantizer 520 and an inverse-transformer 525 reconstruct residue data from the quantized transformation coefficient.

An intra predictor 540 performs intra prediction on a coding unit in an intra mode according to prediction units. An inter predictor 535 performs inter prediction by using a reference image with respect to a coding unit in an inter mode from among a current image, wherein the reference image is obtained by a reconstructed picture buffer 530 according to prediction units.

Prediction data and residue data regarding coding units of each mode, which passed through the intra predictor 540 and the inter predictor 535, are summed, so that data in a spatial domain regarding coding units of the current image 405 may be reconstructed, and the reconstructed data in the 550 spatial domain may be output as a reconstructed image 560 through a deblocking unit 545 and a sample compensator 550. Also, reconstructed images that are stored in the reconstructed picture buffer 530 may be output as reference images.

In order for a picture decoder 230 of the video decoding apparatus 200 to decode the image data, operations after the entropy decoder 515 of the image decoder 500 according to an embodiment may be performed.

In order for the image decoder 500 to be applied in the video decoding apparatus 200 according to an embodiment, all elements of the image decoder 500, i.e., the entropy decoder 515, the inverse-quantizer 520, the inverse-transformer 525, the intra predictor 540, the inter predictor 535, the deblocking unit 545, and the sample compensator 550 may perform operations based on coding units having a tree structure for each largest coding unit.

In particular, the intra predictor 540 and the inter predictor 535 may determine a partition mode and a prediction mode of each coding unit from among the coding units according to a tree structure, and the inverse-transformer 525 may determine whether or not to split a transformation unit according to a quad-tree structure in each coding unit.

Figure 12:
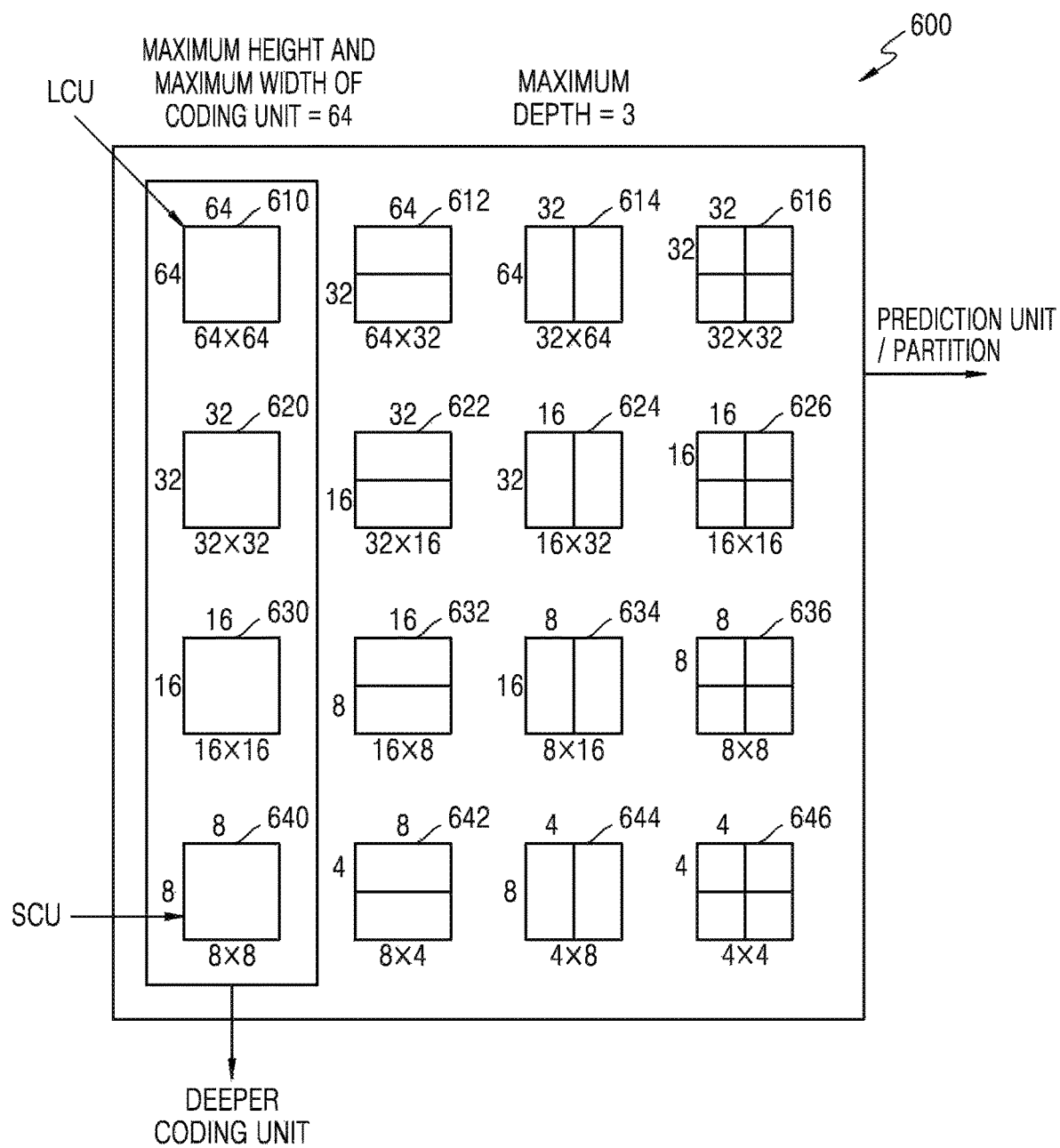
FIG. 12 illustrates deeper coding units according to depths, and partitions, according to various embodiments.

FIG. 12 illustrates deeper coding units according to depths, and partitions, according to an embodiment.

The video encoding apparatus 100 according to an embodiment and the video decoding apparatus 200 according to an embodiment use hierarchical coding units so as to consider characteristics of an image. A maximum height, a maximum width, and a maximum depth of coding units may be adaptively determined according to the characteristics of the image, or may be variously set according to user requirements. Sizes of deeper coding units according to depths may be determined according to the predetermined maximum size of the coding unit.

In a hierarchical structure of coding units 600 according to an embodiment, the maximum height and the maximum width of the coding units are each 64, and the maximum depth is 4. In this case, the maximum depth refers to a total number of times the coding unit is split from the largest coding unit to the smallest coding unit. Since a depth deepens along a vertical axis of the hierarchical structure of coding units 600, a height and a width of the deeper coding unit are each split. Also, a prediction unit and partitions, which are bases for prediction encoding of each deeper coding unit, are shown along a horizontal axis of the hierarchical structure of coding units 600.

That is, a coding unit 610 is a largest coding unit in the hierarchical structure of coding units 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, and a coding unit 640 having a size of 8×8 and a depth of 3 are present. The coding unit 640 having a size of 4×4 and a depth of 3 is a smallest coding unit.

The prediction unit and the partitions of a coding unit are arranged along the horizontal axis according to each depth. That is, if the coding unit 610 having a size of 64×64 and a depth of 0 is a prediction unit, the prediction unit may be split into partitions included in the coding unit 610 having the size of 64×64, i.e. a partition 610 having a size of 64×64, partitions 612 having the size of 64×32, partitions 614 having the size of 32×64, or partitions 616 having the size of 32×32.

Equally, a prediction unit of the coding unit 620 having the size of 32×32 and the depth of 1 may be split into partitions included in the coding unit 620, i.e. a partition 620 having a size of 32×32, partitions 622 having a size of 32×16, partitions 624 having a size of 16×32, and partitions 626 having a size of 16×16.

Equally, a prediction unit of the coding unit 630 having the size of 16×16 and the depth of 2 may be split into partitions included in the coding unit 630, i.e. a partition having a size of 16×16 included in the coding unit 630, partitions 632 having a size of 16×8, partitions 634 having a size of 8×16, and partitions 636 having a size of 8×8.

Equally, a prediction unit of the coding unit 640 having the size of 8×8 and the depth of 3 may be split into partitions included in the coding unit 640, i.e. a partition 640 having a size of 8×8 included in the coding unit 640, partitions 642 having a size of 8×4, partitions 644 having a size of 4×8, and partitions 646 having a size of 4×4.

In order to determine a final depth of the largest coding unit 610, the coding unit determiner 120 of the video encoding apparatus 100 has to perform encoding on coding units respectively corresponding to depths included in the largest coding unit 610.

The number of deeper coding units according to depths including data in the same range and the same size increases as the depth deepens. For example, four coding units corresponding to a depth of 2 are required to cover data that is included in one coding unit corresponding to a depth of 1. Accordingly, in order to compare results of encoding the same data according to depths, the data has to be encoded by using each of the coding unit corresponding to the depth of 1 and four coding units corresponding to the depth of 2.

In order to perform encoding according to each of the depths, a minimum encoding error that is a representative encoding error of a corresponding depth may be selected by performing encoding on each of prediction units of the coding units according to depths, along the horizontal axis of the hierarchical structure of coding units 600. Also, the minimum encoding error may be searched for by comparing representative encoding errors according to depths, by performing encoding for each depth as the depth deepens along the vertical axis of the hierarchical structure of coding units 600. A depth and a partition generating the minimum encoding error in the largest coding unit 610 may be selected as a final depth and a partition mode of the largest coding unit 610.

Figure 13:
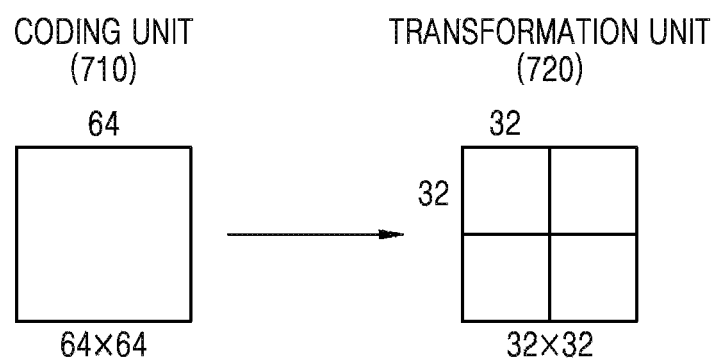
FIG. 13 illustrates a relationship between a coding unit and transformation units, according to various embodiments.

FIG. 13 illustrates a relationship between a coding unit and transformation units, according to an embodiment.

The video encoding apparatus 100 according to an embodiment or the video decoding apparatus 200 according to an embodiment encodes or decodes an image according to coding units having sizes smaller than or equal to a largest coding unit for each largest coding unit. Sizes of transformation units for transformation during an encoding process may be selected based on data units that are not larger than a corresponding coding unit.

For example, in the video encoding apparatus 100 or the video decoding apparatus 200, when a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the minimum coding error with respect to an original image may be selected.

Figure 14:
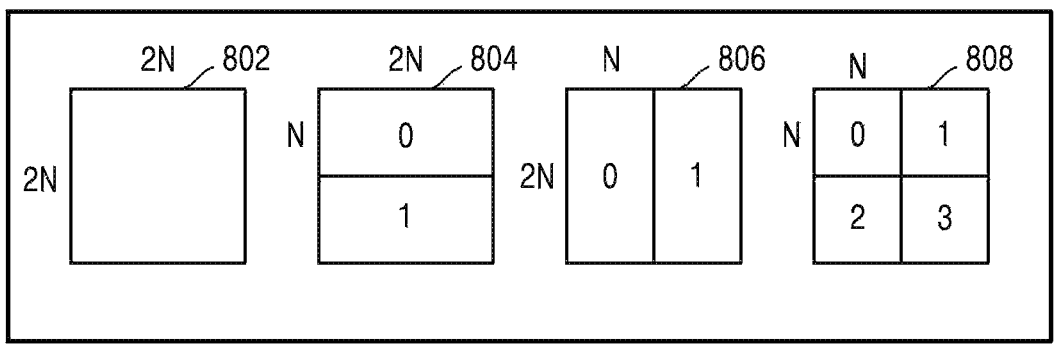
FIG. 14 illustrates a plurality of pieces of encoding information according to depths, according to various embodiments.
Figure 14:
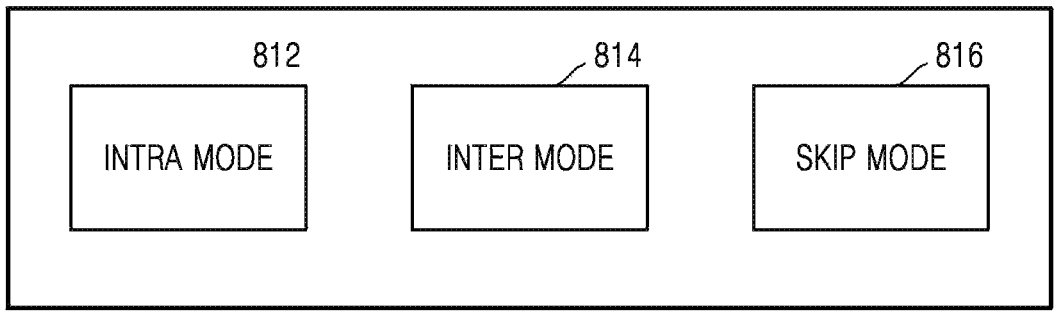
Figure 14:
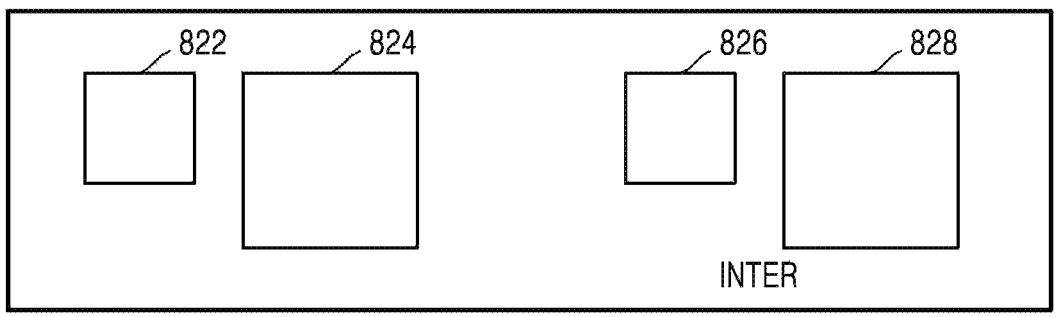

FIG. 14 illustrates a plurality of pieces of encoding information according to depths, according to an embodiment.

The output unit 130 of the video encoding apparatus 100 according to an embodiment may encode and transmit, as encoding mode information, partition mode information 800, prediction mode information 810, and transformation unit size information 820 for each coding unit corresponding to a final depth.

The partition mode information 800 indicates information about a type of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. In this case, the partition mode information 800 about a current coding unit is set to indicate one of the partition 802 having a size of 2N×2N, the partition 804 having a size of 2N×N, the partition 806 having a size of N×2N, and the partition 808 having a size of N×N.

The prediction mode information 810 indicates a prediction mode of each partition. For example, the prediction mode information 810 may indicate a mode of prediction encoding performed on a partition indicated by the partition mode information 800, i.e., an intra mode 812, an inter mode 814, or a skip mode 816.

The transformation unit size information 820 represents a transformation unit to be based on when transformation is performed on a current coding unit. For example, the transformation unit may be one of a first intra transformation unit 822, a second intra transformation unit 824, a first inter transformation unit 826, and a second intra transformation unit 828.

The image data and encoding information extractor 220 of the video decoding apparatus 200 may extract and use the partition mode information 800, the prediction mode information 810, and the transformation unit size information 820 for each deeper coding unit.

Figure 15:
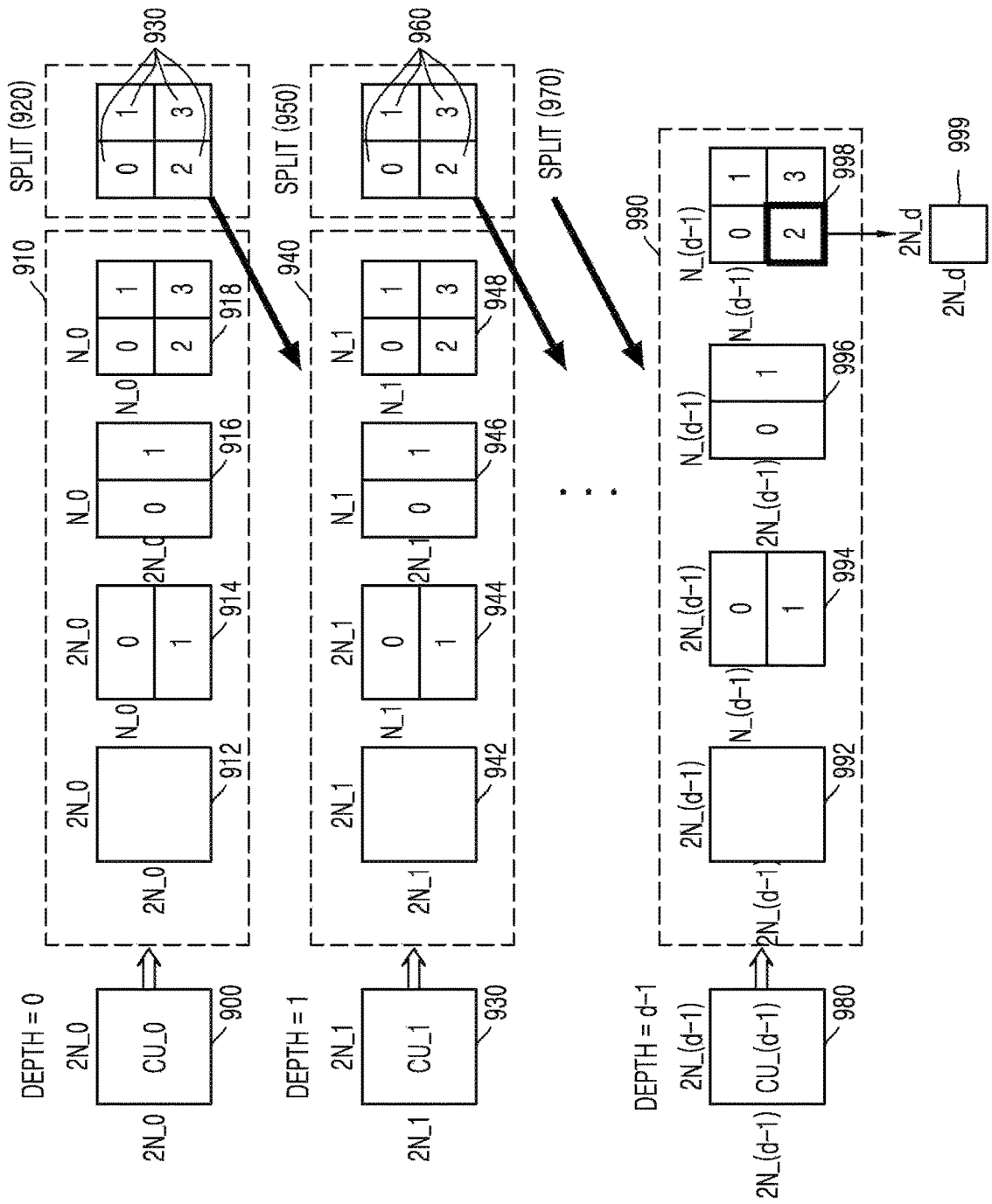
FIG. 15 illustrates deeper coding units according to depths, according to various embodiments.

FIG. 15 illustrates deeper coding units according to depths, according to an embodiment.

Split information may be used to represent a change in a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition mode 912 having a size of 2N_0×2N_0, a partition mode 914 having a size of 2N_0×N_0, a partition mode 916 having a size of N_0×2N_0, and a partition mode 918 having a size of N_0×N_0. Only the partition modes 912, 914, 916, and 918 which are obtained by symmetrically splitting the prediction unit are illustrated, but as described above, a partition mode is not limited thereto and may include asymmetrical partitions, partitions having a predetermined shape, and partitions having a geometrical shape.

According to each partition mode, prediction encoding has to be repeatedly performed on one partition having a size of 2N_0×2N_0, two partitions having a size of 2N_0×N_0, two partitions having a size of N_0×2N_0, and four partitions having a size of N_0×N_0. The prediction encoding in an intra mode and an inter mode may be performed on the partitions having the sizes of 2N_0×2N_0, N_0×2N_0, 2N_0×N_0, and N_0×N_0. The prediction encoding in a skip mode may be performed only on the partition having the size of 2N_0×2N_0.

If an encoding error is smallest in one of the partition modes 912, 914, and 916 having the sizes of 2N_0×2N_0, 2N_0×N_0 and N_0×2N_0, the prediction unit 910 may not be split into a lower depth.

If the encoding error is the smallest in the partition mode 918 having the size of N_0×N_0, a depth is changed from 0 to 1 and split is performed (operation 920), and encoding may be repeatedly performed on coding units 930 of a partition mode having a depth of 2 and a size of N_0×N_0 so as to search for a minimum encoding error.

A prediction unit 940 for prediction encoding the coding unit 930 having a depth of 1 and a size of 2N_1×2N_1 (=N_0×N_0) may include a partition mode 942 having a size of 2N_1×2N_1, a partition mode 944 having a size of 2N_1×N_1, a partition mode 946 having a size of N_1×2N_1, and a partition mode 948 having a size of N_1×N_1.

If an encoding error is the smallest in the partition mode 948 having the size of N_1×N_1, a depth is changed from 1 to 2 and split is performed (in operation 950), and encoding is repeatedly performed on coding units 960 having a depth of 2 and a size of N_2×N_2 so as to search for a minimum encoding error.

When a maximum depth is d, deeper coding units according to depths may be set until when a depth corresponds to d−1, and split information may be set until when a depth corresponds to d−2. That is, when encoding is performed up to when the depth is d−1 after a coding unit corresponding to a depth of d−2 is split (in operation 970), a prediction unit 990 for prediction encoding a coding unit 980 having a depth of d−1 and a size of 2N_(d−1)×2N_(d−1) may include partitions of a partition mode 992 having a size of 2N_(d−1)×2N_(d−1), a partition mode 994 having a size of 2N_(d−1)×N_(d−1), a partition mode 996 having a size of N_(d−1)×2N_(d−1), and a partition mode 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition modes so as to search for a partition mode generating a minimum encoding error.

Even when the partition mode 998 having the size of N_(d−1)×N_(d−1) has the minimum encoding error, since a maximum depth is d, a coding unit CU_(d−1) having a depth of d−1 is no longer split into a lower depth, and a depth for the coding units constituting a current largest coding unit 900 is determined to be d−1 and a partition mode of the current largest coding unit 900 may be determined to be N_(d−1)×N_(d−1). Also, since the maximum depth is d, split information for a coding unit 952 having a depth of d−1 is not set.

A data unit 999 may be a 'minimum unit' for the current largest coding unit. A minimum unit according to the embodiment may be a square data unit obtained by splitting a smallest coding unit having a lowermost depth by 4. By performing the encoding repeatedly, the video encoding apparatus 100 according to the embodiment may select a depth generating the minimum encoding error by comparing encoding errors according to depths of the coding unit 900 to determine a depth, and may set a corresponding partition mode and a prediction mode as an encoding mode of the depth.

As such, the minimum encoding errors according to depths are compared in all of the depths of 0, 1, . . . , d−1, d, and a depth having a minimum encoding error may be determined as a depth. The depth, the partition mode of the prediction unit, and the prediction mode may be encoded and transmitted as information about the encoding mode. Also, since a coding unit has to be split from a depth of 0 to a depth, only split information of the depth is set to '0', and split information of depths excluding the depth is set to '1'.

The image data and encoding information extractor 220 of the video decoding apparatus 200 according to the embodiment may extract and use a depth and prediction unit information about the coding unit 900 so as to decode the coding unit 912. The video decoding apparatus 200 according to the embodiment may determine a depth, in which split information is '0', as a depth by using split information according to depths, and may use, for decoding, encoding mode information about the corresponding depth.

Figure 16:
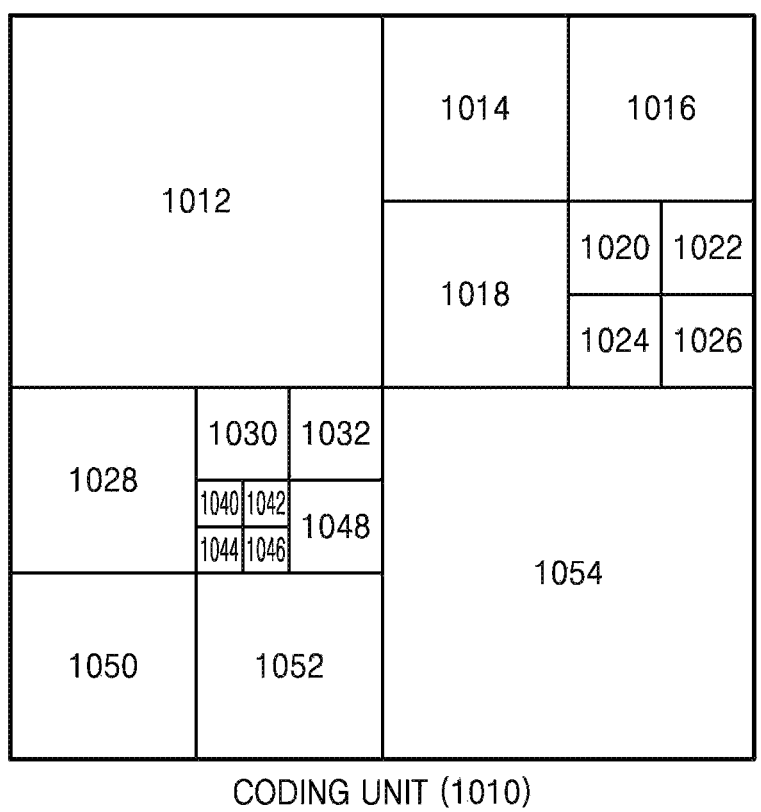
FIGS. 16, 17, and 18 illustrate a relationship between coding units, prediction units, and transformation units, according to various embodiments.
Figure 17:
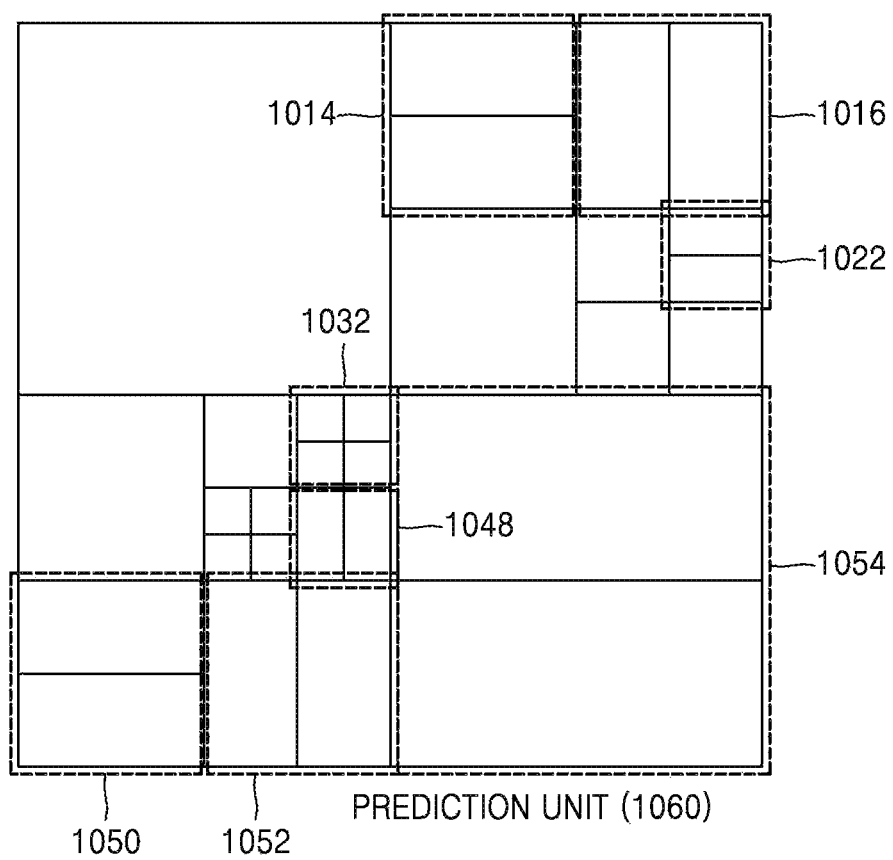
Figure 18:
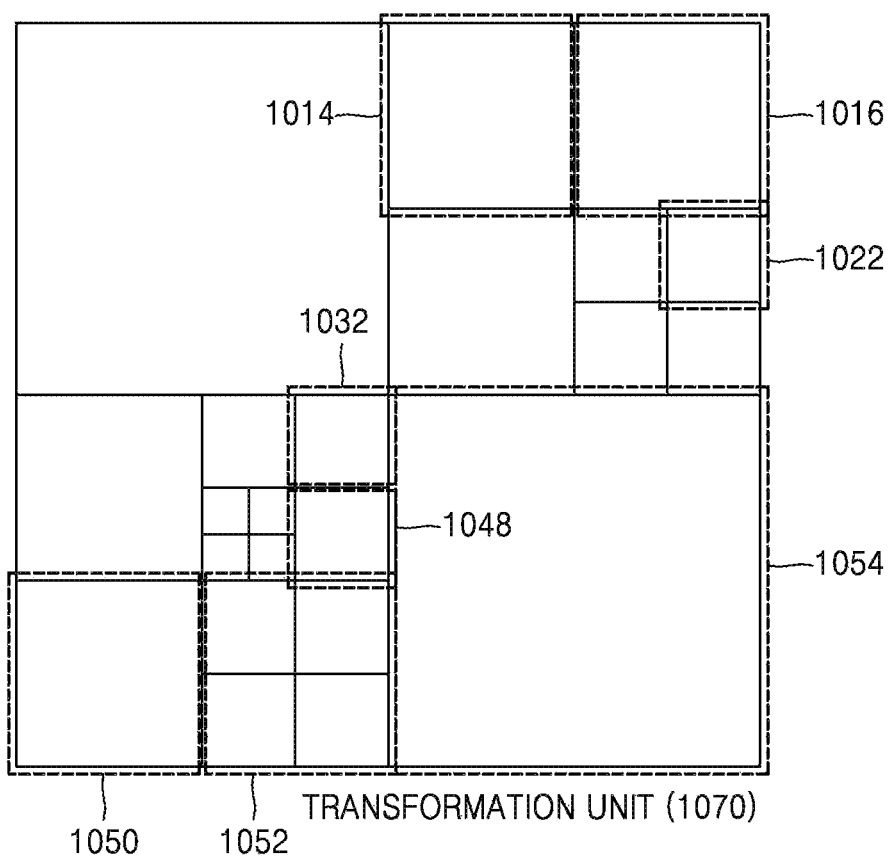

FIGS. 16, 17, and 18 illustrate a relationship between coding units, prediction units, and transformation units, according to an embodiment.

Coding units 1010 are deeper coding units according to depths determined by the video encoding apparatus 100, in a largest coding unit. Prediction units 1060 are partitions of prediction units of each of the Coding units 1010 according to depths, and transformation units 1070 are transformation units of each of the coding units according to depths.

When a depth of a largest coding unit is 0 in the deeper coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

Some partitions 1014, 1016, 1022, 1032, 1048, 1050, 1052, and 1054 from among the prediction units 1060 are obtained by splitting the coding unit. That is, partitions 1014, 1022, 1050, and 1054 are a partition mode having a size of 2N×N, partitions 1016, 1048, and 1052 are a partition mode having a size of N×2N, and a partition 1032 is a partition mode having a size of N×N. Prediction units and partitions of the deeper coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, 1052, and 1054 in the transformation units 1760 are data units different from those in the Prediction units 1060 in terms of sizes and shapes. That is, the video encoding apparatus 100 and the video decoding apparatus 200 according to the embodiments may perform intra prediction/motion estimation/motion compensation/and transformation/inverse transformation on an individual data unit in the same coding unit.

Accordingly, encoding is recursively performed on each of coding units having a hierarchical structure in each region of a largest coding unit so as to determine an optimum coding unit, and thus coding units according to a recursive tree structure may be obtained. Encoding information may include split information about a coding unit, partition mode information, prediction mode information, and transformation unit size information. Table 1 below shows the encoding information that may be set by the video encoding apparatus 100 and the video decoding apparatus 200 according to the embodiments.

defined for the final depth. If the current coding unit has to be further split according to the split information, encoding has to be independently performed on each of four split coding units of a lower depth.

A prediction mode may be one of an intra mode, an inter mode, and a skip mode. The intra mode and the inter mode may be defined in all partition modes, and the skip mode may be defined only in a partition mode having a size of 2N×2N.

The partition mode information may indicate symmetrical partition modes having sizes of 2N×2N, 2N×N, N×2N, and N×N, which are obtained by symmetrically splitting a height or a width of a prediction unit, and asymmetrical partition modes having sizes of 2N×nU, 2N×nD, nL×2N, and nR×2N, which are obtained by asymmetrically splitting the height or width of the prediction unit. The asymmetrical partition modes having the sizes of 2N×nU and 2N×nD may be respectively obtained by splitting the height of the prediction unit in 1:3 and 3:1, and the asymmetrical partition modes having the sizes of nL×2N and nR×2N may be respectively obtained by splitting the width of the prediction unit in 1:3 and 3:1.

The size of the transformation unit may be set to be two types in the intra mode and two types in the inter mode. That is, if split information of the transformation unit is 0, the size of the transformation unit may be 2N×2N, which is the size of the current coding unit. If split information of the transformation unit is 1, the transformation units may be obtained by splitting the current coding unit. Also, if a partition mode of the current coding unit having the size of 2N×2N is a symmetrical partition mode, a size of a transformation unit may be N×N, and if the partition mode of the current coding unit is an asymmetrical partition mode, the size of the transformation unit may be N/2×N/2.

TABLE 1

Split Information 0
(Encoding on Coding Unit having Size of 2N × 2N and Current Depth of d)

| Prediction Mode | Partition Type | | Size of Transformation Unit | | Split Information 1 |
|---|---|---|---|---|---|
| Intra Inter Skip (Only 2N × 2N) | Symmetrical Partition Type 2N × 2N 2N × N N × 2N N × N | Asymmetrical Partition Type 2N × nU 2N × nD nL × 2N nR × 2N | Split Information 0 of Transformation Unit 2N × 2N | Split Information 1 of Transformation Unit N × N (Symmetrical Partition Type) N/2 × N/2 (Asymmetrical Partition Type) | Repeatedly Encode Coding Units having Lower Depth of d + 1 |

The output unit 130 of the video encoding apparatus 100 according to the embodiment may output the encoding information about the coding units having a tree structure, and the image data and encoding information extractor 220 of the video decoding apparatus 200 according to the embodiment may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a final depth, and thus partition mode information, prediction mode information, and transformation unit size information may be The encoding information about coding units having a tree structure according to the embodiment may be assigned to at least one of a coding unit corresponding to a depth, a prediction unit, and a minimum unit. The coding unit corresponding to the depth may include at least one of a prediction unit and a minimum unit containing the same encoding information.

Accordingly, it is determined whether adjacent data units are included in the coding unit corresponding to the same depth by comparing a plurality of pieces of encoding information of the adjacent data units. Also, a corresponding coding unit corresponding to a depth is determined by using encoding information of a data unit, and thus a distribution of depths in a largest coding unit may be inferred.

Accordingly, if a current coding unit is predicted based on adjacent data units, encoding information of data units in deeper coding units adjacent to the current coding unit may be directly referred to and used.

In another embodiment, if a current coding unit is prediction-encoded based on adjacent data units, the adjacent data units may be referred to in a manner that data adjacent to the current coding unit is searched for in deeper coding units by using encoding information of the deeper coding units adjacent to the current coding unit.

Figure 19:
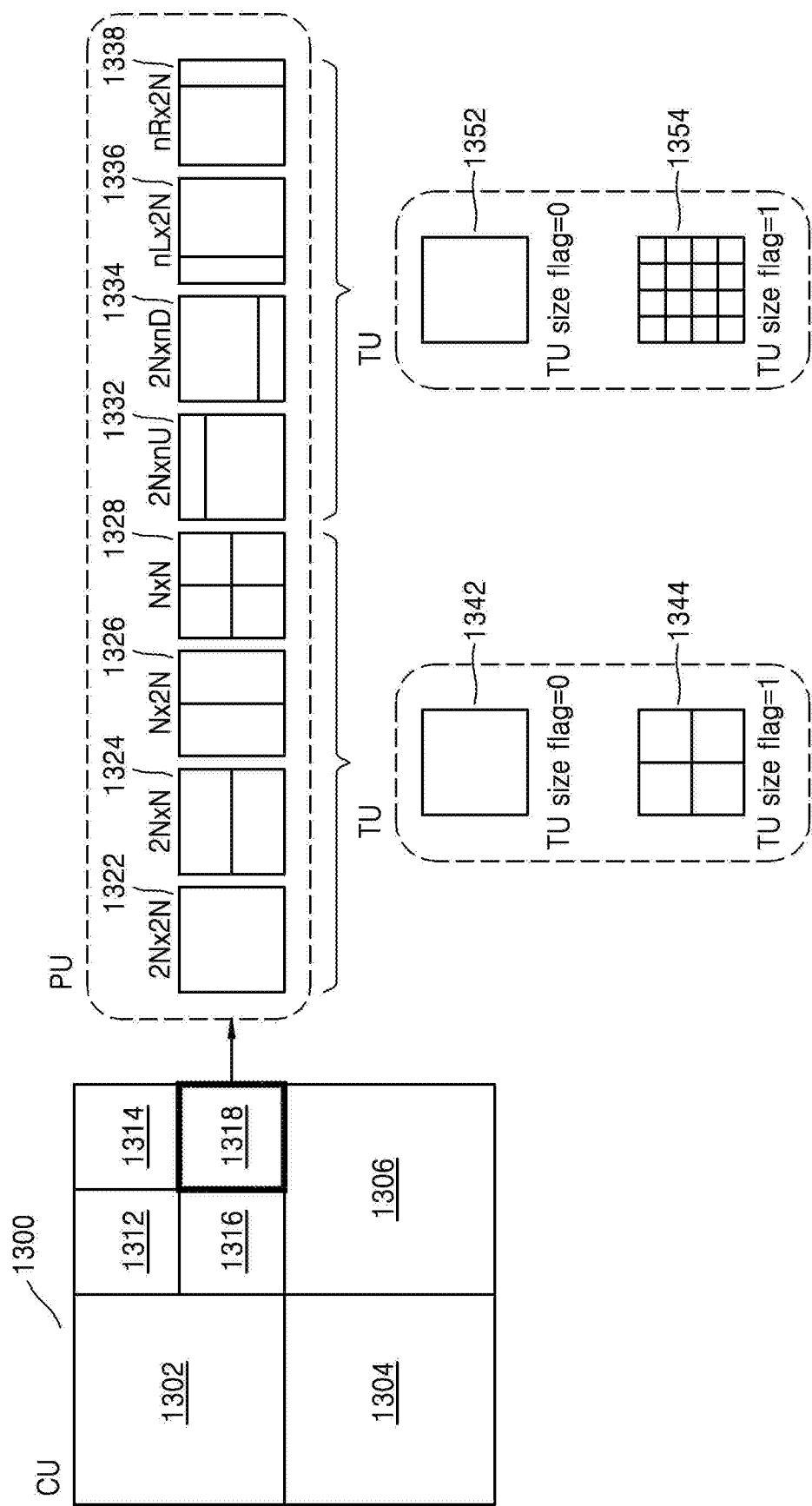
FIG. 19 illustrates a relationship between a coding unit, a prediction unit, and a transformation unit, according to encoding mode information of Table 1.

FIG. 19 illustrates a relationship between a coding unit, a prediction unit, and a transformation unit, according to encoding mode information of Table 1.

A largest coding unit 1300 includes coding units 1302, 1304, 1306, 1312, 1314, 1316, and 1318 of depths. Here, since the coding unit 1318 is a coding unit of a depth, split information may be set to 0. Partition mode information of the coding unit 1318 having a size of 2N×2N may be set to be one of partition modes including 2N×2N 1322, 2N×N 1324, N×2N 1326, N×N 1328, 2N×nU 1332, 2N×nD 1334, nL×2N 1336, and nR×2N 1338.

Transformation unit split information (TU size flag) is a type of a transformation index, and a size of a transformation unit corresponding to the transformation index may be changed according to a prediction unit type or partition mode of the coding unit.

For example, when the partition mode information is set to be one of symmetrical partition modes 2N×2N 1322, 2N×N 1324, N×2N 1326, and N×N 1328, if the transformation unit split information is 0, a transformation unit 1342 having a size of 2N×2N is set, and if the transformation unit split information is 1, a transformation unit 1344 having a size of N×N may be set.

When the partition mode information is set to be one of asymmetrical partition modes 2N×nU 1332, 2N×nD 1334, nL×2N 1336, and nR×2N 1338, if the transformation unit split information (TU size flag) is 0, a transformation unit 1352 having a size of 2N×2N may be set, and if the transformation unit split information is 1, a transformation unit 1354 having a size of N/2×N/2 may be set.

The transformation unit split information (TU size flag) described above with reference to FIG. 12 is a flag having a value of 0 or 1, but the transformation unit split information according to an embodiment is not limited to a flag having 1 bit, and the transformation unit may be hierarchically split while the transformation unit split information increases in a manner of 0, 1, 2, 3 . . . etc., according to setting. The transformation unit split information may be an example of the transformation index.

In this case, the size of a transformation unit that has been actually used may be expressed by using the transformation unit split information according to the embodiment, together with a maximum size of the transformation unit and a minimum size of the transformation unit. The video encoding apparatus 100 according to the embodiment may encode maximum transformation unit size information, minimum transformation unit size information, and maximum transformation unit split information. The result of encoding the maximum transformation unit size information, the minimum transformation unit size information, and the maximum transformation unit split information may be inserted into an SPS. The video decoding apparatus 200 according to the embodiment may decode video by using the maximum transformation unit size information, the minimum transformation unit size information, and the maximum transformation unit split information.

For example, (a) if the size of a current coding unit is 64×64 and a maximum transformation unit size is 32×32, (a-1) then the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, the TU size flag cannot be set to a value other than 0, since the size of the transformation unit cannot be less than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit may be defined by Equation (1):

$$\text{CurrMinTuSize} = \max(\text{MinTransformSize}, \text{RootTuSize}/(2^{\text{MaxTransformSizeIndex}})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. In Equation (1), 'RootTuSize/(2^MaxTransformSizeIndex)' denotes a transformation unit size when the transformation unit size 'RootTuSize', when the TU size flag is 0, is split by the number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to an embodiment, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$\text{RootTuSize} = \min(\text{MaxTransformSize}, \text{PUSize}) \quad (2)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. 'PartitionSize' denotes the size of the current partition unit.

$$\text{RootTuSize} = \min(\text{MaxTransformSize}, \text{PartitionSize}) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an embodiment, and a factor for determining the current maximum transformation unit size is not limited thereto.

According to the video encoding method based on coding units of a tree structure described above with reference to FIGS. 7 through 19, image data of a spatial domain is encoded in each of the coding units of the tree structure, and the image data of the spatial domain is reconstructed in a manner that decoding is performed on each largest coding unit according to the video decoding method based on the coding units of the tree structure, so that a video that is formed of pictures and picture sequences may be reconstructed. The reconstructed video may be reproduced by a reproducing apparatus, may be stored in a storage medium, or may be transmitted via a network.

Also, offset parameters may be signaled with respect to each picture, each slice, each largest coding unit, each of coding units of a tree structure, each prediction unit of the coding units, or each transformation unit of the coding units. For example, values of reconstructed pixels of each largest coding unit may be adjusted by using offset values reconstructed based on received offset parameters, and thus a largest coding unit having a minimum error between an original block and the largest coding unit may be reconstructed.

For convenience of description, the video encoding methods described above with reference to FIGS. 1A through 18 are collectively referred to as 'video encoding method'. In addition, the video decoding methods described above with reference to FIGS. 1A through 18 are referred to as 'video decoding method'.

Also, a video encoding apparatus including the video encoding apparatus 10, the video encoding apparatus 100, or the image encoder 400, which has been described with reference to FIGS. 1A through 18, will be collectively referred to as a 'video encoding apparatus'. Also, a video decoding apparatus including the video decoding apparatus 20, the video decoding apparatus 200, or the image decoder 500 which are described with reference to FIGS. 2A through 19 will be collectively referred to as a 'video decoding apparatus'.

A computer-readable recording medium such as a disc 26000 that stores the programs according to an embodiment will now be described in detail.

Figure 20:
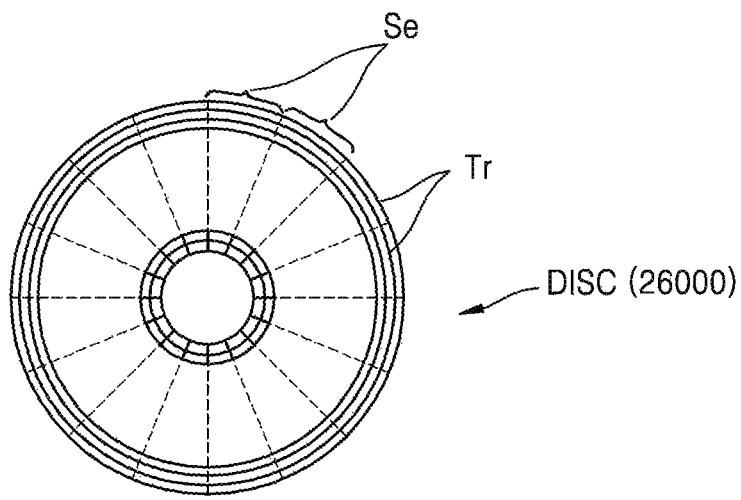
FIG. 20 illustrates a physical structure of a disc in which a program is stored, according to various embodiments.

FIG. 20 illustrates a physical structure of the disc 26000 in which a program is stored, according to an embodiment. The disc 26000, which is a storage medium, may be a hard drive, a compact disc-read only memory (CD-ROM) disc, a Blu-ray disc, or a digital versatile disc (DVD). The disc 26000 includes a plurality of concentric tracks Tr that are each divided into a specific number of sectors Se in a circumferential direction of the disc 26000. In a specific region of the disc 26000, a program that executes the quantized parameter determining method, the video encoding method, and the video decoding method described above may be assigned and stored.

A computer system embodied using a storage medium that stores a program for executing the video encoding method and the video decoding method as described above will now be described with reference to FIG. 21.

Figure 21:
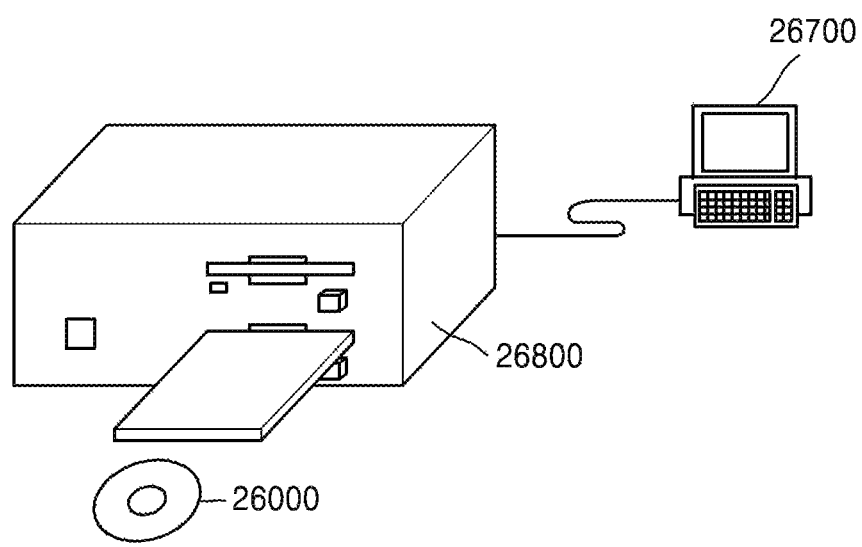
FIG. 21 illustrates a disc drive for recording and reading a program by using the disc.

FIG. 21 illustrates a disc drive 26800 for recording and reading a program by using the disc 26000. A computer system 27000 may store a program that executes at least one of a video encoding method and a video decoding method, in the disc 26000 via the disc drive 26800. In order to run the program stored in the disc 26000 in the computer system 26700, the program may be read from the disc 26000 and may be transmitted to the computer system 26700 by using the disc drive 26800.

The program that executes at least one of the video encoding method and the video decoding method may be stored not only in the disc 26000 illustrated in FIGS. 20 and 21 but may also be stored in a memory card, a ROM cassette, or a solid state drive (SSD).

A system to which the video encoding method and the video decoding method according to the embodiments described above are applied will be described below.

Figure 22:
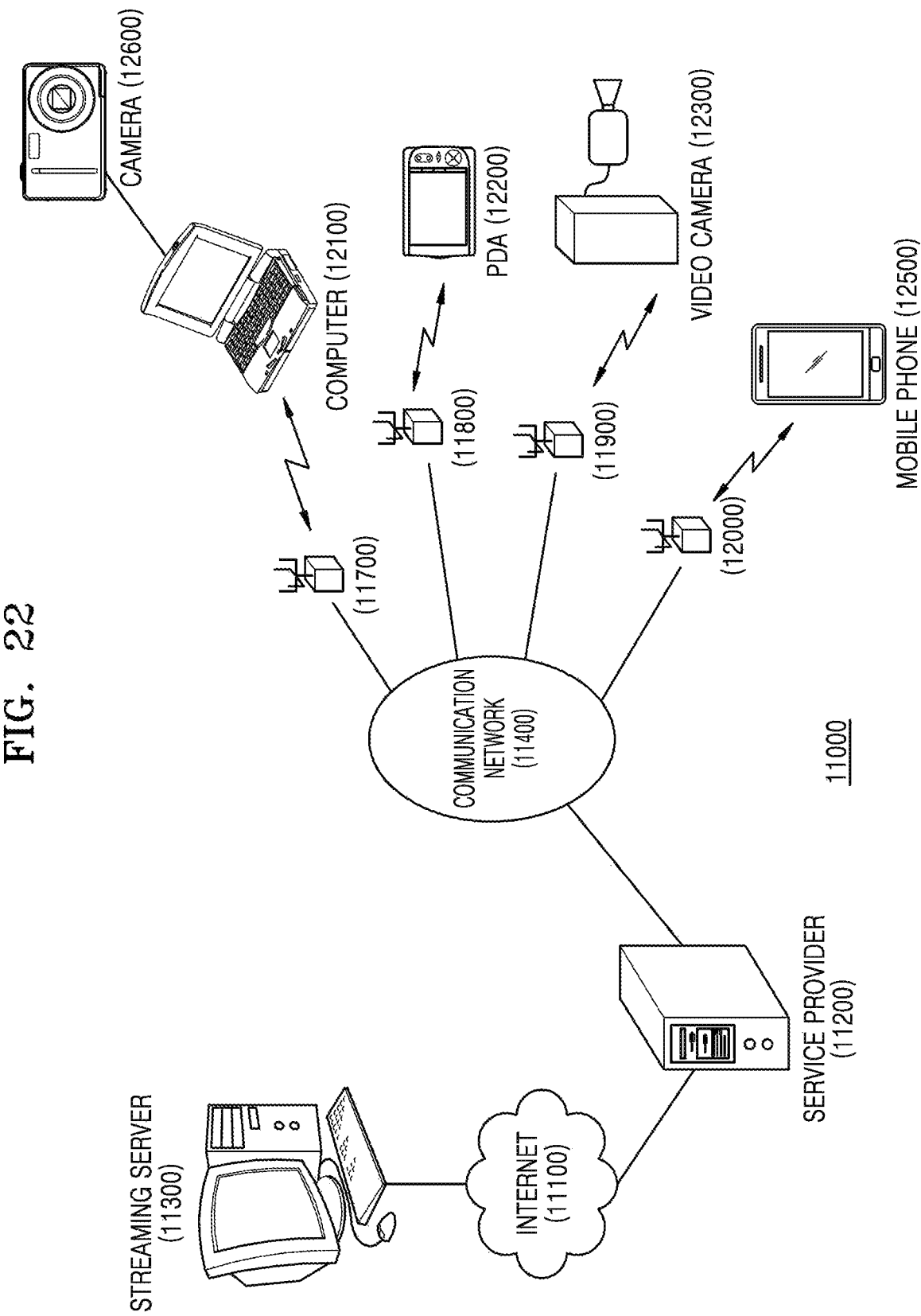
FIG. 22 illustrates an overall structure of a content supply system for providing a content distribution service.

FIG. 22 illustrates an overall structure of a content supply system 11000 for providing a content distribution service. A service area of a communication system is divided into predetermined-sized cells, and wireless base stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 11100 via an internet service provider 11200, a communication network 11400, and the wireless base stations 11700, 11800, 11900, and 12000.

However, the content supply system 11000 is not limited to the structure as illustrated in FIG. 16 (22?), and devices may be selectively connected thereto. The plurality of independent devices may be directly connected to the communication network 11400, not via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless base station 11900 and the communication network 11400. The streaming server 11300 allows content received from a user via the video camera 12300 to be streamed via a real-time broadcast. The content received from the video camera 12300 may be encoded by the video camera 12300 or the streaming server 11300. Video data captured by the video camera 12300 may be transmitted to the streaming server 11300 via the computer 12100.

Video data captured by a camera 12600 may also be transmitted to the streaming server 11300 via the computer 12100. The camera 12600 such as a digital camera is an imaging device capable of capturing both still images and video images. The video data captured by the camera 12600 may be encoded by using the camera 12600 or the computer 12100. Software that performs encoding and decoding video may be stored in a computer-readable recording medium, e.g., a CD-ROM disc, a floppy disc, a hard disc drive, an SSD, or a memory card, which may be accessed by the computer 12100.

If video data is captured by a camera built in the mobile phone 12500, the video data may be received from the mobile phone 12500.

The video data may also be encoded by a large scale integrated circuit (LSI) system installed in the video camera 12300, the mobile phone 12500, or the camera 12600.

In the content supply system 11000 according to an embodiment, content data, e.g., content recorded during a concert, which has been recorded by a user using the video camera 12300, the camera 12600, the mobile phone 12500, or another imaging device is encoded and is transmitted to the streaming server 11300. The streaming server 11300 may transmit the encoded content data in a type of a streaming content to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. Also, the content supply system 11000 allows the clients to receive the encoded content data and to decode and reproduce the encoded content data in real-time, thereby enabling personal broadcasting.

The video encoding apparatus and the video decoding apparatus may be applied to encoding and decoding operations of the plurality of independent devices included in the content supply system 11000.

Figure 23:
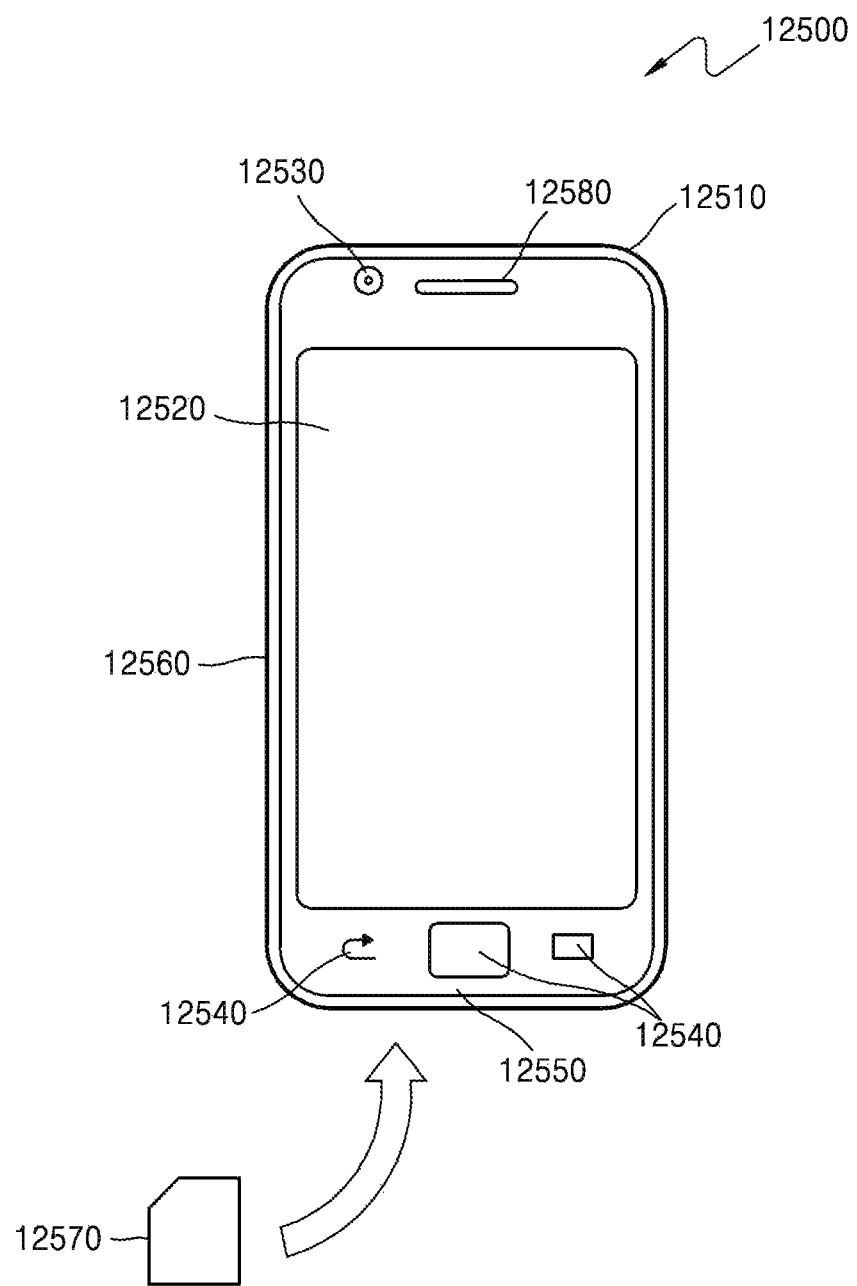
FIGS. 23 and 24 illustrate external and internal structures of a mobile phone to which a video encoding method and a video decoding method are applied, according to various embodiments.
Figure 24:
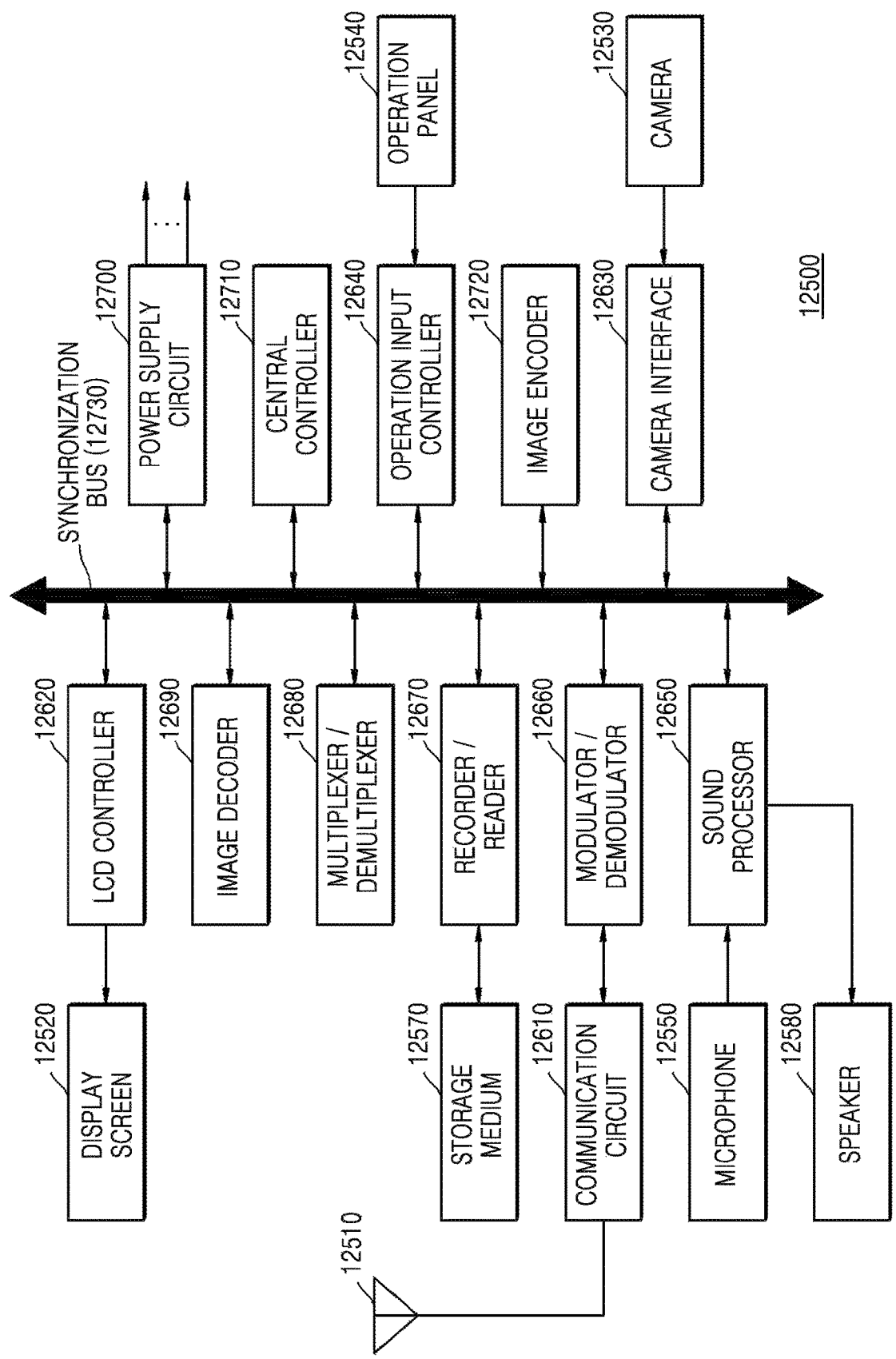

With reference to FIGS. 23 and 24, the mobile phone 12500 included in the content supply system 11000 according to an embodiment will now be described in detail.

FIG. 23 illustrates an external structure of the mobile phone 12500 to which the video encoding method and the video decoding method are applied, according to an embodiment. The mobile phone 12500 may be a smart phone, the functions of which are not limited and a large number of the functions of which may be changed or expanded.

The mobile phone 12500 includes an internal antenna 12510 via which a radio-frequency (RF) signal may be exchanged with the wireless base station 12000, and includes a display screen 12520 for displaying images captured by a camera 12530 or images that are received via the antenna 12510 and decoded, e.g., a liquid crystal display (LCD) or an organic light-emitting diode (OLED) screen. The mobile phone 12500 includes an operation panel 12540 including a control button and a touch panel. If the display screen 12520 is a touch screen, the operation panel 12540 further includes a touch sensing panel of the display screen 12520. The mobile phone 12500 includes a speaker 12580 for outputting voice and sound or another type of a sound output unit, and a microphone 12550 for inputting voice and sound or another type of a sound input unit. The mobile phone 12500 further includes the camera 12530, such as a charge-coupled device (CCD) camera, to capture video and still images. The mobile phone 12500 may further include a storage medium 12570 for storing encoded/decoded data, e.g., video or still images captured by the camera 12530, received via email, or obtained according to various ways; and a slot 12560 via which the storage medium 12570 is loaded into the mobile phone 12500. The storage medium 12570 may be a flash memory, e.g., a secure digital (SD) card or an electrically erasable and programmable read only memory (EEPROM) included in a plastic case.

FIG. 24 illustrates an internal structure of the mobile phone 12500. In order to systemically control parts of the mobile phone 12500 including the display screen 12520 and the operation panel 12540, a power supply circuit 12700, an operation input controller 12640, an image encoder 12720, a camera interface 12630, an LCD controller 12620, an image decoder 12690, a multiplexer/demultiplexer 12680, a recording/reading unit 12670, a modulation/demodulation unit 12660, and a sound processor 12650 are connected to a central controller 12710 via a synchronization bus 12730.

If a user operates a power button and sets from a 'power off' state to a 'power on' state, the power supply circuit 12700 supplies power to all the parts of the mobile phone 12500 from a battery pack, thereby setting the mobile phone 12500 to an operation mode.

The central controller 12710 includes a central processing unit (CPU), a read-only memory (ROM), and a random access memory (RAM).

While the mobile phone 12500 transmits communication data to the outside, a digital signal is generated by the mobile phone 12500 under control of the central controller 12710. For example, the sound processor 12650 may generate a digital sound signal, the image encoder 12720 may generate a digital image signal, and text data of a message may be generated via the operation panel 12540 and the operation input controller 12640. When a digital signal is transmitted to the modulation/demodulation unit 12660 by the control of the central controller 12710, the modulation/demodulation unit 12660 modulates a frequency band of the digital signal, and a communication circuit 12610 performs digital-to-analog conversion (DAC) and frequency conversion on the frequency band-modulated digital sound signal.

A transmission signal output from the communication circuit 12610 may be transmitted to a voice communication base station or the wireless base station 12000 via the antenna 12510.

For example, when the mobile phone 12500 is in a conversation mode, a sound signal obtained via the microphone 12550 is converted to a digital sound signal by the sound processor 12650 by the control of the central controller 12710. The generated digital sound signal may be converted to a transmission signal through the modulation/demodulation unit 12660 and the communication circuit 12610, and may be transmitted via the antenna 12510.

When a text message, e.g., email, is transmitted in a data communication mode, text data of the text message is input via the operation panel 12540 and is transmitted to the central controller 12610 via the operation input controller 12640. By the control of the central controller 12610, the text data is transformed into a transmission signal via the modulation/demodulation unit 12660 and the communication circuit 12610 and is transmitted to the wireless base station 12000 via the antenna 12510.

In order to transmit image data in the data communication mode, image data captured by the camera 12530 is provided to the image encoder 12720 via the camera interface 12630. The image data captured by the camera 12530 may be directly displayed on the display screen 12520 via the camera interface 12630 and the LCD controller 12620.

A structure of the image encoder 12720 may correspond to that of the video encoding apparatus described above. The image encoder 12720 may transform the image data received from the camera 12530 into compressed and encoded image data according to the aforementioned video encoding method, and then output the encoded image data to the multiplexer/demultiplexer 12680.

During a recording operation of the camera 12530, a sound signal obtained by the microphone 12550 of the mobile phone 12500 may be transformed into digital sound data via the sound processor 12650, and the digital sound data may be transmitted to the multiplexer/demultiplexer 12680.

The multiplexer/demultiplexer 12680 multiplexes the encoded image data received from the image encoder 12720, together with the sound data received from the sound processor 12650. A result of multiplexing the data may be transformed into a transmission signal via the modulation/ demodulation unit 12660 and the communication circuit 12610, and may then be transmitted via the antenna 12510.

While the mobile phone 12500 receives communication data from the outside, frequency recovery and analog-to-digital conversion (ADC) are performed on a signal received via the antenna 12510 so as to convert the received signal into a digital signal. The modulation/demodulation unit 12660 modulates a frequency band of the digital signal. The frequency-band modulated digital signal is transmitted to the video decoder 12690, the sound processor 12650, or the LCD controller 12620, according to the type of the digital signal.

In the conversation mode, the mobile phone 12500 amplifies a signal received via the antenna 12510, and obtains a digital sound signal by performing frequency conversion and ADC on the amplified signal. A received digital sound signal is converted to an analog sound signal via the modulation/demodulation unit 12660 and the sound processor 12650, and the analog sound signal is output via the speaker 12580 by the control of the central controller 12710.

When, in the data communication mode, data of a video file accessed at an Internet website is received, a signal received from the wireless base station 12000 via the antenna 12510 is output as multiplexed data via the modulation/demodulation unit 12660, and the multiplexed data is transmitted to the multiplexer/demultiplexer 12680.

In order to decode the multiplexed data received via the antenna 12510, the multiplexer/demultiplexer 12680 demultiplexes the multiplexed data into an encoded video data stream and an encoded audio data stream. Via the synchronization bus 12730, the encoded video data stream and the encoded audio data stream are provided to the video decoder 12690 and the sound processor 12650, respectively.

A structure of the image decoder 12690 may correspond to that of the video decoding apparatus described above. The image decoder 12690 may decode the encoded video data to obtain reconstructed video data and provide the reconstructed video data to the display screen 12520 via the LCD controller 12620, by using the aforementioned video decoding method.

Thus, the data of the video file accessed at the Internet website may be displayed on the display screen 12520. At the same time, the sound processor 12650 may transform audio data into an analog sound signal, and provide the analog sound signal to the speaker 12580. Thus, audio data contained in the video file accessed at the Internet website may also be reproduced via the speaker 12580.

The mobile phone 12500 or a communication terminal in a different form may be a transceiving terminal including both a video encoding apparatus and a video decoding apparatus, a transmitting terminal including only the aforementioned video encoding apparatus, or a receiving terminal including only the video decoding apparatus.

Figure 25:
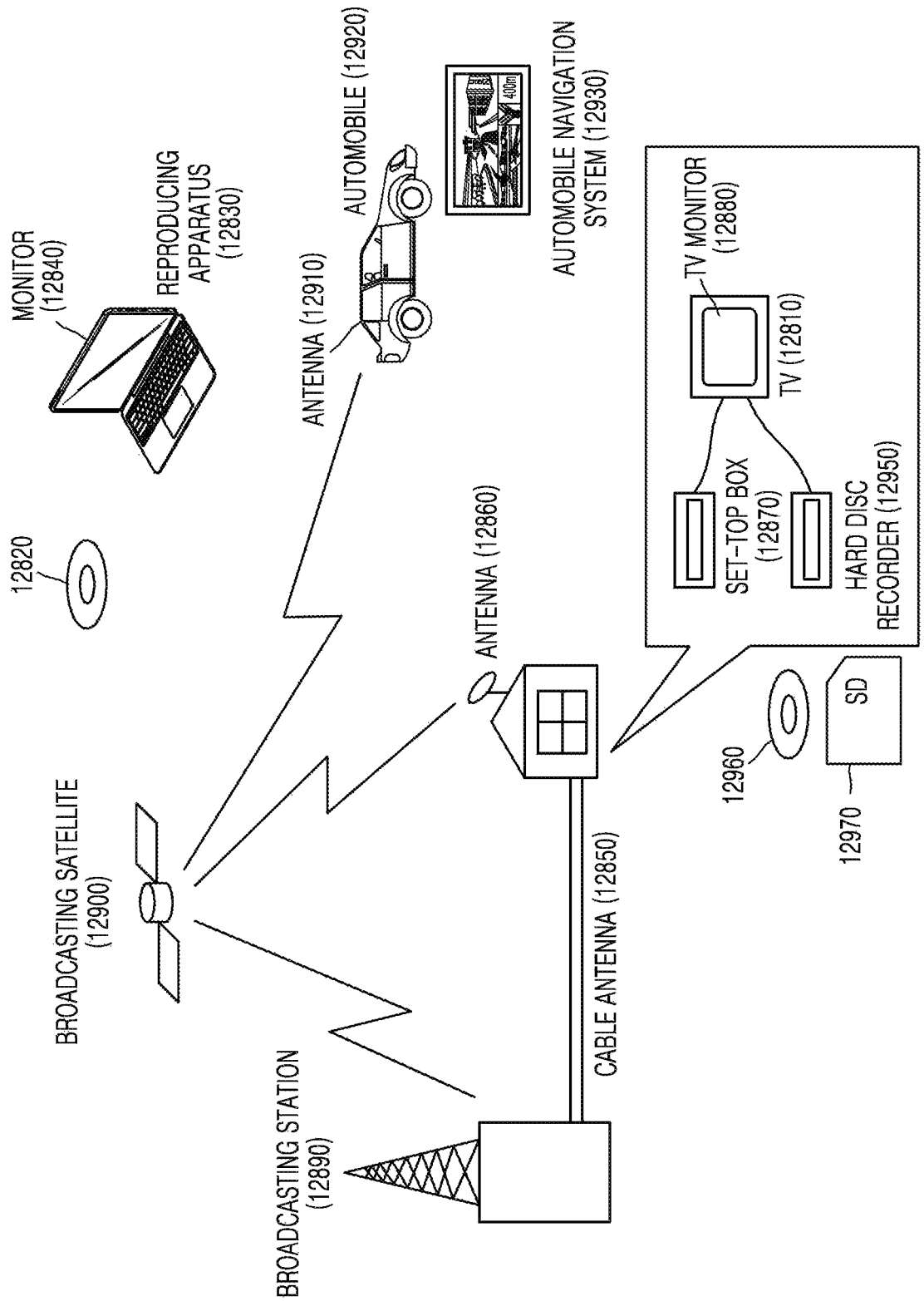
FIG. 25 illustrates a digital broadcasting system employing a communication system.

A communication system is not limited to the communication system described above with reference to FIG. 23. For example, FIG. 25 illustrates a digital broadcasting system employing a communication system, according to an embodiment. The digital broadcasting system of FIG. 25 according to an embodiment may receive a digital broadcast transmitted via a satellite or a terrestrial network by using the video encoding apparatus and the video decoding apparatus.

In more detail, a broadcasting station 12890 transmits a video data stream to a communication satellite or a broadcasting satellite 12900 by using radio waves. The broadcasting satellite 12900 transmits a broadcast signal, and the broadcast signal is transmitted to a satellite broadcast receiver via a household antenna 12860. In every house, an encoded video stream may be decoded and reproduced by a TV receiver 12810, a set-top box 12870, or another device.

When the video decoding apparatus is implemented in a reproducing apparatus 12830, the reproducing apparatus 12830 may parse and decode an encoded video stream recorded on a storage medium 12820, such as a disc or a memory card to reconstruct digital signals. Thus, the reconstructed video signal may be reproduced, for example, on a monitor 12840.

In the set-top box 12870 connected to the antenna 12860 for a satellite/terrestrial broadcast or a cable antenna 12850 for receiving a cable television (TV) broadcast, the video decoding apparatus may be installed. Data output from the set-top box 12870 may also be reproduced on a TV monitor 12880.

As another example, the video decoding apparatus may be installed in the TV receiver 12810 instead of the set-top box 12870.

An automobile 12920 that has an appropriate antenna 12910 may receive a signal transmitted from the satellite 12900 or the wireless base station 11700. A decoded video may be reproduced on a display screen of an automobile navigation system 12930 installed in the automobile 12920.

A video signal may be encoded by the video encoding apparatus and may then be recorded to and stored in a storage medium. In more detail, an image signal may be stored in a DVD disc 12960 by a DVD recorder or may be stored in a hard disc by a hard disc recorder 12950. As another example, the video signal may be stored in an SD card 12970. If the hard disc recorder 12950 includes the video decoding apparatus according to the embodiment, a video signal recorded on the DVD disc 12960, the SD card 12970, or another storage medium may be reproduced on the TV monitor 12880.

The automobile navigation system 12930 may not include the camera 12530, the camera interface 12630, and the image encoder 12720 of FIG. 25. For example, the computer 12100 and the TV receiver 12810 may not include the camera 12530, the camera interface 12630, and the image encoder 12720 of FIG. 25.

Figure 26:
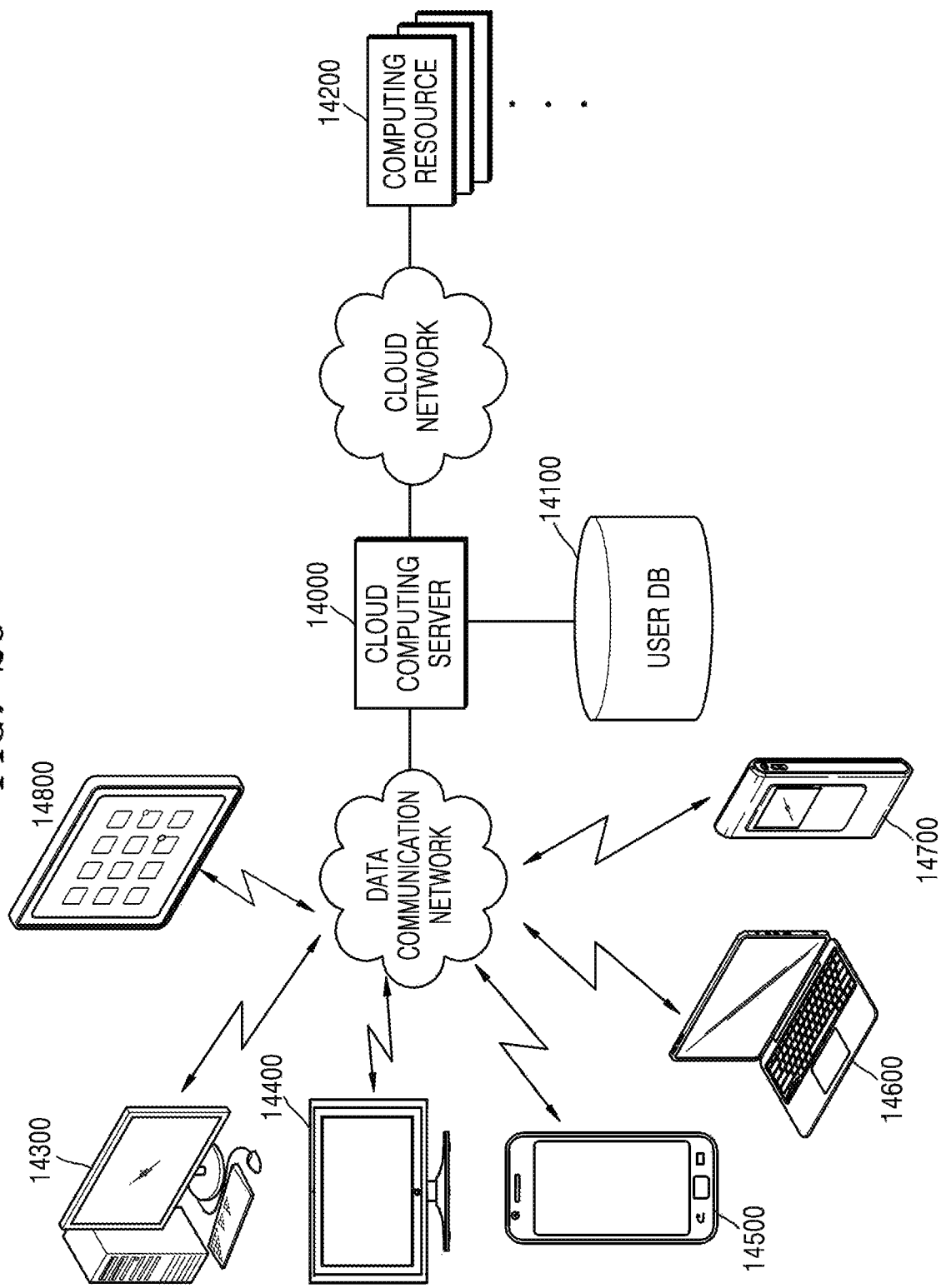
FIG. 26 illustrates a network structure of a cloud computing system using the video encoding apparatus and the video decoding apparatus, according to various embodiments.

FIG. 26 illustrates a network structure of a cloud computing system using a video encoding apparatus and a video decoding apparatus, according to an embodiment.

The cloud computing system may include a cloud computing server 14100, a user database (DB) 14100, a plurality of computing resources 14200, and a user terminal.

The cloud computing system provides an on-demand outsourcing service of the plurality of computing resources 14200 via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, a storage, an operating system (OS), and security software, into his/her own terminal in order to use them, but may select and use desired services from among services in a virtual space generated through the virtualization technology, at a desired point in time.

A user terminal of a specified service user is connected to the cloud computing server 14000 via a data communication network including the Internet and a mobile telecommunication network. User terminals may be provided cloud computing services, and particularly video reproduction services, from the cloud computing server 14000. The user terminals may be various types of electronic devices capable of being connected to the Internet, e.g., a desktop PC 14300, a smart TV 14400, a smart phone 14500, a notebook computer 14600, a portable multimedia player (PMP) 14700, a tablet PC 14100, and the like.

The cloud computing server 14100 may combine the plurality of computing resources 14200 distributed in a cloud network and provide user terminals with a result of combining. The plurality of computing resources 14200 may include various data services, and may include data uploaded from user terminals. As described above, the cloud computing server 14100 may provide user terminals with desired services by combining video database distributed in different regions according to the virtualization technology.

User information about users who have subscribed for a cloud computing service is stored in the user DB 14100. The user information may include logging information, addresses, names, and personal credit information of the users. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce the video service is received from the smart phone 14500, the cloud computing server 14000 searches for and reproduces the video service, based on the user DB 14100. When the smart phone 14500 receives a video data stream from the cloud computing server 14000, a process of reproducing video by decoding the video data stream is similar to an operation of the mobile phone 12500 described above with reference to FIG. 23.

The cloud computing server 14000 may refer to a reproduction history of a desired video service, stored in the user DB 14100. For example, the cloud computing server 14000 receives a request to reproduce a video stored in the user DB 14100, from a user terminal. If this video was being reproduced, then a method of streaming this video, performed by the cloud computing server 14000, may vary according to the request from the user terminal, i.e., according to whether the video will be reproduced, starting from a start thereof or a pausing point thereof. For example, if the user terminal requests to reproduce the video, starting from the start thereof, the cloud computing server 14000 transmits streaming data of the video starting from a first frame thereof to the user terminal. If the user terminal requests to reproduce the video, starting from the pausing point thereof, the cloud computing server 14000 transmits streaming data of the video starting from a frame corresponding to the pausing point, to the user terminal.

In this case, the user terminal may include the video decoding apparatus as described above with reference to FIGS. 1A through 26. As another example, the user terminal may include the video encoding apparatus as described above with reference to FIGS. 1A through 26. Alternatively, the user terminal may include both the video decoding apparatus and the video encoding apparatus as described above with reference to FIGS. 1A through 26.

Various applications of a video encoding method, a video decoding method, a video encoding apparatus, and a video decoding apparatus according to various embodiments described above with reference to FIGS. 1A through 26 have been described above with reference to FIGS. 13 through 19.

However, various embodiments of methods of storing the video encoding method and the video decoding method in a storage medium or various embodiments of methods of implementing the video encoding apparatus and the video decoding apparatus in a device described above with reference to FIGS. 1A through 19 are not limited to the embodiments of FIGS. 20 through 26.

Throughout the specification, the description "A may include one of a1, a2, and a3" may mean that an exemplary element that may be included in an A element may be a1, a2, or a3.

However, the element that may be included in the A element is not limited to a1, a2, or a3 due to the description. Thus, the element that may be included in the A element should not be exclusively construed as being limited to a1, a2, and a3 excluding other elements that are not specified herein.

The description means that the A element may include a1, may include a2, or may include a3. The description does not mean that elements included in the A element should be selectively determined from a predetermined group. For example, the description should not be construed as being limited to that a1, a2, or a3 selected from a group necessarily including a1, a2, and a3 configures an A component.

Throughout the specification, the description "at least one of a1, a2, and/or a3" indicates one of "a1", "a2", "a3", "a1 and a2", "a1 and a3", "a2 and a3", and "a1, a2 and a3".

Therefore, the description should not be construed as being limited to that the description "at least one of a1, a2, and/or a3" means "at least one of a1", "at least one of a2", and/or "at least one of a3", unless there is a particular description "at least one of a1, at least one of a2, and/or at least one of a3".

The one or more embodiments may be written as computer programs and may be implemented in general-use digital computers that execute the programs by using a computer-readable recording medium. Examples of the computer-readable recording medium include magnetic storage media (e.g., ROM, floppy disks, hard disks, etc.), optical recording media (e.g., CD-ROMs, or DVDs), etc.

While this disclosure has been particularly shown and described with reference to embodiments thereof, it will be understood by those of ordinary skill in the art that various changes in form and details may be made therein without departing from the spirit and scope of the disclosure. The embodiments should be considered in a descriptive sense only and not for purposes of limitation. The scope of the disclosure is defined not by the detailed description of the disclosure but by the appended claims, and all differences within the scope will be construed as being included in the present disclosure.

The invention claimed is:

1. A video decoding method comprising:
obtaining a residue of a first sampling rate regarding a current block by decoding a bitstream;
when the current block is intra predicted, generating a prediction block of the current block of the first sampling rate which is same as the first sampling rate of the residue by using a block that is previously decoded at the first sampling rate and then stored in a buffer;
when the current block is inter predicted, generating a prediction block of a second sampling rate, which is different from the first sampling rate of the residue, by using an image previously decoded at the second sampling rate which is changed from at least one block of the first sampling rate comprised in the image previously decoded, wherein the at least one block of the first sampling rate is based on another residue of the first sampling rate, and wherein the another residue of the first sampling rate is obtained from the bitstream and is related to the image previously decoded, and then generating the prediction block of the current block of the first sampling rate which is same as the first sampling rate of the residue by changing the generated prediction block of the second sampling rate to the prediction block of the first sampling rate; and generating a reconstruction block of the first sampling rate by using the prediction block of the first sampling rate and the residue of the first sampling rate, wherein the first sampling rate is higher than the second sampling rate.

2. The video decoding method of claim 1, further comprising storing the reconstruction block of the first sampling rate in the buffer.

3. The video decoding method of claim 1, further comprising, when a block to be decoded after the current block is intra predicted, generating a prediction block of the block to be decoded after the current block by using the reconstruction block of the first sampling rate.

4. The video decoding method of claim 1, wherein in the generating, when the current block is intra predicted, of the prediction block of the current block by using the block that is previously decoded at the first sampling rate and then is stored in the buffer, a reference pixel, which is from among pixels comprised in the current block and is to be used in intra predicting a block to be decoded after the current block, is predicted by using the block that is previously decoded at the first sampling rate and then is stored in the buffer, other pixels excluding the reference pixel which are comprised in the current block are predicted by using a block of the second sampling rate which is previously decoded and then is stored in the buffer, and the block of the second sampling rate is generated by changing the block that is previously decoded at the first sampling rate to the second sampling rate.

5. A non-transitory computer readable recording medium having recorded thereon a program for executing the method of claim 1.

6. A video decoding apparatus comprising:

a buffer configured to store a block to be used in intra prediction; and a decoder configured to:

obtain a residue of a first sampling rate regarding a current block by decoding a bitstream, when the current block is intra predicted, generate a prediction block of the current block of the first sampling rate which is same as the first sampling rate of the residue by using a block that is previously decoded at the first sampling rate and then is stored in the buffer, and when the current block is inter predicted, generate a prediction block of a second sampling rate which is different from the first sampling rate of the residue, by using an image previously decoded at the second sampling rate which is changed from at least one block of the first sampling rate comprised in the image previously decoded, wherein the at least one block of the first sampling rate is based on another residue of the first sampling rate, and wherein the another residue of the first sampling rate is obtained from the bitstream and is related to the image previously decoded, and generate the prediction of the current block of the first sampling rate which is same as the first sampling rate of the residue by changing the generated prediction block of the second sampling rate to the prediction block of the first sampling rate, generate a reconstruction block of the first sampling rate by using the prediction block and the residue of the first sampling rate, wherein the first sampling rate is higher than the second sampling rate.

7. A video encoding method comprising:

when a current block is intra predicted, generating a prediction block of the current block of a first sampling rate which is same as a sampling rate of a residue by using a block that is previously decoded at the first sampling rate and then is stored in a buffer;

when the current block is inter predicted, generating a prediction block of a second sampling rate which is different from the first sampling rate of the residue, by using an image previously decoded at the second sampling rate which is changed from at least one block of the first sampling rate comprised in the image previously decoded, wherein the at least one block of the first sampling rate is based on another residue of the first sampling rate, and the another residue of the first sampling rate is to be included in a bitstream and is related to the image previously decoded and generate the prediction block of the current block of the first sampling rate which is same as the first sampling rate of the residue by changing the generated prediction block of the second sampling rate to the prediction block of the first sampling rate; and determining the residue of the first sampling rate regarding the current block by using the generated prediction block of the first sampling rate, and generating the bitstream comprising the determined residue of the first sampling rate, wherein the first sampling rate is higher than the second sampling rate.

* * * * *